(12) United States Patent
Guerrero Vela et al.

(10) Patent No.: US 12,237,137 B2
(45) Date of Patent: Feb. 25, 2025

(54) METHOD AND APPARATUS FOR REDUCING THE WORK FUNCTION OF POLYCRYSTALLINE METAL HEXABORIDE

(71) Applicant: California Institute of Technology, Pasadena, CA (US)

(72) Inventors: Pedro P. Guerrero Vela, Pasadena, CA (US); James E. Polk, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 553 days.

(21) Appl. No.: 17/221,170

(22) Filed: Apr. 2, 2021

(65) Prior Publication Data
US 2022/0328274 A1    Oct. 13, 2022

(51) Int. Cl.
*H01J 1/02*   (2006.01)
*C04B 41/00*  (2006.01)
(Continued)

(52) U.S. Cl.
CPC .......... *H01J 1/146* (2013.01); *C04B 41/0054* (2013.01); *C04B 41/009* (2013.01);
(Continued)

(58) Field of Classification Search
CPC ... C04B 41/009; C04B 41/0054; C04B 41/91; C04B 41/5346; C04B 35/6455;
(Continued)

(56) References Cited

U.S. PATENT DOCUMENTS 5,458,754 A * 10/1995 Sathrum .......... H01J 37/32055
                                                    204/298.41
6,031,229 A *  2/2000 Keckley .................. H01L 22/26
                                                    257/E21.528
(Continued)

OTHER PUBLICATIONS

Baalrud et al. (2011) "Kinetic theory of the presheath and the Bohm criterion," Plasma Sources Sci. Technol. 20 025013. doi 10.1088/0963-0252/20/2/025013.
(Continued)

*Primary Examiner* — Tung X Le
(74) *Attorney, Agent, or Firm* — Leydig, Voit & Mayer, Ltd.

(57) ABSTRACT

Aspects include a method for treating a polycrystalline material, the method comprising: exposing a surface of the polycrystalline material to a plasma thereby changing the surface of the polycrystalline material from being characterized by a starting condition to being characterized by a treated condition; wherein: the surface comprises a plurality of crystallites each having the composition $MB_6$, M being a metal element; the plasma comprises ions, the ions being characterized by an average ion flux selected from the range of 1.5 to 100 $A/cm^2$ and an average ion energy that is less than a sputtering threshold energy; the starting condition of the surface is characterized by a first average work function and the treated condition of the surface is characterized by a second average work function; and the second average work function is less than the first average work function.

23 Claims, 46 Drawing Sheets

(51) Int. Cl.
C04B 41/91 (2006.01)
H01J 1/146 (2006.01)
H01J 9/04 (2006.01)

(52) U.S. Cl.
CPC .............. *C04B 41/91* (2013.01); *H01J 1/025* (2013.01); *H01J 9/042* (2013.01); *C04B 2235/3804* (2013.01)

(58) Field of Classification Search
CPC ............ C04B 35/5805; C04B 2235/80; C04B 2235/963; C04B 2235/3804; H01J 1/025; H01J 1/146; H01J 9/042; H01J 37/3056
See application file for complete search history.

(56) References Cited

U.S. PATENT DOCUMENTS

| | | | | |
|---|---|---|---|---|
| 6,337,540 | B1* | 1/2002 | Corbin | H01J 37/3056 219/121.48 |
| 2005/0073051 | A1* | 4/2005 | Yamamoto | H01L 27/0688 438/597 |
| 2017/0104426 | A1* | 4/2017 | Mills | H01L 31/0549 |
| 2018/0159459 | A1* | 6/2018 | Mills | H02S 10/30 |
| 2020/0048101 | A1* | 2/2020 | Adachi | C09D 7/67 |
| 2020/0331238 | A1* | 10/2020 | Adachi | C01B 35/04 |

OTHER PUBLICATIONS

Baalrud et al. (May 2020) "Interaction of biased electrodes and plasmas: sheaths, double layers, and fireballs" Plasma Sources Sci. Technol. 29 053001. doi 10.1088/1361-6595/ab8177.

Becatti et al. (2018) "Life evaluation of a lanthanum hexaboride hollow cathode for high-power hall thrusters," Journal of Propulsion and Power 34: 4, 893-900.

Braginskii (1965) "Transport Processes in a Plasma," Reviews of Plasma Physics, vol. 1. Authorized translation from the Russian by Herbert Lashinsky, University of Maryland, USA. Edited by M. A. Leontovich. Published by Consultants Bureau, New York, 1965, p. 205. Available at https://ui.adsabs.harvard.edu/abs/1965RvPP ....1.. 205B.

Capece et al. (2014) "Oxygen transport in the internal xenon plasma of a dispenser hollow cathode," Journal of Applied Physics 115, 153302; doi: 10.1063/1.4871755.

Chambers et al. (1982) "Cesium and oxygen coadsorption on LaB6, single crystal surfaces: I. Work function change," Surface Science 118, 75-92. doi: 10.1016/0039-6028(82)90015-2.

Cohen et al. (1985) "The hemi-cube: A radiosity solution for complex environments," ACM SIGGRAPH Computer Graphics, vol. 19, No. 3, pp. 31-40. https://doi.org/10.1145/325165.325171.

Desai et al. (1985) "Electrical Resistivity of Selected Elements," Journal of Physical and Chemical Reference Data, 13, 4, 1069-1096. URL http://aip.scitation.org/ doi/10.1063/1.555723.

Dushman (1923) "Electron emission from metals as a Function of Temperature," Phys. Rev. 21, 623-636. doi: 10.1103/PhysRev.21.623.

Emery et al. (2009) "Validation of Radiation Computations using View factors and COMSOLs Hemicube Approaches," COMSOL Conference 2009 Boston.

Forsythe et al. (1934) "Resistance and Radiation of Tungsten as a Function of Temperature," Journal of the Optical Society of America 24, 114-118. doi: 10.1364/JOSA.24.000114.

Forsythe et al. (1945) "Radiating Characteristics of Tungsten and Tungsten Lamps," Journal of the Optical Society of America, 35, 2, 108-113. doi:10.1364/JOSA.35.000108.

Goebel et al. (2005) "Hollow cathode theory and experiment. I . Plasma characterization using fast miniature scanning probes," Journal of Applied Physics 98, 113302. doi: 10.1063/1.2135417.

Goebel et al. (2007) "Potential fluctuations and energetic ion production in hollow cathode discharges," Physics of Plasmas 14, 103508. doi:10.1063/1.2784460.

Guerrero et al. (Oct. 2017) "Work function reduction in lanthanum hexaboride hollow cathodes operated in gas discharges," IEPC-2017-399, Paper presented at the 35th International Electric Propulsion Conference, Georgia Institute of Technology, Atlanta, Georgia, Oct. 8-12, 2017, pp. 2017-2399.

Guerrero et al. (2018) "Hollow cathode thermal modelling and self-consistent plasma solution: work function evaluation for a $LaB_6$ cathode," Paper presented at the AIAA-SAE-ASEE Joint Propulsion Conference, AIAA 2018-4511, Jul. 9-11, 2018, Cincinnati, Ohio, 17 pp. doi 10.2514/6.2018-4511.

Guerrero (2019) "Plasma Surface Interactions in $LaB_6$ Hollow Cathodes with Internal Xe Gas Discharge," Thesis (Ph.D.), California Institute of Technology, deposited on Jun. 4, 2019. doi:10.7907/4CW7-2K35.

Guerrero et al. (Sep. 2019) "Hollow cathode thermal modelling and self-consistent plasma solution: two step neutralization modelling," Paper presented at the 36th International Electric Propulsion Conference University of Vienna, Austria, Sep. 15-20, 2019, 12 pp.

Guerrero et al. (Sep. 2019) "$LaB_6$ hollow cathode work function enhancement: insight into the chemical processes," Paper presented at the 36th International Electric Propulsion Conference, IEPC-2019-A-172, University of Vienna, Austria, Sep. 15-20, 2019, 20 pp.

Guerrero et al. (Jul. 2021) "Critical implications of ion-surface energy accommodation and neutralization mechanism in hollow cathode physics," Journal of Applied Physics, 130, 043306.

Hagstrum (1954) "Auger Ejection of Electrons from Tungsten by Noble Gas Ions," Physical Review 96, 325-335. doi: 10.1103/PhysRev.96.325.

Hagstrum (1961) "Reflection of Noble Gas Ions at Solid Surfaces," Physical Review 123, 758-765. doi: 10.1103/PhysRev. 123.758.

Hagstrum et al. (1988) "Interaction of He+ and Ne+ ions with Ni(100)-K and Cu(100)-K surfaces having variable potassium coverage," Physical Review B 38, 10264-10279. doi: 10.1103/PhysRevB.38.10264.

Hansen et al. (1987) "Revised analysis of singly ionized xenon, Xe II," Physica Scripta 36, 602-643. doi: 10.1088/0031-8949/36/4/005.

Ho et al. (1972) "Thermal Conductivity of the Elements," Journal of Physical and Chemical Reference Data 1, 279. doi: 10.1063/1.3253100.

Jahn et al. (2003) "Electric Propulsion," Encyclopedia of Physical Science and Technology. vol. 5. 6. Elsevier, 125-141. doi: 10.1016/B0-12-227410-5/00201-5.

Jorns et al. (2014) "Ion acoustic turbulence in a 100-A LaB6 hollow cathode," Physical Review E, 90, 063106, pp. 1-10. doi: 10.1103/PhysRevE.90.063106.

Joussot et al. (2017) "Examination of a 5 A-class cathode with a $LaB_6$ flat disk emitter in the 2 A-20 A current range," Vacuum 146, 52-62.

Katz et al. (2007) "Thermal model of the hollow cathode using numerically simulated plasma fluxes," Journal of Propulsion and Power, 23, 3, 522-527. doi: 10.2514/1.21103.

Katz et al. (2008) "Insert Heating and Ignition in Inert-Gas Hollow Cathodes," IEEE Transactions on Plasma Science 36, 5, 2199-2206. doi: 10.1109/TPS.2008.2004363.

Katz et al. (2011) "Neutral gas free molecular flow algorithm including ionization and walls for use in plasma simulations," Journal of Computational Physics 230(4), 1454-1464. doi: 10.1016/j.jcp. 2010.11.013.

Kim et al. (2001) "Ionization of boron, aluminum, gallium, and indium by electron impact," Physical Review A, 64, 052707. doi: 10.1103/physreva.64.052707.

Kim et al. (2002) "Investigation of the Accelerated Ions Energy Accommodation Under Their Impingement with Solid Surfaces," 38th AIAA/ASME/SAE/ASEE Joint Propulsion Conference & Exhibit, AIAA 2002-4110. https://doi.org/10.2514/6.2002-4110.

Kingery et al. (1954) "Thermal Conductivity: X, Data for Several Pure Oxide Materials Corrected to Zero Porosity, "Journal of the American Ceramic Society 37, 2, 107-110. doi: 10 . 1111 / j. 1551-2916.1954.tb20109.x.

Lafferty (1951) "Boride Cathodes," Journal of Applied Physics 22, 299-309. doi: 10.1063/1.1699946.

(56) References Cited

OTHER PUBLICATIONS

Liao et al. (1982) "Lightning rod effect in surface enhanced Raman scattering," The Journal of Chemical Physics, 76, 1, 751-752.
Meyer (1990) "Hemi-Cube Ray-Tracing: A Method for Generating Soft Shadows," Eurographics 90, 365-376.
Mikellides (2009) "Effects of viscosity in a partially ionized channel flow with thermionic emission," Physics of Plasmas 16, 013501. doi 10.1063/1.3056397.
Mikellides et al. (2005) "Hollow cathode theory and experiment. II. A two-dimensional theoretical model of the emitter region, "Journal of Applied Physics 98, 113303, pp. 1-14. doi 10.1063/1.2135409.
Mikellides et al. (2006) "Plasma processes inside dispenser hollow cathodes," Physics of Plasmas 13, 063504. doi: 10.1063/1.2208292.
Mikellides et al. (2007) "Evidence of nonclassical plasma transport in hollow cathodes for electric propulsion," Journal of Applied Physics 101, 6, 063301. pp. 1-11. doi: 10.1063/1.2710763.
Mikellides et al. (2007) "Numerical Simulations of a Hall Thruster Hollow Cathode Plasma," 30th International Electric Propulsion Conference 2007, pp. 1-12.
Mikellides et al. (2008) "Wear Mechanisms in Electron Sources for Ion Propulsion, 1: Neutralizer Hollow Cathode," Journal of Propulsion and Power 24:4, 855-865, doi 10.2514/1.33461.
Mikellides et al. (2008) "Wear Mechanisms in Electron Sources for Ion Propulsion, 2: Discharge Hollow Cathode," Journal of Propulsion and Power 24:4, 866-879, doi 10.2514/1.33462.
Mikellides et al. (2010) "The discharge plasma in ion engine neutralizers : Numerical simulations and comparisons with laboratory data," Journal of Applied Physics 108, 113308, pp. 1-12. doi: 10.1063/1.3514560.
Mikellides et al. (2015) "Numerical Simulations of the Partially Ionized Gas in a 100-A LaB6 Hollow Cathode," IEEE Transactions on Plasma Science 43, 1, 173-184. doi: 10.1109/TPS.2014.2320876.
Mikellides et al. (2018) "Investigations of Spot-to-plume Mode Transition in a Hollow Cathode Discharge Using 2-D Axisymmetric Plasma Simulations," 54th AIAA/SAE/ASEE Joint Propulsion Conference, AIAA Propulsion and Energy Forum: American Institute of Aeronautics and Astronautics, 23 pp.
Milošević et al. (1999) "Thermal Properties of Tantalum Between 300 and 2300K," International Journal of Thermophysics 20, 4, 1129-1136. doi: 10.1023/A:1022659005050.
Monreal (2014) "Auger neutralization and ionization processes for charge exchange between slow noble gas atoms and solid surfaces," Progress in Surface Science 89, 1, pp. 80-125. doi: 10.1016/j.progsurf.2014.01.001.
Ortega et al. (2016) "First-principles modeling of the IAT-driven anomalous resistivity in hollow cathode discharges II: Numerical simulations and comparison with measurements".
Oshima et al. (1977) "Thermionic work function of LaB6 single crystals and their surfaces," Journal of applied Physics 48:3925-3927. doi: 10.1063/1.324266.
Polk et al. (2009) "Tungsten and barium transport in the internal plasma of hollow cathodes," Journal of Applied Physics 105, 113301. doi: 10.1063/1.3111970.
Polk et al. (2014) "The effect of cathode geometry on barium transport in hollow cathode plasmas," 115, 183301. doi: 10.1063/1.4873168.
Rodriguez et al. (2012) "Determination and analysis of plasma parameters for simulations of radiative blast waves launched in clusters of xenon and krypton," Plasma Physics and Controlled Fusion 54, 4, 045012. doi: 10. 1088/0741-3335/54/4/045012.
Rubiano et al. (2012) "Study of the radiative properties of plasma mixtures of interest for ICF chamber design using the ATMED code," 39th EPS Conference on Plasma Physics 2012, EPS 2012 and the 16th International Congress on Plasma Physics. vol. 3, P4.157.
Sary et al. (2017) "Hollow cathode modeling: II. Physical analysis and parametric study," Plasma Sources Science and Technology 26, 5, 055008. doi: 10.1088/1361-6595/aa6210.

Scheiner et al. (2015) "Theory of the electron sheath and presheath," Physics of Plasmas 22, 123520. doi.org/10.1063/1.4939024.
Shuvalov (1983) "Energy accommodation for gas ions on a polycrystalline material," Journal of Applied Mechanics and Technical Physics 24, 778-785. doi: 10.1007/BF00905614.
Stephens and Ordonez (1999) "Sheath and Presheath Potentials for Anode, Cathode and Floating Plasma-Facing Surfaces," J. Appl. Phys., 85, 2522. doi.org/10.1063/1.369845.
Storms (1979) "The emissivity of LaB6 at 650 nm," Journal of Applied Physics 50, 4450. doi: 10.1063/1.326438.
Storms et al. (1978) "Phase relationship, vaporization, and thermodynamic properties of the lanthanum-boron system," J. Phys. Chem. 82, 51-59. doi: 10.1021/j100490a014.
Storms et al. (1979) "A study of surface stoichiometry and thermionic emission using LaB6," Journal of Applied Physics 50, 3691-3698. doi: 10.1063/1.326323.
Tanaka (1974) "The thermal and electrical conductivities of LaB6 at high temperatures," Journal of Physics C: Solid State Physics 7, L177-L180. doi: 10.1088/0022-3719/7/9/001.
Thompson (1990) Production, Fabrication and Uses of Borides. In: The Physics and Chemistry of Carbides, Nitrides and Borides. Ed. by Robert Freer. Dordrecht: Springer Netherlands, pp. 113-120. doi: 10.1007/978-94-009-2101-6_8.
Uijttewaal et al. (2006) "Ab Initio and Work Function and Surface Energy Anisotropy of LaB 6," Journal of Physical Chemistry B, 110, 37, 18459-18465. doi: 10.1021/ jp063347i.
Urbieta et al. (2018) "Atomic-Scale Lightning Rod Effect in Plasmonic Picocavities: A Classical View to a Quantum Effect," ACS Nano, 12, 1, 585-595.
Wang et al. (2018) "Work functions of metal hexaborides: Density functional study," Modern Physics Letters B 32, 2, 1850007. doi: 10.1142/S0217984918500070.
Weisenburger (1973) "Heat transport measurements in polycrystalline graphites up to 2600 deg C. Report on an international cooperative measuring programme," High Temp.—High Pressures 5, 475-480.
Wen et al. (2002) "Experimental Investigation of Emissivity of Aluminum Alloys and Temperature Determination Using Multispectral Radiation Thermometry (MRT) Algorithms," Journal of Materials Engineering and Performance 11, 551-562. doi: 10.1361/105994902770343818.
Worthing, A. G. and Forsythe, W.E. (1921) "Total emissivity powers and resistivities of tungsten at incandescence," In: Physical Review 18, pp. 144-147.
Zhang et al. (2003) "New apparatus for measurement of the spectral, angular, and total emissivity of solids," High Temperatures—High Pressures, vol. 35-36, No. 3, pp. 289-302. doi:10.1068/htjr124.
Guerrero (2017) "Electron emission characteristics of lanthanum hexaboride hollow cathodes," PHD Candidacy Presentation, California Institute of Technology, Oct. 18, 2017, 31 pp.
Guerrero (2019) "Plasma-Surface Interactions in LaB6 Hollow Cathodes with Internal Xe Gas Discharges," PhD thesis defense presentation, California Institute of Technology, May 8, 2019, 65 pp.
Guerrero (2019) "Plasma surface interaction in LaB6 hollow cathodes with internal xenon gas discharges," Presentation, California Institute of Technology, Jan. 15, 2019, 29 pp.
Guerrero (2020) "Plasma-Surface Interactions in LaB6 Hollow Cathodes with Internal Xe Gas Discharges," presentation, Jul. 28, 2020, 42 pp.
Guerrero et al. (2020) "Plasma-Surface Interactions in Electric Thrusters," presentation, Oct. 12, 2020, 42 pp.
Guerrero et al. (2017) "Work function reduction in lanthanum hexaboride hollow cathodes operated in gas discharges," presentation, Oct. 10, 2017, 23 pp.
Guerrero et al. (2018) "Hollow cathode thermal modelling and self-consistent plasma solution: work function evaluation for a LaB6 cathode," presentation, Jul. 9, 2018, 43 pp.

* cited by examiner

La termination (cationic)   B termination (anionic)

METHOD AND APPARATUS FOR REDUCING THE WORK FUNCTION OF POLYCRYSTALLINE METAL HEXABORIDE

STATEMENT REGARDING FEDERALLY SPONSORED RESEARCH OR DEVELOPMENT

This invention was made with government support under Grant Number 80NM0018D004, awarded by NASA (JPL). The government has certain rights in the invention.

BACKGROUND OF INVENTION

The phenomenon of thermionic emission of charge carriers from a surface is utilized in a wide variety of applications, including material characterization techniques such as electron microscopes, microfabrication techniques such as electron lithography systems, and propulsion systems such as electric propulsion (EP) systems. Electric propulsion is a type of space propulsion that relies on accelerating plasma at high speed. Plasma is generated by the interaction of electrons with inert gases. The electrons can be produced via thermionic emission from specialized thermionic emitters, such as those in the form of hollow cathodes. The lifetime of a thermionic emitter is fundamental for thruster operation and for success of space missions.

A key aspect of a material used for thermionic emission is its work function, or energy necessary to release electrons from the material surface. The work function of the material's surface determines the operating temperatures of thermionic emitters, which in turn determine their lifetime. Therefore, identifying low work function materials that enable thermionic emitter operation at lower temperatures is of central interest to EP engineering.

To this end, lanthanum hexaboride ($LaB_6$) is a commonly used material as a thermionic electron emitter in vacuum and plasma devices including hollow cathodes. $LaB_6$ is a crystalline material whose work function depends on the surface chemistry and crystallographic orientation. Among different crystal planes, the (100) crystal of $LaB_6$ is thought to exhibit the lowest work function. However, manufacturing single (100) crystal $LaB_6$ is technically challenging, costly, and most importantly, limited to flat geometries. However, various applications may benefit from or require more complex geometries, such as an axisymmetric insert geometry, which cannot be achieved using a single crystal $LaB_6$. Accordingly, EP systems with hollow cathodes, for example, with $LaB_6$ inserts have used polycrystalline $LaB_6$ in order to conform to the hollow cathode geometry. Polycrystalline $LaB_6$ can be manufactured in different geometries and at lower costs, but the polycrystalline $LaB_6$ currently used for thermionic emitters exhibits worse work function properties than single crystalline $LaB_6$ because the polycrystalline surface is composed of random crystallographic orientation.

Disclosed herein are methods for treating polycrystalline materials and electrode that address these and other challenges.

SUMMARY OF THE INVENTION

Provided herein are methods for treating a polycrystalline material to reduce its work function. For example, the polycrystalline material may have the composition $MB_6$, where M is a metal element, such as, but not limited to, La. The reduced work function has advantages of reducing the amount of energy input required in order to initiate thermionic emission from the polycrystalline material, such as polycrystalline $MB_6$, where M is a metal element such as La. The treatment includes exposing a surface of the polycrystalline material to a plasma, which changes the surface of the polycrystalline material from having a starting condition (e.g., lack of crystalline texture) to a treated condition (e.g., having a degree of crystalline texture and a reduced work function compared to starting condition). The methods disclosed herein provide a cost-efficient way to combine the advantage of single crystalline thermionic emitters such as $LaB_6$, namely low work function, with the advantages of polycrystalline thermionic emission materials such as $LaB_6$, including conformability and reduced cost compared to preparing single crystalline thermionic emitters. Also disclosed herein are electrodes having a polycrystalline material with a surface characterized by a low work function, such as but not limited to 2.07 eV to 2.6 eV. Also disclosed herein are method for thermionic emission using electrodes or materials disclosed herein.

Aspects of the invention include a method for treating a polycrystalline material, the method comprising: exposing a surface of the polycrystalline material to a plasma thereby changing the surface of the polycrystalline material from being characterized by a starting condition to being characterized by a treated condition; wherein: the surface comprises a plurality of crystallites each having the composition $MB_6$, M being a metal element; the plasma comprises ions, the ions being characterized by an average ion flux selected from the range of 1.5 to 100 $A/cm^2$ and an average ion energy that is less than a sputtering threshold energy of the plurality of $MB_6$ crystallites of the surface in the presence of said plasma; the starting condition of the surface is characterized by a first average work function and the treated condition of the surface is characterized by a second average work function; and the second average work function is less than the first average work function. Optionally, in any embodiments disclosed herein, M is a transition metal element or an alkaline metal element. Optionally, in any embodiments disclosed herein, M is La, Ce, Sr, Ba, Y, Gd, Sm, Th, Ca, Ti, Zr, Ca, Ni, Ta, Cr, Mn, Fe, Sc, Hf, V, Nb, Mo, W, Tc, Re, Ru, Os, Co, Rh, Ir, Ni, Pd, Pt, Li, Na, K, Be, Ca, Mg, Sr, Ba, Al, Si, B, or any combination of these. Optionally, in any embodiments disclosed herein, M is La, Ce, Sr, Ba, Y, Gd, Sm, Th, Ca, or any combination of these. Preferably, but not necessarily, in any embodiments disclosed herein, M is La or Ce such that the plurality of crystallites each have the composition $LaB_6$ or $CeB_6$. Optionally in any embodiments disclosed herein, plasma comprises ions characterized by an average ion energy selected from the range of 10 to a sputtering threshold energy of the plurality of $MB_6$ crystallites of the surface in the presence of said plasma and an average ion flux selected from the range of 1.5 to 100 $A/cm^2$. Optionally in any embodiments disclosed herein, the average ion energy is selected from the range of 10 eV to 25% of the sputtering threshold energy, optionally selected from the range of 25% to 50% of the sputtering threshold energy, optionally selected from the range of 50% to 75% of the sputtering threshold energy, optionally selected from the range of 75% to 100% of the sputtering threshold energy, optionally selected from the range of 10% to 100% of the sputtering threshold energy, optionally selected from the range of 10% to 99% of the sputtering threshold energy, optionally selected from the range of 25% to 99% of the sputtering threshold energy, the sputtering threshold energy being the sputtering threshold energy of the plurality of $MB_6$ crystallites of the surface in the presence of said plasma, and the ions thereof, characterized by said average ion energy and said average ion flux. Optionally in any embodiments disclosed herein, the average ion energy is selected from the range of 10 eV to 35 eV, optionally 25 eV to 35 eV, optionally 27 eV to 33 eV. For example, optionally in any embodiments disclosed herein, the average ion energy is selected from the range of 10 eV to 35 eV, wherein the ions of the plasma are Xe ions and M is La. Optionally in any embodiments disclosed herein, the average ion flux is selected from the range of 1.5 to 100 A/cm$^2$, or any value or range therebetween inclusively, such as 1.5 to 75 A/cm$^2$, 1.5 to 50 A/cm$^2$, 1.5 to 25 A/cm$^2$, 1.5 to 10 A/cm$^2$, 1.5 to 5 A/cm$^2$, or 1.5 to 4.5 A/cm$^2$. Optionally, in any embodiments disclosed herein, said ions of the plasma are characterized by said average ion flux (e.g., an average ion flux according to any of the embodiments disclosed) at the surface of the polycrystalline material, within 1 nm, within 5 nm within 10 nm, within 15 nm, within 20 nm, within 25 nm, within 30 nm, within 50 nm, within 100 nm, within 200 nm, within 500 nm, within 1 μm, within 2 μm, within 5 μm, within 10 μm, within 50 μm, and/or within 100 μm of the surface of the polycrystalline material. Optionally, in any embodiments disclosed herein, said ions of the plasma are characterized by said average ion energy (e.g., an average ion energy according to any of the embodiments disclosed) at the surface of the polycrystalline material, within 1 nm, within 5 nm within 10 nm, within 15 nm, within 20 nm, within 25 nm, within 30 nm, within 50 nm, within 100 nm, within 200 nm, within 500 nm, within 1 μm, within 2 μm, within 5 μm, within 10 μm, within 50 μm, and/or within 100 μm of the surface of the polycrystalline material. Optionally, in any embodiments disclosed herein, the polycrystalline material has the composition $MB_6$, M being a metal element.

Optionally, in any embodiments disclosed herein, the polycrystalline material comprises a small amount of additives, substitutional dopants, interstitial dopants, and/or vacancies of M and/or of B, with respect to the total composition of the polycrystalline material. Optionally, in any embodiments disclosed herein, the small amount of additives, substitutional dopants, interstitial dopants, and/or vacancies (independently or in combination) in the polycrystalline material may be less than or equal to 5 at. %, optionally less than or equal to 4 at. %, optionally less than or equal to 3 at. %, optionally less than or equal to 2 at. %, optionally less than or equal to 1 at. %, optionally less than or equal to 0.9 at. %, optionally less than or equal to 0.8 at. %, optionally less than or equal to 0.7 at. %, optionally less than or equal to 0.6 at. %, optionally less than or equal to 0.5 at. %, optionally less than or equal to 0.3 at. %, optionally less than or equal to 0.1 at. %, optionally less than or equal to 0.01 at. %, optionally less than or equal to 0.001 at. %, optionally less than or equal to 0.0001 at. %, with respect to the total composition of the polycrystalline material. Optionally, in any embodiments disclosed herein, the small amount of additives, substitutional dopants, interstitial dopants, and/or vacancies (independently or in combination) in the polycrystalline material may be less than or equal to 5 wt. %, optionally less than or equal to 4 wt. %, optionally less than or equal to 3 wt. %, optionally less than or equal to 2 wt. %, optionally less than or equal to 1 wt. %, optionally less than or equal to 0.9 wt. %, optionally less than or equal to 0.8 wt. %, optionally less than or equal to 0.7 wt. %, optionally less than or equal to 0.6 wt. %, optionally less than or equal to 0.5 wt. %, optionally less than or equal to 0.3 wt. %, optionally less than or equal to 0.1 wt. %, optionally less than or equal to 0.01 wt. %, optionally less than or equal to 0.001 wt. %, optionally less than or equal to 0.0001 wt. %, with respect to the total composition of the polycrystalline material. Optionally, in any embodiments disclosed herein, any crystallite of the plurality of crystallites or an average composition of the plurality of crystallites may include a small amount of additives, substitutional dopants, interstitial dopants, and/or vacancies (independently or in combination), the small amount being less than or equal to 5 at. %, optionally less than or equal to 4 at. %, optionally less than or equal to 3 at. %, optionally less than or equal to 2 at. %, optionally less than or equal to 1 at. %, optionally less than or equal to 0.9 at. %, optionally less than or equal to 0.8 at. %, optionally less than or equal to 0.7 at. %, optionally less than or equal to 0.6 at. %, optionally less than or equal to 0.5 at. %, optionally less than or equal to 0.3 at. %, optionally less than or equal to 0.1 at. %, optionally less than or equal to 0.01 at. %, optionally less than or equal to 0.001 at. %, optionally less than or equal to 0.0001 at. %, with respect to the total composition of the crystallite or of average composition of the plurality of crystallites, respectively. Optionally, in any embodiments disclosed herein, any crystallite of the plurality of crystallites or an average composition of the plurality of crystallites may include a small amount of additives, substitutional dopants, interstitial dopants, and/or vacancies (independently or in combination), the small amount being less than or equal to 5 wt. %, optionally less than or equal to 4 wt. %, optionally less than or equal to 3 wt. %, optionally less than or equal to 2 wt. %, optionally less than or equal to 1 wt. %, optionally less than or equal to 0.9 wt. %, optionally less than or equal to 0.8 wt. %, optionally less than or equal to 0.7 wt. %, optionally less than or equal to 0.6 wt. %, optionally less than or equal to 0.5 wt. %, optionally less than or equal to 0.3 wt. %, optionally less than or equal to 0.1 wt. %, optionally less than or equal to 0.01 wt. %, optionally less than or equal to 0.001 wt. %, optionally less than or equal to 0.0001 wt. %, with respect to the total composition of the crystallite or of average composition of the plurality of crystallites, respectively.

Optionally, in any embodiments disclosed herein, all ions or the ensemble of ions of the plasma are characterized by any average ion flux and/or any average ion energy disclosed herein. Optionally, in any embodiments disclosed herein, at least 90% of all ions or of the ensemble of ions of the plasma are characterized by any average ion flux and/or any average ion energy disclosed herein. Optionally, in any embodiments disclosed herein, at least 90% of all ions or of the ensemble of ions of the plasma present within 50 nm, within 100 nm, within 500 nm, within 1 μm, within 5 μm, within 10 μm, within 100 μm, within 1000 μm, within 10 mm, within 100 mm, within 1 cm, within 10 cm, or within 1 m are characterized by any average ion flux and/or any average ion energy disclosed herein.

Generally, the ions of the plasma are ionization products of one or more gases. Optionally, in any embodiments disclosed herein, the ions of the plasma are ionization products of one or more gases, the one or more gases comprising $CH_2$, $BCl_3$, $Cl_2$, $CF_4$, $CHF_3$, HBr, $O_2$, $NCl_3$, $SiF_4$, $NF_3$, HCl, $H_2$, $C_2F_6$, $C_3F_8$, $SiCl_4$, SiCl, $SF_6$, $N_2$, He, Ne, Ar, Kr, Xe, or any combination of these. Ionization products of one or more gas species include singly, doubly, triply, etc., charged ions. Optionally, in any embodiments disclosed herein, at least 80%, at least 90%, at least 95%, at least 99%, or at least 99.9% of the ions of the plasma are ionization products of one or more gases, the one or more gases comprising $CH_2$, $BCl_3$, $Cl_2$, $CF_4$, $CHF_3$, HBr, $O_2$, $NCl_3$, $SiF_4$, $NF_3$, HCl, $H_2$, $C_2F_6$, $C_3F_8$, $SiCl_4$, SiCl, $SF_6$, $N_2$, He, Ne, Ar, Kr, Xe, or any combination of these. Optionally, in any embodiments disclosed herein, at least 80%, at least 90%, at least 95%, at least 99%, or at least 99.9% of the ions of the plasma are ionization products of one or more gases, the one or more gases comprising $N_2$, He, Ne, Ar, Kr, Xe, or any combination of these. Optionally, in any embodiments disclosed herein, at least 80%, at least 90%, at least 95%, at least 99%, or at least 99.9% of the ions of the plasma are N ions, He ions, Ne ions, Ar ions, Kr ions, and/or Xe ions. Optionally, in any embodiments disclosed herein, the ions have the average ion energy and the average ion flux within 100 nm from the surface. Optionally, in any embodiments disclosed herein, the surface is characterized by a temperature selected from the range of −273° C. to 2000° C., or any value or range therebetween inclusively, such as −200° C. to 2000° C., −100° C. to 2000° C., −50° C. to 2000° C., 0° C. to 2000° C., 20° C. to 2000° C., 100° C. to 2000° C., 1000° C. to 2000° C., 1100° C. to 1500° C., 1200° C. to 1400° C., or 1250° C. to 1350° C., during the step of exposing. Optionally, in any embodiments disclosed herein, the step of exposing is performed for a time selected from the range of 1 nanosecond (ns) to 100 hours, or any value or range therebetween inclusively, such as 1 ns to 1 minutes 1 ns to 24 hours, 1 ns to 10 minutes, 10 minutes to 24 hours, 10 minutes to 15 hours, 10 minutes to 10 hours, 10 minutes to 5 hours, 1 hour to 24 hours, 1 hour to 15 hours, 1 hour to 10 hours, 4 hours to 11 hours, or 5 hours to 10 hours. With respect to short exposure times such as about 1 ns, pulsed plasma is of industrial interest and can create dense plasma (high ion flux) and therefore process a sample quickly to reduce cost. Optionally, in any embodiments disclosed herein, the step of changing comprises etching the surface due to exposure of the surface to the plasma.

Optionally, in any embodiments disclosed herein, the starting condition of the surface is further characterized by a first degree of crystalline texture and the treated condition of the surface is further characterized by a second degree of crystalline texture; and wherein the second degree of crystalline texture is greater than the first degree of crystalline texture. Optionally, in any embodiments disclosed herein, the starting condition of the surface is characterized by being free of crystalline texture and wherein the treated condition of the surface is characterized by having crystalline texture. Optionally, in any embodiments disclosed herein, the surface having the treated condition is characterized by the preferred crystalline orientation being (100). Optionally, in any embodiments disclosed herein, the second average work function is less than the first average work function by a value greater than 0 eV and less than or equal to 0.6 eV. Optionally, in any embodiments disclosed herein, the second average work function is less than the first average work function by a value selected from the range of 0.2 eV to 0.6 eV, 0.2 eV to 0.5 eV, 0.3 eV to 0.6 eV, 0.3 eV to 0.5 eV, or 0.35 eV to 0.45 eV. Optionally, in any embodiments disclosed herein, the second average work function is selected from the range of 2.07 eV to 2.6 eV, 2.07 eV to 2.5 eV, 2.07 eV to 2.4 eV, 2.07 eV to 2.35 eV, 2.15 eV to 2.35 eV, 2.15 eV to 2.5 eV, or 2.15 eV to 2.6 eV. Optionally, in any embodiments disclosed herein, the treated condition of the surface persists for at least 24 hours, preferably at least 30 days, more preferably at least 300 days, after the step of exposing is terminated (i.e., in the absence of exposure to plasma) and in the presence of air, vacuum, or outer space. Optionally, in any embodiments disclosed herein, each of at least 75%, each of at least 85%, each of at least 90%, each of at least 95%, or each of at least 99% of crystallites of the surface have the composition $MB_6$.

Optionally, in any embodiments disclosed herein, the polycrystalline material is a part of an electrode of a device. Optionally, in any embodiments disclosed herein, the surface has a cylindrical or axisymmetric or other three-dimensional contour. Optionally, in any embodiments disclosed herein, a surface area of the surface of the polycrystalline material exposed to the plasma at any one point in time during the step of exposing is at least 10 nm$^2$, optionally at least 100 nm$^2$, optionally at least 1 μm$^2$, optionally at least 10 μm$^2$, optionally at least 100 μm$^2$, optionally at least 1 mm$^2$, optionally at least 10 mm$^2$, optionally at least 1 cm$^2$, optionally at least 10 cm$^2$, optionally at least 100 cm$^2$, optionally selected from the range of 10 nm$^2$ to 1 m$^2$, optionally 1 mm$^2$ to 1 m$^2$, optionally 1 cm$^2$ to 1 m$^2$, optionally 10 mm$^2$ to 10 cm$^2$.

Aspects of the invention include an electrode of a device, the electrode comprising: a polycrystalline material comprising a surface; wherein: the surface comprises a plurality of crystallites each having the composition $MB_6$, M being a metal element; the surface is characterized by crystalline texture and a work function selected from the range of range of 2.07 eV to 2.6 eV. Optionally, in any embodiments disclosed herein, M is a transition metal element or an alkaline metal element. Optionally, in any embodiments disclosed herein, M is La, Ce, Sr, Ba, Y, Gd, Sm, Th, Ca, Ti, Zr, Ca, Ni, Ta, Cr, Mn, Fe, Sc, Hf, V, Nb, Mo, W, Tc, Re, Ru, Os, Co, Rh, Ir, Ni, Pd, Pt, Li, Na, K, Be, Ca, Mg, Sr, Ba, Al, Si, B, or any combination of these. Optionally, in any of the embodiments herein, M is La, Ce, Sr, Ba, Y, Gd, Sm, Th, Ca, or any combination of these. Optionally, in any embodiments disclosed herein, the second average work function is selected from the range of 2.07 eV to 2.6 eV, 2.07 eV to 2.5 eV, 2.07 eV to 2.4 eV, 2.07 eV to 2.35 eV, 2.15 eV to 2.35 eV, 2.15 eV to 2.5 eV, or 2.15 eV to 2.6 eV. Optionally, in any embodiments disclosed herein, the surface has a cylindrical or axisymmetric or other three-dimensional contour. Optionally, in any embodiments disclosed herein, each of at least 75%, each of at least 85%, each of at least 90%, each of at least 95%, or each of at least 99% of crystallites of the surface have the composition $MB_6$. Optionally, in any embodiments disclosed herein, the surface has the treated condition is characterized by the preferred crystalline orientation being (100). Optionally, in any embodiments disclosed herein, the electrode is an electron source or electron emission electrode. Optionally, in any embodiments disclosed herein, the electrode is a thermionic cathode. Optionally, in any embodiments disclosed herein, the electrode is a hollow cathode. Optionally, in any embodiments disclosed herein, device is an electron beam pumped laser, a thermionic energy converter, a ion beam source, a halogen atomic beam detector, a negative ion surface ionizer, a scanning electron microscope, a transmission electron microscope, an electron probe, a scanning Auger system, an electron lithography system, a thermionic electron emitter, an electric thruster or electron propulsion system, vacuum tube, fluorescent tube, microwave oven, microwave tube, lithography device, electron-beam welder, X-ray source, free electron laser, neon light, cold-cathode fluorescent lamp, thyratron tube, and/or a magnetron tube.

Aspects of the invention include a method for using an electrode for thermionic emission, the method comprising: applying a voltage, current, and/or heat to the electrode sufficient to cause thermionic emission of electrons from a surface of a polycrystalline material of the electrode; wherein: the electrode comprises the polycrystalline material and the polycrystalline material comprises the surface; the surface comprises a plurality of crystallites each having the composition $MB_6$, M being a metal element; and the surface is characterized by crystalline texture and a work function selected from the range of range of 2.07 eV to 2.6 eV. Optionally, in any embodiments disclosed herein, M is a transition metal element or an alkaline metal element. Optionally, in any embodiments disclosed herein, M is La, Ce, Sr, Ba, Y, Gd, Sm, Th, Ca, Ti, Zr, Ca, Ni, Ta, Cr, Mn, Fe, Sc, Hf, V, Nb, Mo, W, Tc, Re, Ru, Os, Co, Rh, Ir, Ni, Pd, Pt, Li, Na, K, Be, Ca, Mg, Sr, Ba, Al, Si, B, or any combination of these. Optionally, in any of the embodiments herein, M is La, Ce, Sr, Ba, Y, Gd, Sm, Th, Ca, or any combination of these. Optionally, in any embodiments disclosed herein, the second average work function is selected from the range of 2.07 eV to 2.6 eV, 2.07 eV to 2.5 eV, 2.07 eV to 2.4 eV, 2.07 eV to 2.35 eV, 2.15 eV to 2.35 eV, 2.15 eV to 2.5 eV, or 2.15 eV to 2.6 eV. Optionally, in any embodiments disclosed herein, the surface has a cylindrical or axisymmetric or other three-dimensional contour. Optionally, in any embodiments disclosed herein, each of at least 75%, each of at least 85%, each of at least 90%, each of at least 95%, or each of at least 99% of crystallites of the surface have the composition $MB_6$. Optionally, in any embodiments disclosed herein, the surface has the treated condition is characterized by the preferred crystalline orientation being (100). Optionally, in any embodiments disclosed herein, the electrode is an electron source or electron emission electrode. Optionally, in any embodiments disclosed herein, the electrode is a thermionic cathode. Optionally, in any embodiments disclosed herein, the electrode is a hollow cathode. Optionally, in any embodiments disclosed herein, device is an electron beam pumped laser, a thermionic energy converter, a ion beam source, a halogen atomic beam detector, a negative ion surface ionizer, a scanning electron microscope, a transmission electron microscope, an electron probe, a scanning Auger system, an electron lithography system, a thermionic electron emitter, an electric thruster or electron propulsion system, vacuum tube, fluorescent tube, microwave oven, microwave tube, lithography device, electron-beam welder, X-ray source, free electron laser, neon light, cold-cathode fluorescent lamp, thyratron tube, and/or a magnetron tube.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
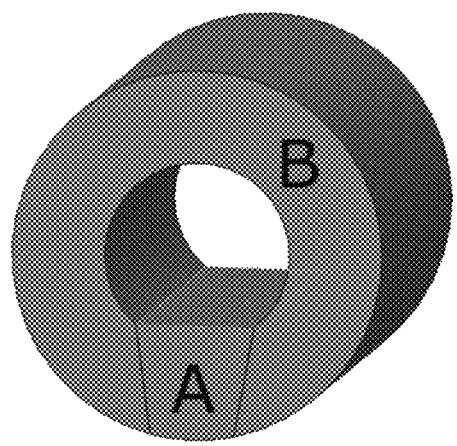
FIG. 1: Modified insert geometry used in this study. Total inner area available for thermoemission is reduced by 1.72% with respect to an unmodified cylindrical insert.

In general, the terms and phrases used herein have their art-recognized meaning, which can be found by reference to standard texts, journal references and contexts known to those skilled in the art. The following definitions are provided to clarify their specific use in the context of the invention.

The term "polycrystalline" refers to a material that has more than one crystallite, usually of varying sizes and orientations. The crystallites of a polycrystalline material can be characterized, for example, by a size distribution, an average size, and crystalline texture, or lack thereof. In contrast, a single-crystalline material is a single crystal.

The term "crystallite" refers to a single crystalline volume of a solid material having one crystal structure throughout said volume. Generally, but not necessarily, a single crystallite has one uniform chemical composition throughout said volume, optionally excluding minority additives or dopant species which may be non-uniformly distributed. For example, a crystallite having the composition $MB_6$, wherein M is a metal element such as La, may include a small amount of additives, substitutional dopants, interstitial dopants, and/or vacancies (e.g., of M and/or of B), and still be characterized as having the composition $MB_6$, as would be understood by one of skill in the art. Optionally, for example, the small amount of additives, substitutional dopants, interstitial dopants, and/or vacancies (independently or in combination) in a crystallite having the composition $MB_6$ may be less than or equal to 5 at. %, optionally less than or equal to 4 at. %, optionally less than or equal to 3 at. %, optionally less than or equal to 2 at. %, optionally less than or equal to 1 at. %, optionally less than or equal to 0.9 at. %, optionally less than or equal to 0.8 at. %, optionally less than or equal to 0.7 at. %, optionally less than or equal to 0.6 at. %, optionally less than or equal to 0.5 at. %, optionally less than or equal to 0.3 at. %, optionally less than or equal to 0.1 at. %, optionally less than or equal to 0.01 at. %, optionally less than or equal to 0.001 at. %, optionally less than or equal to 0.0001 at. %, with respect to the total composition of the crystallite. Optionally, for example, the small amount of additives, substitutional dopants, interstitial dopants, and/or vacancies (independently or in combination) in a crystallite having the composition $MB_6$ may be less than or equal to 5 wt. %, optionally less than or equal to 4 wt. %, optionally less than or equal to 3 wt. %, optionally less than or equal to 2 wt. %, optionally less than or equal to 1 wt. %, optionally less than or equal to 0.9 wt. %, optionally less than or equal to 0.8 wt. %, optionally less than or equal to 0.7 wt. %, optionally less than or equal to 0.6 wt. %, optionally less than or equal to 0.5 wt. %, optionally less than or equal to 0.3 wt. %, optionally less than or equal to 0.1 wt. %, optionally less than or equal to 0.01 wt. %, optionally less than or equal to 0.001 wt. %, optionally less than or equal to 0.0001 wt. %, with respect to the total composition of the crystallite. A crystallite may be a crystalline grain, for example, within a material such as a thin film or bulk material. Each crystallite in a polycrystalline material, such as a film, may be separated from other crystallites by one or more surfaces, one or more grain boundaries (e.g., dislocations), one or more amorphous regions, one or more areas or volumes having different chemical composition, one or more areas or volumes having different crystal structure or polymorph or phase, or any combination of these. In some embodiments, a crystallite is a volume contained by one or more surfaces, one or more grain boundaries (e.g., dislocation), one or more amorphous regions, one or more areas or volumes having different chemical composition, one or more areas or volumes having different crystal structure or polymorph or phase, or any combination of these. Descriptions, herein, of crystallite sizes and particle sizes refer empirically-derived size characteristics of crystallites and particles, respectively, based on, determined by, or corresponding to data from any art-known technique or instrument that may be used to determine a crystallite size, such as x-ray diffraction (XRD) and electron microscopy (SEM and/or TEM). Generally, to the extent not inconsistent with definitions and descriptions herein, the terms grain boundary, surface, crystallite, amorphous, particle, and thin film have meanings recognized by one of skill in the art of materials science.

Generally, to the extent not inconsistent with definitions and descriptions herein, the terms grain boundary, surface, crystallite, amorphous, particle, and thin film have meanings recognized by one of skill in the art of materials science.

In embodiments, a size characteristic corresponds to a physical dimension, such as a cross-sectional size (e.g., length, width, thickness, diameter).

As used herein, the term "plasma" refers the same term of art in the field of physics. Generally, a plasma is a fourth state of matter in which an ionized gaseous substance is highly electrically conductive to the point that long-range electric and magnetic fields dominate behavior of the matter. Plasma can be described as an electrically neutral medium (the overall charge of a plasma is approximately zero) of unbound positive and negative particles, including ions and electrons. Generally, a plasma may be generated by adding excess energy to a gas allowing for ionization of atoms in the gas. A plasma comprises ions that are ionization products of one or more gases, the ionization products being ions formed as a result of ionizing one or more gases as part of process(es)/mechanism(s) of creating and/or maintaining a plasma. Ionization products of one or more gas species include singly, doubly, triply, etc., charged ions. Generally, an average ion flux of ions of a plasma refers to an average ion flux at or near a surface (e.g., those reaching a surface). When a plasma is bound by a solid, the plasma's volume comprises a region referred to in the art as the bulk plasma and a region referred to in the art as a sheath of the plasma. The sheath is a region of the plasma that permits the transition from the bulk of the plasma to the solid that is bounding it. Generally, the plasma properties in the bulk and in the sheath are different. Ions reach a bounding solid material cross the sheath, and the sheath thus characterizes or comprises an amount of ions reaching the solid and their energies. The flux of ions and their energies are computed with art-known computational methodologies and universal models. Description of these models can be found in the following papers, each of which is incorporated herein by reference in its entirety to the extent not inconsistent herewith: (1) I. G. Mikellides, et al., 2005 "Hollow cathode theory and experiment. II. A two-dimensional theoretical model of the emitter region", Journal of Applied Physics 98, 113303 (2005), doi 10.1063/1.2135409; (2) I. G. Mikellides, et al., 2008, "Wear Mechanisms in Electron Sources for Ion Propulsion, II: Discharge Hollow Cathode", Journal of Propulsion and Power 2008 24:4, 866-879, doi 10.2514/1.33462); (3) I. G. Mikellides, et al., 2008, "Wear Mechanisms in Electron Sources for Ion Propulsion, I: Neutralizer Hollow Cathode", Journal of Propulsion and Power 2008 24:4, 855-865, doi 10.2514/1.33461; and (4) I. G. Mikellides, 2009, "Effects of viscosity in a partially ionized channel flow with thermionic emission", Physics of Plasmas 16, 013501 (2009), doi 10.1063/1.3056397. The flux of ions computes how many ions per unit area arrive to a surface of a material. The energy of the ions describes their energy at a point of contact of an ion with a surface of the material. In order to compute the flux and energy of the ions, first properties of the bulk of the plasma are contemplated. Here, the universal fluid description of plasmas is used to compute those properties (see Braginskii, 1965, "Transport Processes in a Plasma" Reviews of Plasma Physics, Volume 1. Authorized translation from the Russian by Herbert Lashinsky, University of Maryland, USA. Edited by M. A. Leontovich. Published by Consultants Bureau, New York, 1965, p. 205, available at https://ui.adsabs.harvard.edu/abs/1965RvPP . . . 1 . . . 205B). Then the state of the art sheath theory is used (see: S. D Baalrud, "Interaction of biased electrodes and plasmas: sheaths, double layers, and fireballs" 2020 Plasma Sources Sci. Technol. 29 053001 doi 10.1088/1361-6595/ab8177; C. A. Ordonez, "Sheath and Presheath Potentials for Anode, Cathode and Floating Plasma-Facing Surfaces," J. Appl. Phys., 1993 doi 10.1063/1.369845; S. D Baalrud, "Kinetic theory of the presheath and the Bohm criterion", 2011 Plasma Sources Sci. Technol. 20 025013 doi 10.1088/0963-0252/20/2/025013; and B Scheiner, "Theory of the electron sheath and presheath", Physics of Plasmas 22, 123520 (2015) doi 10.1063/1.4939024) to compute how many of the plasma bulk ions leave the bulk of the plasma and are directed towards the surface of the material. Using the same theory, their energy is computed. Each of the references mentioned or described herein is incorporated herein by reference in its entirety to the extent not inconsistent herewith.

The term "sputtering threshold energy" refers to a threshold or minimum energy of ions of a plasma necessary to sputter atoms and/or clusters of atoms from a material's surface that is exposed to the plasma. In other words, a plasma's ions characterized by an ion energy greater than or equal to a material's sputtering threshold energy can transfer enough energy to atoms and/or clusters of atoms at the material's surface to sputter, break-free, or otherwise release the atoms from the material's surface.

The term "metal element" refers to a metal element of the Periodic Table of Elements. The term "transition metal element" refers to a metal element from the category of transition metal elements (preferably an element whose atom has a partially filled d sub-shell, or which can give rise to cations with an incomplete d sub-shell) of the Periodic Table of Elements, including lanthanide and actinide elements. Optionally, as used herein, the term "metal element" includes elements that are metalloids. Optionally, metalloid elements include B, Si, Ge, As, Sb, Te, Po, At, and Se.

The terms "workfunction" and "work function" refer to the same terms of art in the field of solid-state physics. Generally, the work function is the minimum thermodynamic energy needed to remove an electron from a solid surface to a point in the vacuum immediately outside the solid surface, wherein "immediately" means that the final electron position is far from the surface on the atomic scale, but still too close to the solid to be influenced by ambient electric fields in the vacuum. The work function of a material's surface depends on factors such as crystallite orientation.

As used herein, the term "etching" broadly refers to removal of atoms from a surface of a material. For example, exposing a surface of a material to a plasma may result in etching of the surface. One or more mechanisms or processes may facilitate the removal of atoms, such as, but not limited to, ion-assisted desorption and sputtering. When a material's surface is exposed to a plasma, ions of the plasma bombard the surface and release energy to atoms of the surface, which may result in desorption or otherwise release or ejection of the atoms from the surface.

The term "crystalline texture" or "crystallographic texture" refers to the same term of art in the field of materials science. Generally, crystalline texture refers to the distribution of crystallographic orientations of crystallites of a polycrystalline material. A sample in which these orientations are fully random is said to have no distinct texture. If crystallographic orientations of crystallites in a material are not random, but have some preferred orientation, then the material has a degree of texture. The degree of crystalline texture is dependent on the percentage of crystallites of the material having the preferred orientation. The presence of crystalline texture and degree of crystalline texture can be determined from data collected using techniques such as X-ray diffraction (XRD) and electron backscattering diffraction (EBSD).

The term "three-dimensional contour" refers to a characterization of physical aspects, namely shape or contour, of an object or material. A contour refers to the outline or bounding shape formed by the outer or bounding surface of an object or material. A three-dimensional contour is a contour having a three-dimensional geometric configuration, such that a three-coordinate system of physical space is required to fully describe or plot the position of all points of the entirety of the three-dimensional contour.

The term "thermionic emission" refers to the same term of art in the fields of physics and solid-state physics. Generally, thermionic emission is a process by which charge carriers (ions or electrons; preferably electrons) are emitted or liberated from a surface of a material in response to thermal energy input. Thermionic emission can occur if the thermal energy or temperature of the material is sufficient to overcome a work function, or energy barrier, of a surface of the material. Thermal energy is provided via heat transfer, and the source of heat can be one or more sources or processes such as direct heating, resisting heating, energetic particles (e.g., ion and/or electron bombardment), radiation source(s), any combination of these, or others. An electrode used for thermionic emission is also referred to in the art as a thermionic cathode, a hot cathode, or a thermionic emitter. An electrode used for thermionic emission comprises a material, such as a single crystal of $LaB_6$ or a polycrystalline $LaB_6$ material, having a surface from which thermionic emission occurs. An electrode used for thermionic emission may also comprise supporting components or features, such as a holder and optionally a source of heat, such as a heater and/or a filament or other conductor for resistive heating. The source of heat may be a component of a device without necessarily being a part of the electrode itself.

Additional information, including background information, may be found in the following references, each of which are incorporated herein by reference to the extent not inconsistent herewith: (i) P. Guerrero, J. Polk, M. H. Richter, A. L. Ortega, "Work function reduction in lanthanum hexaboride hollow cathodes operated in gas discharges," IEPC-2017-399, The 35th International Electric Propulsion Conference, Georgia Institute of Technology, USA, Oct. 8-12, 2017; (ii) P. Guerrero, I. G. Mikellides, J. E. Polk, D. I. Meiron, "Hollow cathode thermal modelling and self-consistent plasma solution: work function evaluation for a $LaB_6$ cathode," AIAA 2018-4511, 2018, doi 10.2514/6.2018-4511; (iii) P. Guerrero, J. E. Polk, E. X. Yan, D. I. Meiron, "LaB6 hollow cathode work function enhancement: insight into the chemical processes," IEPC-2019-A-172, 36th International Electric Propulsion Conference, University of Vienna, Austria, 2019; (iv) Guerrero Vela, Pedro Pablo (2019) "Plasma Surface Interactions in $LaB_6$ Hollow Cathodes with Internal Xe Gas Discharge," Dissertation (Ph.D.), California Institute of Technology. doi:10.7907/4CW7-2K35.

The term "insert" generally refers to a physical object, having physical dimensions, comprising a polycrystalline material having a surface comprising a plurality of crystallites each having the composition $MB_6$, M being a metal element, wherein at least a portion of said surface, or said at least a portion of said $MB_6$ crystallites thereof, is, was, may be, and/or can be treated via exposure to a plasma according to embodiments herein. Generally, various examples, experiments, and demonstrations described herein are performed providing an insert into a treatment or experimental setup, treating a surface of the insert via exposure of the surface to a plasma, with characteristics of the surface (e.g., compositions, dimensions, work function, etc.), characteristics of the plasma or its ions, and other conditions of the treatment being as described in the particular example, experiment, or demonstration, and then optionally removing the insert from the treatment or experimental system for subsequent testing or characterization.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Electric propulsion (EP) is a type of space propulsion that relies on accelerating plasma at high speed. Plasma is generated by the interaction of electrons with inert gases. Electrons are produced by specialized devices termed hollow cathodes. Hollow cathodes lifetime is fundamental for normal thruster operation and a vital factor for space missions.

Electron emission in hollow cathodes is achieved by using specialized materials, which serve as thermionic emitters. The most important property for emitter materials is the energy necessary to release electrons from the material surface. This energy barrier is termed work function. The material work function determines the operating temperatures of hollow cathodes, which in turn determine their lifetime. Therefore, identifying low work function materials that enable cathode operation at lower temperatures is of central interest to EP engineering. In addition to EP, electron sources are of a broad interest for a variety of industrial applications such as X-ray sources, electron beam pumped lasers, thermionic energy converters, ion beam sources, halogen atomic beam detectors, negative ion surface ionizers, scanning electrons microscopes, transmission microscopes, electron probes, scanning Auger systems and electron lithography systems.

Lanthanum hexaboride ($LaB_6$) is a commonly used material as a thermionic electron emitter in vacuum and plasma devices including hollow cathodes. $LaB_6$ is a crystalline material and as such, its work function depends on the surface chemistry and crystallographic orientation, with certain crystal planes having significantly lower work functions than others do. Among different crystal planes, the (100) crystal of $LaB_6$ is thought to exhibit the lowest work function. However, manufacturing single (100) crystal $LaB_6$ is technically challenging, costly, and most importantly, limited to flat geometries. As hollow cathodes require axisymmetric insert geometry, single crystal $LaB_6$ cannot be used as emitter materials in EP devices. So far, hollow cathodes with $LaB_6$ inserts have been using polycrystalline $LaB_6$. Polycrystalline $LaB_6$ can be manufactured in different geometries and at lower costs; however, it displays worse work function because the polycrystalline surface is composed of random crystal faces.

Figure 11:
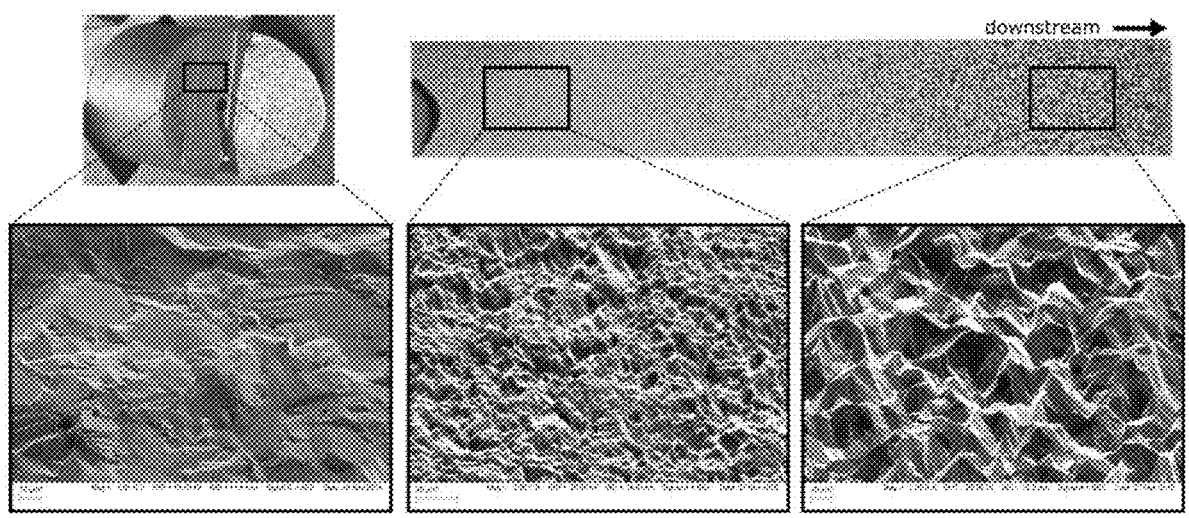
FIG. 11: On the left, SEM image collected from a sample after manufacturing. On the right, SEM pictures from the test sample after exposure to plasma. Note the slight difference in the scale of the images. The orientation of the test sample indicates the downstream end of the cathode (towards the orifice plate).

Disclosed herein are methods that enable texturing of polycrystalline surfaces of materials such as, but not limited to, $LaB_6$, surfaces to preferentially expose low work function crystals. This methods allow the creation of polycrystalline-based $LaB_6$ inserts of any geometry with improved work function that can be utilized in hollow cathodes for EP and industrial applications. As an illustrative example, a polycrystalline $LaB_6$ sample can be exposed to a plasma with specific parameters. Tunable parameters of the treatment, which can influence the resulting effects upon and changes of the surface of the polycrystalline material, include the surface temperature, average ion energy, average ion flux, and exposure time. Of these parameters, average ion flux and average ion energy may be most significant. As an illustrative example, the method can include 5 to 10 hour bombardment of a polycrystalline $LaB_6$ surface with xenon ions under the following exemplary conditions: surface temperature 1300° C., ion energy is 30 eV, ion flux is 2-4 $A/cm^2$. Exposure of the polycrystalline $LaB_6$ sample to xenon plasma in these conditions leads to the formation of a faceted surface visible to the naked eye and confirmed by scanning electron microscopy (FIG. 11). The polycrystalline samples can have a cylindrical or axisymmetric geometry, for example. Crystallographic analysis demonstrated that in contrast to untreated samples, plasma-exposed $LaB_6$ surfaces have a crystallographic orientation which is not random. Temperature measurements and UPS measurements show work function reduction, compared to initial work function of the surface prior to plasma treatment, by average values such as 0.4 eV. This value is a significant improvement over standard polycrystalline material and is comparable to the work function of single crystal cathodes.

Features and benefits of this invention include: new approach to enhance $LaB_6$ material properties; allowing the creation of reduced work function cathodes with geometrical freedom; reducing polycrystalline $LaB_6$ work function using this method allows the development of cathodes with improved lifetime for various EP and industrial applications; providing a cost-effective alternative to single crystal $LaB_6$ cathodes with similar performance.

This is an entirely new way of producing low work function surfaces for high performance cathodes. Current state-of-the-art technologies rely on growing single crystal $LaB_6$ billets and mechanically cleaving them to expose the low work function surface. The existing technology suffers from two disadvantages. First, growing large single crystals is much more expensive than making polycrystalline material. Second, this processing of single crystals cannot be used for complex geometries (such as the cylindrical geometry used in hollow cathodes for plasma sources). The methods disclosed herein provide the same performance as single crystals using less expensive material and does not require a planar geometry.

$LaB_6$ cathodes have been used as electron sources for electric thrusters, which are used for propulsion on NASA deep space missions as well as commercial communications satellites. $LaB_6$ emitters are also used commercially in many devices such as X-ray sources, electron beam pumped lasers, thermionic energy converters, ion beam sources, halogen atomic beam detectors, negative ion surface ionizers, scanning electrons microscopes, transmission microscopes, electron probes, scanning Auger systems and electron lithography systems.

The invention can be further understood by the following non-limiting examples.

Example 1: $LAB_6$ Hollow Cathode Work Function Enhancement: Insight into the Chemical Processes $LaB_6$ hollow cathodes have demonstrated robust performance as electron emitters for electric propulsion applications. Cathodes based on polycrystalline $LaB_6$ material can exhibit a transient thermal behavior during the first 50 hr of operation that is attributed to a reduction in the work function of the cathode emitter. A self-consistent thermal-plasma model is determined and confirmed that the reduction in the work function, estimating it at ~2.25 eV. This value is much lower than the polycrystalline work function value for $LaB_6$ of 2.67 eV. In this Example, possible chemical reasons are contemplated for such improvements and study them with chemical analysis. The hypotheses for the reduction include crystallographic evolution of the polycrystalline sample, phase change of the emitting surface, forced lanthanum termination of naturally occurring boron-terminated crystals and chemical poisoning of the surface. In order to investigate these hypotheses, a modified insert is designed and built which contains a small portion of flat emitting surface exposed to the collisional plasma in the cathode interior. This small piece was built to be removable and therefore extractable from the cathode and place it inside an ultraviolet photoelectron spectrometer (UPS) for work function measurements, electron backscatter and an X-ray diffractometer for crystallographic measurements, secondary electron microscope for morphology identification, and a profilometer for topology characterization. The results from these analyses allowed us to characterize the morphological and chemical modification resulting from the action of the plasma on the emitting surfaces of a $LaB_6$ cathode running at 25 A and 13 sccm. They also aided in isolating the mechanism behind the lowering of the work function. Work function measurements with UPS confirmed that the work function is reduced permanently after plasma exposure. However, there may also be secondary factors that further reduce the work function temporarily during operation, such as forced La termination. No phase change was observed at the surface of the sample after cool down. Finally, observed is a crystallographic texture formed by the action of the ions impacting on the walls of the cathode emitter, which can explain the work function reduction. The work function reduction due to the action of the cathode plasma is a recently found phenomenon [1] which greatly benefits the lifetime of $LaB_6$ hollow cathodes. As a result of identifying the mechanism behind the reduction, is it possible to pre-process, for example, the inserts that will be used in space cathodes to yield the best possible lifetime. Similarly, the geometry of the cathode can be designed to make sure the beneficial crystallography is exposed throughout the lifetime of the cathode.

Electric propulsion (EP) plays a crucial role in space exploration, from satellite station keeping to deep space exploration. Ion thrusters and Hall effect thrusters have proven to be very useful tools, allowing us to reach further into the unknown. Furthermore, higher power technologies like the magnetoplasmadynamic (MPD) thrusters promise to increase the application range of EP devices [2]. Hollow cathodes are essential components for the performance of any of these thrusters, to such a great degree, that if the cathode fails prematurely, the whole thruster is rendered unusable.

Unfortunately, cathodes are complex devices which require a multiphysics approach to fully understand them. At the heart of the behavior of hollow cathodes is the cathode plasma which provides a conductive medium that connects the electron emission source to the thruster plasma or ion beam. The electron emitter provides the electrons necessary to sustain the cathode plasma and for the thruster operation. The materials used as electron emitters must share several characteristics; low work function, low evaporation rate and robustness to propellant impurities, among others. Several materials have been selected and tested throughout the years to be used as emitters. Two technologies are widely used today in electric thrusters, namely: BaO—W and $LaB_6$ [3].

Figure 29:
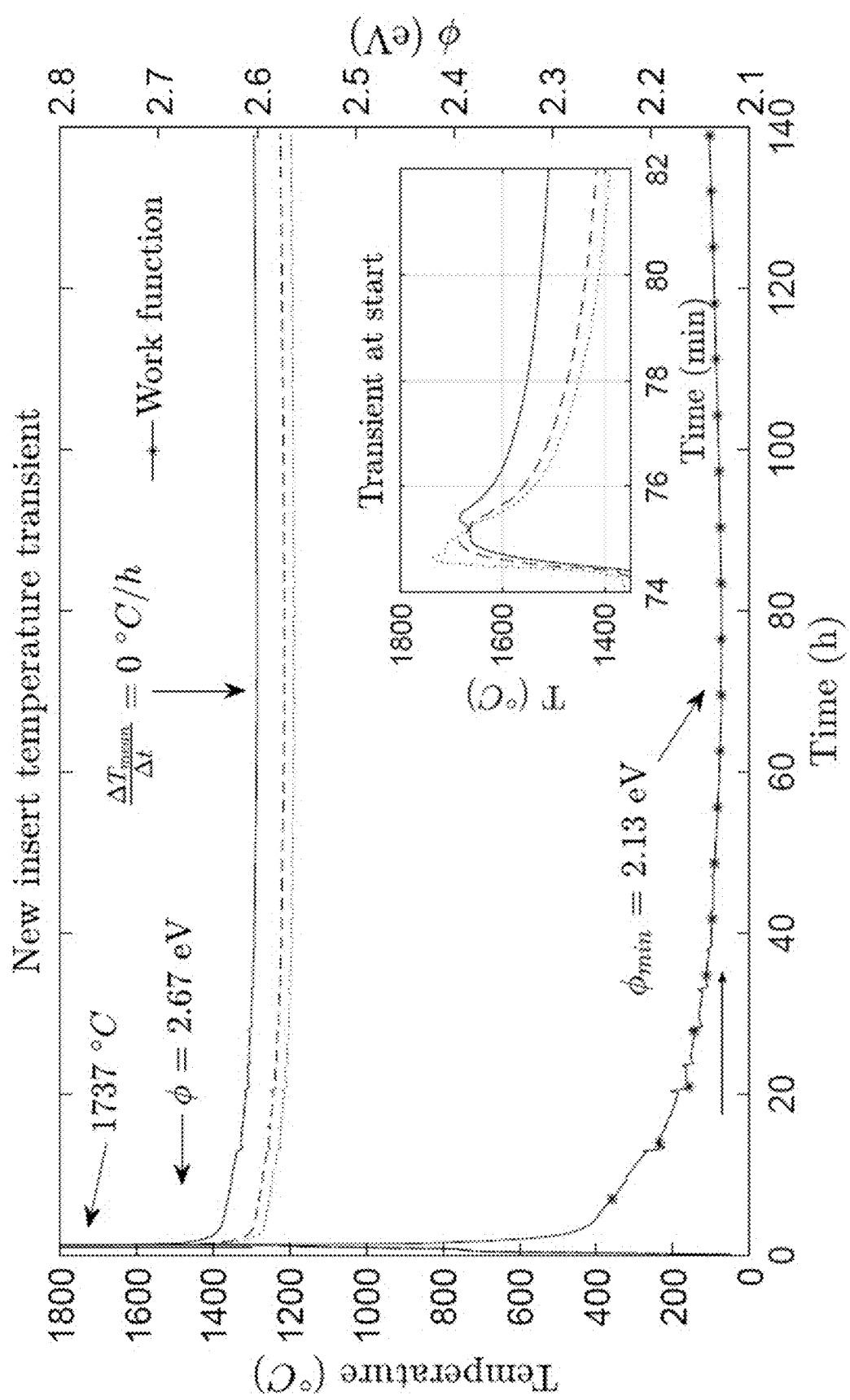
FIG. 29: Thermal transient and inferred work function for a new insert at $J_D$=25 A and $\dot{m}_{Xe}$=14.75 sccm with the nominal orifice. In the insert it is shown the details of the temperature transient during the first few minutes of operation after the discharge power supply has been enabled. This data shows work function reduction over time thanks to the plasma treatment. Different orifice plates creates different plasmas and therefore it shows that with the right plasma you can get the desired work function reduction. If the plasma is not intense enough then the work function reduction is not so significant (or it would take an unreasonable amount of time to decrease it significantly). The long thermal transient for a new insert could also be explained with this model, as the stoichiometry is $LaB_6$ when the insert is new and it will take some time for lanthanum to be deposited and diffuse into the insert. This data shows that the initial temperature after ignition of a new insert is consistent with a work function of 2.66 eV, but drops to 2.13 eV over a time scale of 40 to 50 hr.
Figure 30:
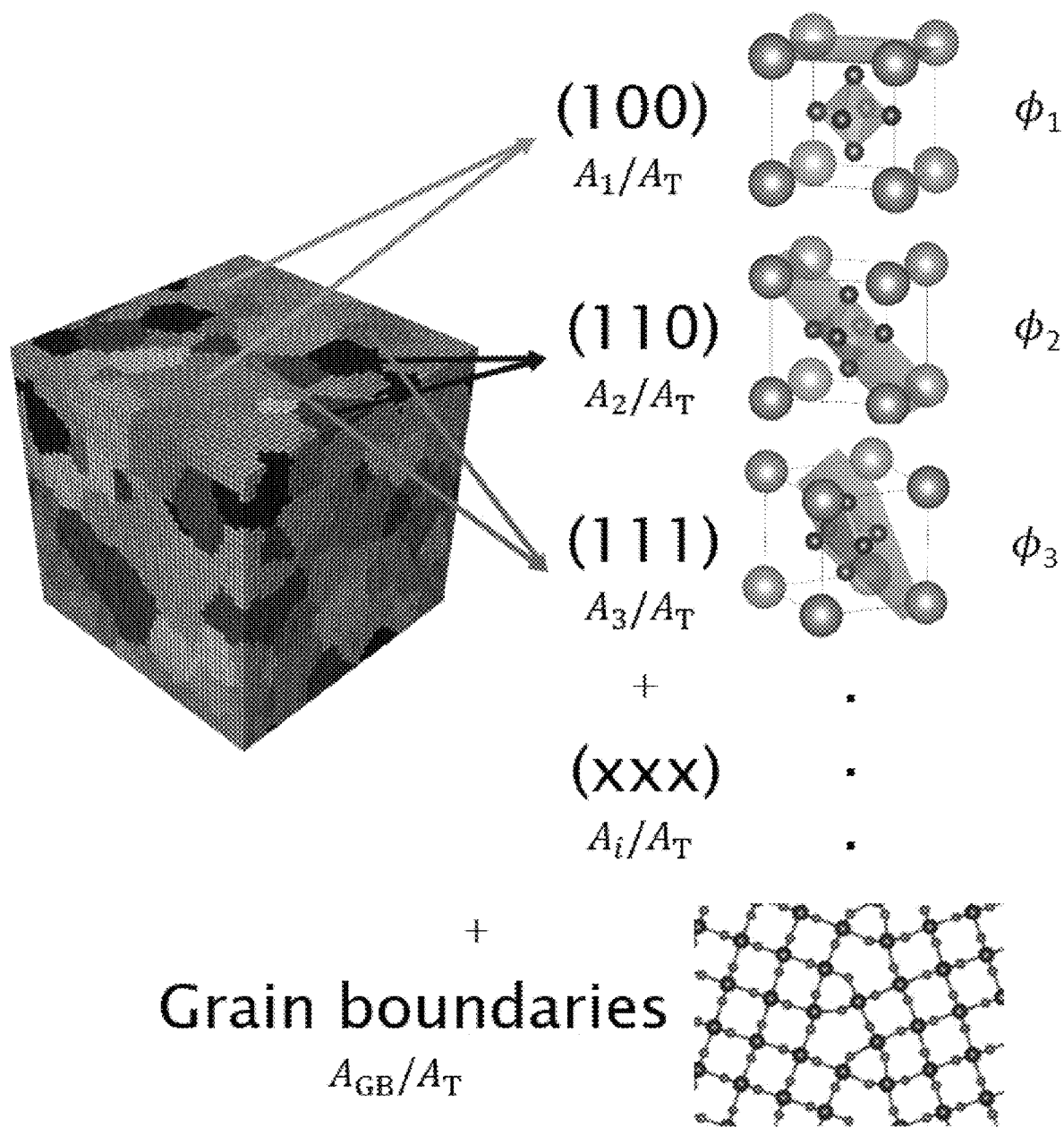
FIG. 30: Illustration showing a polycrystalline sample with various planes or crystallographic orientations being exposed at surfaces.
Figure 31A:
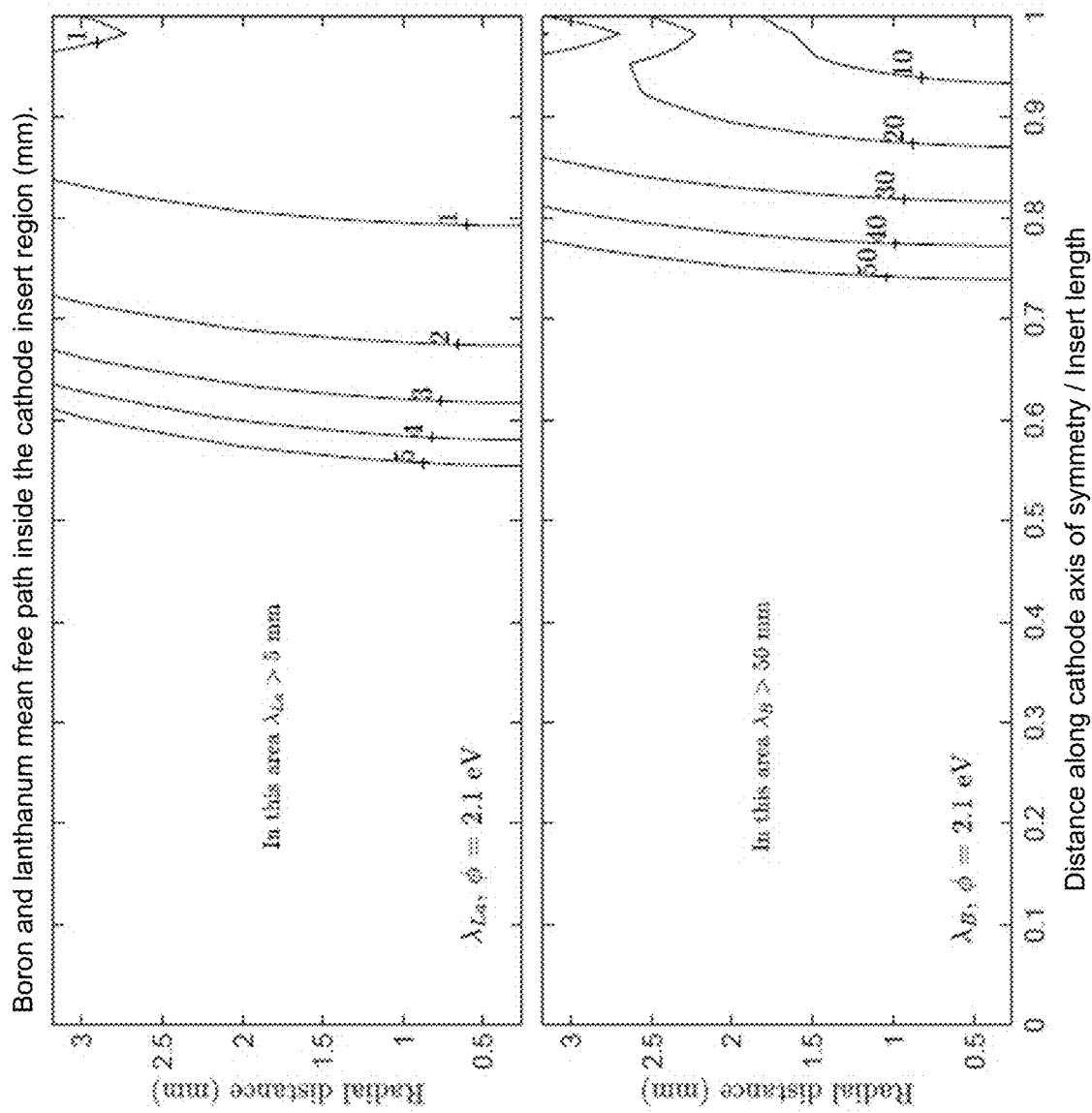
FIGS. 31A-31B: Mean free path ($\lambda$) estimation for boron ($\lambda_B$) and lanthanum ($\lambda_{La}$) in the insert region, $J_D$=25 A, $\dot{m}_{Xe}$=14.75 sccm and nominal orifice size. x/L refers to distance along cathode axis of symmetry divided by insert length. M
Figure 31B:
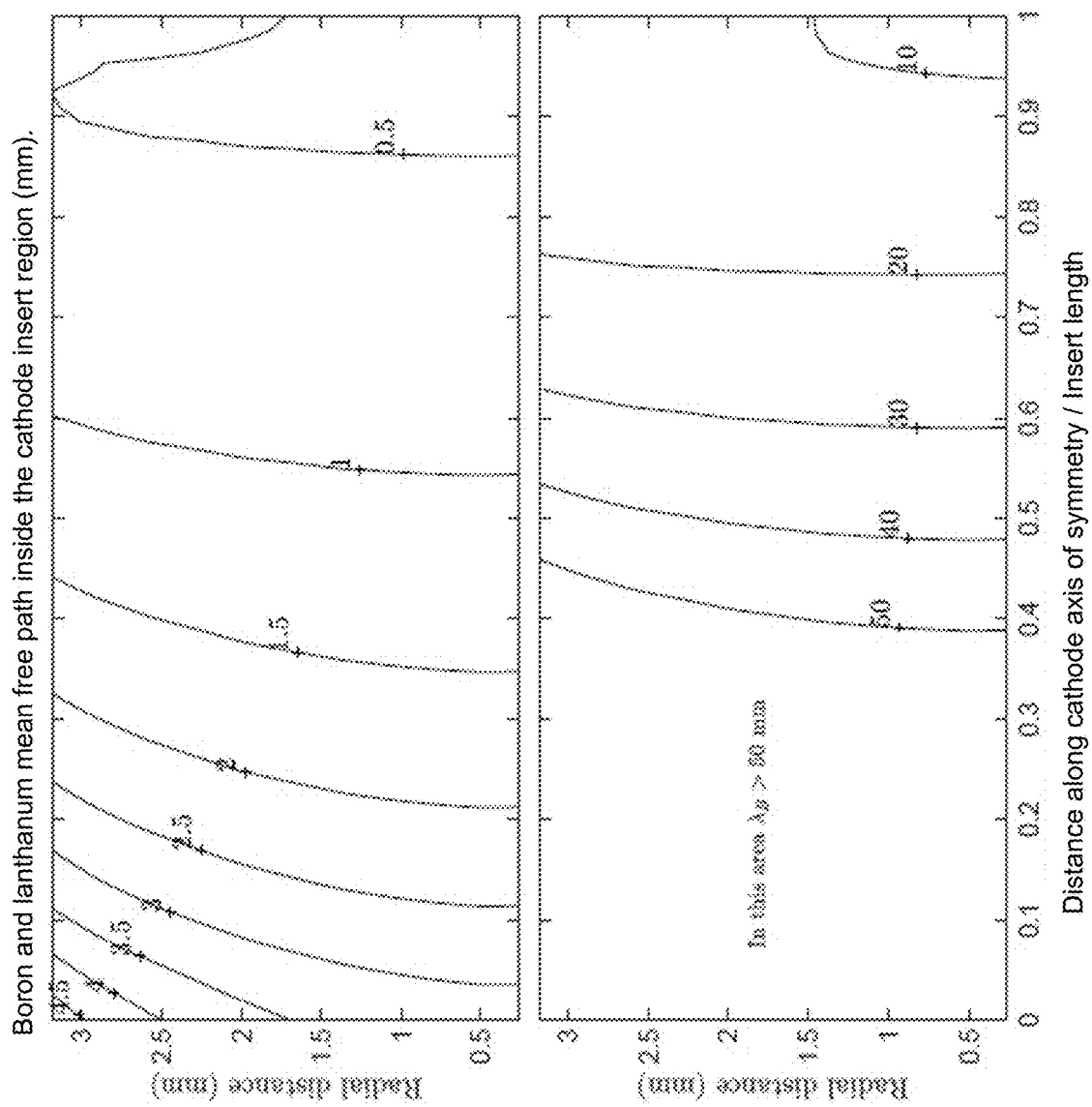
Figure 32:
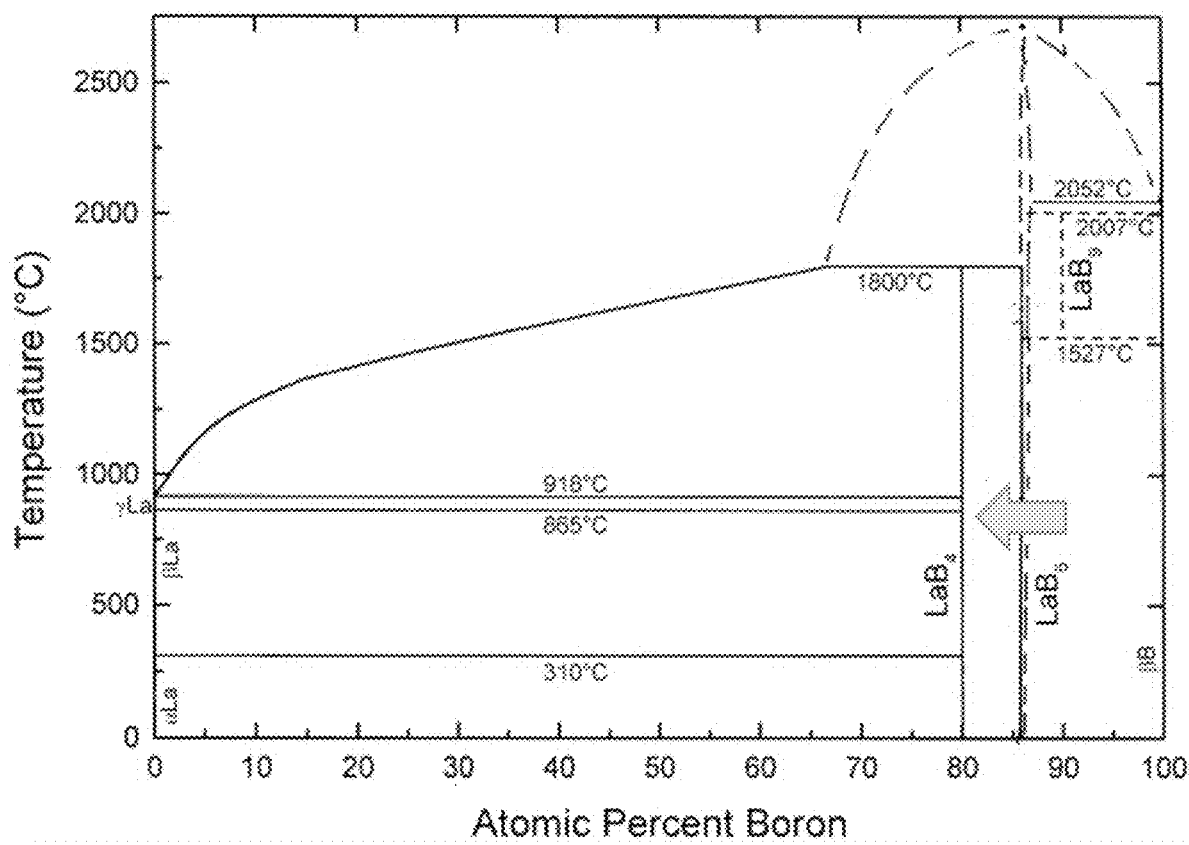
FIG. 32: La—B phase diagram.
Figure 33:
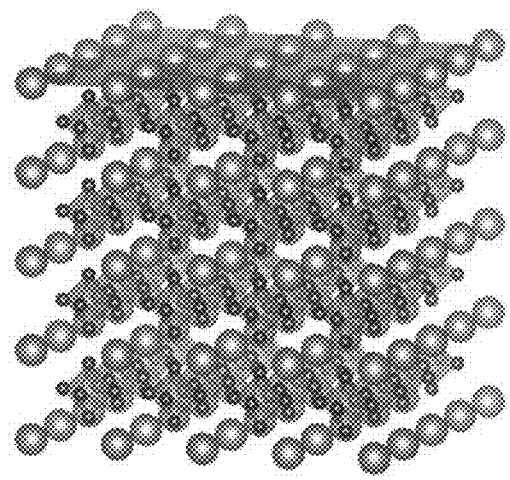
FIG. 33: Illustrations of $LaB_6$ atomic lattice, showing La-terminated surface (cationic) or B-terminated surface (anionic).
Figure 33:
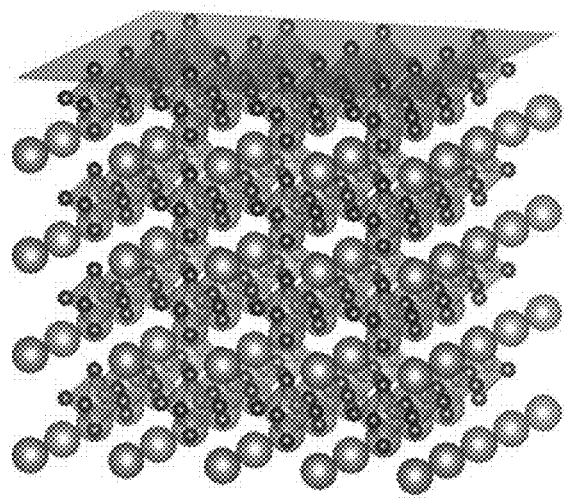

$LaB_6$ hollow cathodes have proven to be a very robust technology after many years of use in operating spacecraft. However, the specifics of their operational behavior are still evading our understanding. It is found that the cathode behaves as if it had a work function lower than the classically accepted value for $LaB_6$ vacuum cathodes, 2.67 eV [1][4]. For example, FIG. 29 shows work function reduction of a polycrystalline $MB_6$ surface over time as a result of plasma treatment In order to estimate precisely the work function of $LaB_6$ in the hollow cathode configuration, a coupled 2D axisymmetric plasma and thermal model [5] is built. Based on the final result for the coupled system, a work function of 2.25 eV is estimated for the cathode with a 25 A discharge and 13 sccm mass flow rate of xenon. This is 0.42 eV lower than the vacuum cathode value.

The specific mechanism responsible for the reduction in work function is of great importance, not only from a purely scientific point of view, but also from an engineering one. $LaB_6$ hollow cathodes can be engineered for even lower operating temperatures throughout the lifespan of the cathode. With this new design, one can maximize the lifetime of polycrystalline $LaB_6$ cathodes.

The work function of a crystalline solid is a surface property of its crystals. It is an energy barrier established by the local environment of the crystal atomic structure at the surface. Therefore, it can be affected by numerous mechanisms. It is challenging to isolate a singular mechanism that can impact the work function in a given direction, because work function is determined by fine details of the atomic structure at the material surface. Published results from density functional theory [6,7] (DFT) can be used to elaborate the hypothetical mechanisms behind the work function reduction in $LaB_6$ presented in this work. Four possible mechanisms are identified that could improve the work function of polycrystalline $LaB_6$:

1. Formation of a crystallographic texture promoted by the preferential removal of high surface energy crystals by ion bombardment of the emitting surface of the cathode. A polycrystalline $LaB_6$ sample contains a random distribution of crystals. Each crystal orientation exhibits different work function and different surface energy. It is contemplate that the action of plasma ions upon the grains of the polycrystalline sample could preferentially etch grain surfaces whose surface energies are high. The energy of those ions must be below the sputtering threshold of $LaB_6$ (— 50 eV), otherwise the etch would not discriminate on the basis of surface energy. As this process evolves, the initial random distribution of crystals at the surface of the polycrystalline sample would evolve into a surface composed of grain surfaces that are highly stable (low surface energy). The relation between low surface energy crystals and low work function has been studied in the work of Uijttewaal [6].

2. Formation of $LaB_4$ due to the re-crystallization of $LaB_6$ in a La-rich environment. The mean free path for evaporated La atoms can be on the order of the cathode interior dimensions, and therefore, it is expected it to be ionized. Given the cathode plasma distribution, ionized La must be driven back to the emitting surfaces of the cathode where it will interact with the polycrystalline surface of $LaB_6$ responsible for the thermionic discharge of the cathode. Given the high temperatures of the surface and the constant bombardment with La ions, it is hypothesized that re-crystallization of $LaB_6$ into the more metallic phase $LaB_4$ might occur. The work function for $LaB_4$ is not known, but considering its highly metallic character it is expected its work function to be comparable to $LaB_6$, or possibly better. If that is correct, the formation of $LaB_4$ could the reason behind the reduction of the work function.

3. Formation of a cationic termination in otherwise naturally occurring boron-terminated crystals. When La ions reach the surface of the insert, they could stick to the surface like adatoms without affecting the crystalline structure of $LaB_6$. DFT results have shown that cationic terminations of crystals (La terminations in compounds La—B) are responsible for the low work function of $LaB_6$ crystals. A polycrystalline sample of $LaB_6$ is composed of a mix of La and B terminated crystals, with the work function of the first group much lower than that of the second. It is hypothesized that the return flux of La ions could force the B-terminated crystals into their La-terminated counterpart, yielding a reduced work function behavior of the solid.

4. Formation of a surface complex upon the interaction of $LaB_6$ with some undetermined chemical species outgassed from a component in the vicinity of the emitter. There could be a chemical species evaporated from the high temperature components that exist close to the insert that could reduce the work function of $LaB_6$ by the formation of a favorable dipole on its surface. Cesium is the only well known work function enhancer for $LaB_6$ [8]. There was not a source of Cs anywhere near the insert, therefore, that possibility is excluded. In general, other work function enhancers are possible (metals with lower electronegativity than the one for boron). Thus, the possibility is not excluded entirely.

The polycrystalline $LaB_6$ inserts used in our studies are manufactured from $LaB_6$ powder synthesized using carbothermal reduction [9] and subsequently milled into 2 μm mean grain size. The powder was manufactured by Treibacher Industrie AG. The powder was then sintered into a billet by means of hot isostatic pressing in a Ta crucible by Exothermics Inc. Subsequently, the billet is machined into the final shape of the emitter using electro-discharge-machining (EDM). Throughout the synthesis of the powder, consolidation into the billet, and machining into the final emitter shape, there is no mechanism that preferentially exposes any one type of $LaB_6$ crystal at the surface. Thus, the exposed crystallographic orientation at the surface of the emitter does not show any specific crystallographic texture; it is completely random. That is the state of the emitting surface when the work function of polycrystalline $LaB_6$ samples is measured by means of a Richardson plot in a vacuum diode test cell.

In this Example, the effect of the hollow cathode plasma interacting with the emitting surface of a polycrystalline $LaB_6$ insert is explored. A slightly modified version of the classical cylindrical shaped insert is built, with the objective of exposing a flat surface of $LaB_6$ to the plasma. The cathode was then operated uninterruptedly for 50 hr at 25 A and 13 sccm. The effect of the plasma on the surface is characterized by means of crystallographic, chemical and morphological analyses. Upon comparison of the data obtained with the control measurements taken in the unexposed sample, it is determined that formation of a crystallographic texture likely contributes to the work function reduction.

Exemplary Methods

The objective of this Example is to elucidate, from a chemical point of view, what causes the work function reduction in the $LaB_6$ hollow cathode configuration. Generally, in various exemplary cases, the cathode is operating at 25 A and 13 sccm. From previous experience at this operating condition, it is contemplated that the cathode exhibits a transient behavior during the first 50 hr of operation and at that point, the thermal response of the cathode is very stable. A modified is used insert that can help understand the chemical evolution that occurs during the transients.

An experiment was prepared that consisted of exposing a polycrystalline $LaB_6$ sample for the first time since manufacturing to Xe plasma in the cathode over a period of 50 hr. The shut down sequence was designed to minimize any further evolution of the thermionic surface due to the cool down transient of the cathode. A special vacuum chamber is designed to cool down the cathode as quickly as possible after the experiment to reduce further chemical evolution of the thermionic surface due to high temperature (diffusion of chemicals at the surface or recrystallization). Very steep cool down rates (starting at 246° C./min) are obtained and total cool down of the insert in 5 hr. Additionally, the Xe flow is kept running until the insert temperature reached room temperature to prevent any chemicals from the vacuum chamber from reaching the sensitive thermionic emitter surface while it cools down from operating temperature (>1200° C.).

Test Article and Facility—Insert, Cathode and Chamber:

The cathode setup used in this experiment is a hollow cathode. The only difference with that configuration is the use of a modified insert geometry in this example. The modified insert is shown in FIG. 1. The insert consists of two pieces, part A and part B. Part A is held in place by its own weight in part B. Part A can be easily placed inside part B as in FIG. 1 and it can also be easily removed and transported for chemical analysis. This new geometry has an available area for thermionic electron emission 1.72% smaller than the original insert.

Figure 2:
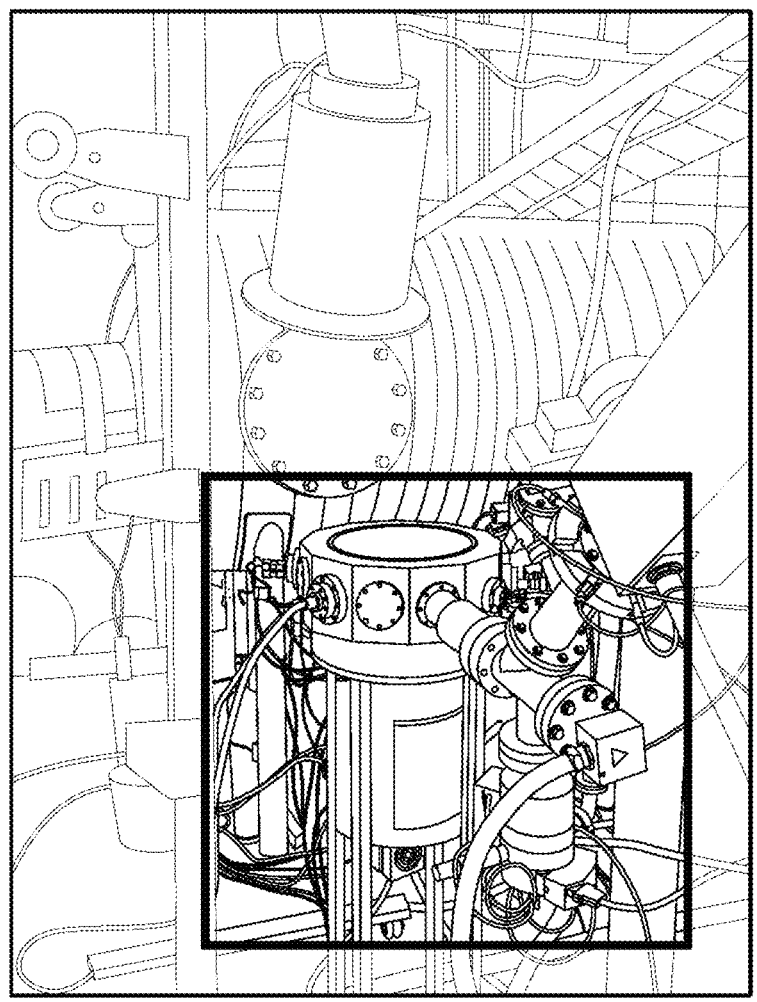
FIG. 2: Vacuum chamber used in the experiment.
Figure 3:
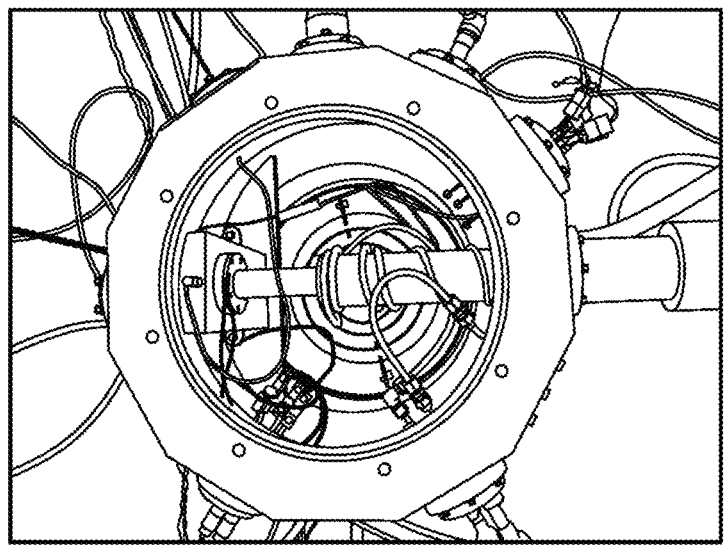
FIG. 3: Cathode assembly inside vacuum chamber.

The chamber in which this experiment ran has a volume of $22 \times 10^{-3}$ m$^3$ and two 10" cryopumps arranged in opposite directions to each other (FIG. 2), the cathode sits between them (FIG. 3).

Operating Conditions:

The cathode operating point chosen for the 50 hr test had been studied. The discharge was set at 25 A and the mass flow rate at 13 sccm.

Surface Morphology Characterization—Scanning Electron Microscopy (SEM) and Profilometry:

In order to visualize the effect of the plasma on the sample of $LaB_6$, a series of high resolution images were obtained using a scanning electron microscope, ZEISS 1550VP FESEM. This device is located at the Caltech GPS Division Analytical Facility. The objective was to characterize the surface before and after plasma exposure. In SEM, accelerated electrons are forced to collide against a surface. When the electrons interact with the sample, they are decelerated by inelastic collisions, producing a variety of signals. One of these signals is the secondary electron emission, which is used to produce SEM images. Backscattered electrons are also emitted and they are mostly used for illustrating contrasts in composition in multiphase samples.

Figure 4:
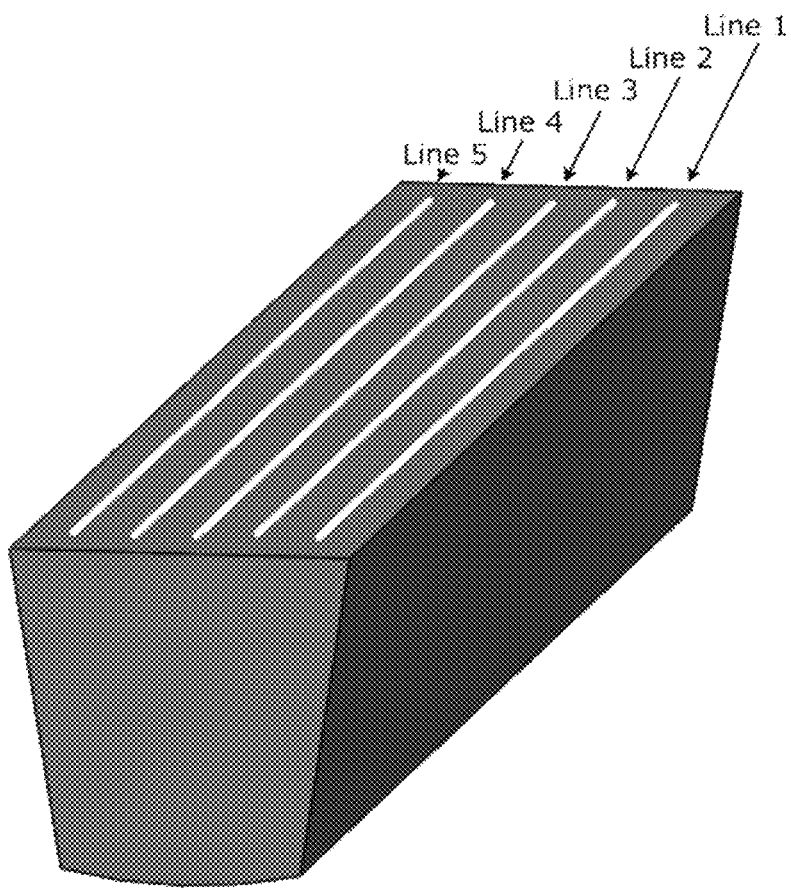
FIG. 4: Test sample (part A). Depicted are the paths along which the profilometer was used to acquire the topology of the sample.

To quantify the effect that the plasma had on the morphology of the surface exposed to the plasma of part A (highlighted surface in FIG. 1), a DektakXT stylus profilometer was used. This device is located at the Caltech Molecular Materials Research Center. Stylus profilometers measure the surface profile of a sample by physically moving the tip of a probe along the sample surface. The method consists of applying a constant force to the stylus and maintaining it through a feedback loop. The change in the height of the arm holder is then measured and the profile can be reconstructed from the data. The radius of the stylus is 2 µm, profile configuration was "Hills and Valleys" and the stylus force was 3 mg. The best possible resolution is selected depending on the surface roughness present in the sample, which was either 6.5 µm or 65.5 µm peak to peak. Profiles along five straight lines were obtained before and after the plasma exposure. Those lines are shown in FIG. 4. Note that the profile could not be extended to the edges of the sample due to limitations in the apparatus.

Direct Work Function Measurement—Ultraviolet Photoelectron Spectroscopy:

The work function was measured directly in the test sample after plasma exposure along Line 3 (see FIG. 4) in 15 different locations by ultraviolet photoelectron spectroscopy (UPS) using a Kratos Ultra spectrometer located at the Caltech Molecular Materials Research Center.

Figure 5:
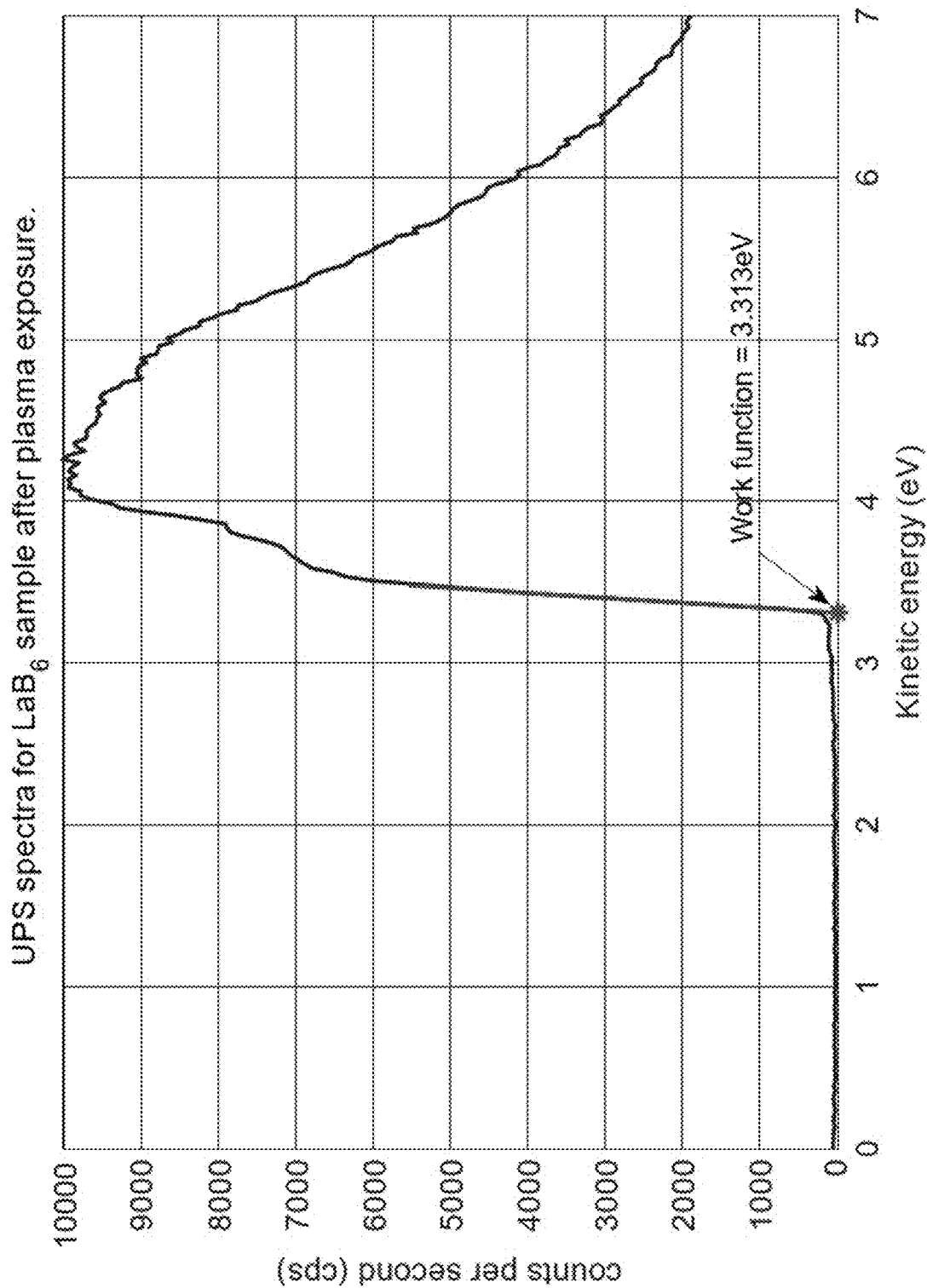
FIG. 5: UPS spectra for the $LaB_6$ test article after plasma exposure at location z̄~0.884 (see FIG. 14) obtained with aperture 110×110 μm².

In UPS, ultraviolet light from a helium discharge source is shined on the location of interest. As a result, electrons of the sample get excited and photoemitted from the surface. By measuring the kinetic energy of the electrons emitted and subtracting the incident photon energy, one can measure the binding energy of the photoemitted electrons. UPS can therefore be used to measure the work function of a sample. The work function is the energy difference between the Fermi level and the vacuum level of a sample. The Fermi level is the highest energy level of an electron in a sample at absolute zero temperature. The work function can be spectroscopically acquired by measuring the difference between the Fermi level and the cutoff of the tail at the low kinetic energy end of the photoemitted electrons of the sample, and subtracting this value from the incident photon energy (see FIG. 5).

After the 50 hr test finished, the sample was exposed to the atmosphere in order to be transported from the vacuum chamber where the cathode was run (Jet Propulsion Laboratory), to the UPS instrument located at Caltech. The work function was also measured at five randomly chosen locations in a control sample. The control sample belongs to the same billet from which the insert was extracted. The surface of the control sample where the work function was measured was produced by cracking a control piece of $LaB_6$ with a pair of pliers right before introducing it into the UPS. The exposure of that sample to the atmosphere was less than 10 min. To account for possible area effect on the work function measurement, five different focusing lenses are used in the UPS instrument. According to the manufacturer of the apparatus, the different settings correspond to the following approximate areas: $1 \times 1$ mm$^2$, $110 \times 110$ µm$^2$, $55 \times 55$ µm$^2$, $27 \times 27$ µm$^2$ and $15 \times 15$ µm$^2$. The calibration was checked of this technique by measuring the work function of a sputtered polycrystalline gold sample at one location, using each of the aforementioned apertures, and obtained a value which deviates from the nominal value of 5.1 eV by less than 0.014 eV, a mean 5.086 eV with a standard deviation 0.037 eV.

Phase Identification—X-Ray Powder Diffraction and Electron Backscatter Diffraction:

X-ray powder diffraction (XRD) and electron backscatter diffraction (EBSD) are techniques useful for the characterization of the different phases present in a sample. Both of these techniques require flat samples to obtain meaningful results, which drove us to the design shown in FIG. 1.

EBSD is a surface analysis technique that allows quantitative microstructural analysis in SEM up to a nanometer scale. In this method, a beam of electrons is focused at the point of interest on a tilted sample, typically at 70° from the normal to the surface. Upon inelastic interaction between the impinging electrons and the atomic structure of the sample surface, scattered electrons form a divergent source of electrons close to the surface of the sample. Some of those electrons interact with the structure at angles that satisfy the Bragg equation: $n\lambda = 2d \sin(\theta)$ where n is an integer, $\lambda$ is the wavelength of the electrons, d is the spacing of the diffracting plane, and $\theta$ the angle of incidence of the electrons on the diffracting plane. The diffracted pattern is recorded on a phosphor screen where the so-called Kikuchi bands are recorded. Each Kikuchi band can be indexed by the Miller indices of the diffracting crystal plane which formed it, thus enabling crystallographic identification. By comparing the measured Kikuchi patterns with known patterns from a database, phase identification can be obtained. Penetration depth in the order of 10 nm is characteristic for this technique, albeit dependent on the material. This technique was applied at locations of interest in the test sample after it was used in the 50 hr run test. The area analyzed in each case was 1 mm$^2$. The speed of acquisition was 40.53 Hz and the accelerating voltage was 20 kV. The EBSD system used was manufactured by KHL Technology and is located at the Caltech GPS Division Analytical Facility.

XRD is another surface analysis method that provides information about the crystalline nature of materials at penetration depth of around 10 µm. Similarly to EBSD, XRD employs constructive interactions between X-rays and atomic structures, producing patterns that can be recorded and used against database information to deconvolve the different phases present in the sample. The directions of possible diffractions depend on the size and shape of the unit cell of the material. The relative intensities of the diffracted X-rays depend on the kind and arrangement of atoms in the crystal structure. In order to produce a unique pattern from a crystalline material, the atomic structure needs to be exposed to the incident X-ray beam in every possible direction. This is obtained in practice by producing a powdered sample from the crystalline material of interest. The powdered sample is typically called a polycrystalline aggregate or powdered material. When a powder with randomly oriented crystallites is placed in an X-ray beam, the beam will expose all possible interatomic planes. If the experimental angle is systematically changed, all possible diffraction peaks from the powder will be detected by the scintillation detector. By comparing the measured peak and intensity patterns with known patterns from a database, phases can be identified. A PANalytical X'pert$^3$ XRD with Bragg-Brentano geometry was utilized. The data was acquired at 0.31°/min.

Crystallographic Texturing—X-Ray Powder Diffraction:

X-ray diffraction as a technique is similar to measuring the diffraction from a single crystal that is rotated in every possible direction with respect to a fixed incident X-ray source. From that point of view, the XRD pattern represents the result of a perfectly random distribution of crystal orientations in the powder sample or similarly in the polycrystalline solid sample (our test article). This situation is described by saying that there is no crystallographic texture in the polycrystalline solid sample. As a consequence of this, if a texture is present in the sample, the relative intensities of the XRD peaks will change.

Figure 6:
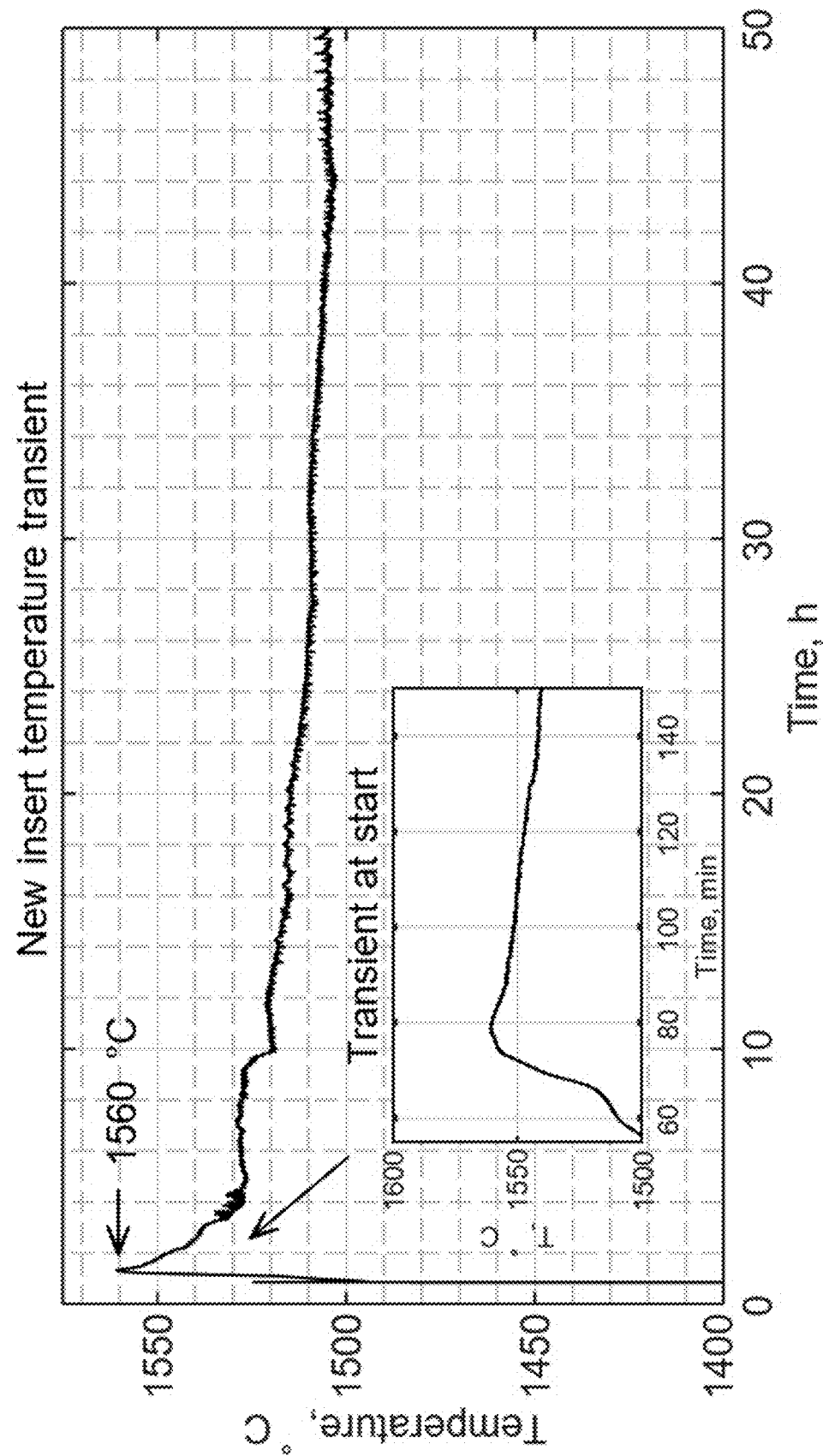
FIG. 6: Thermal transient for a new insert at $J_D$=25 A and $\dot{m}_{Xe}$=13 sccm with the nominal orifice.
Figure 7:
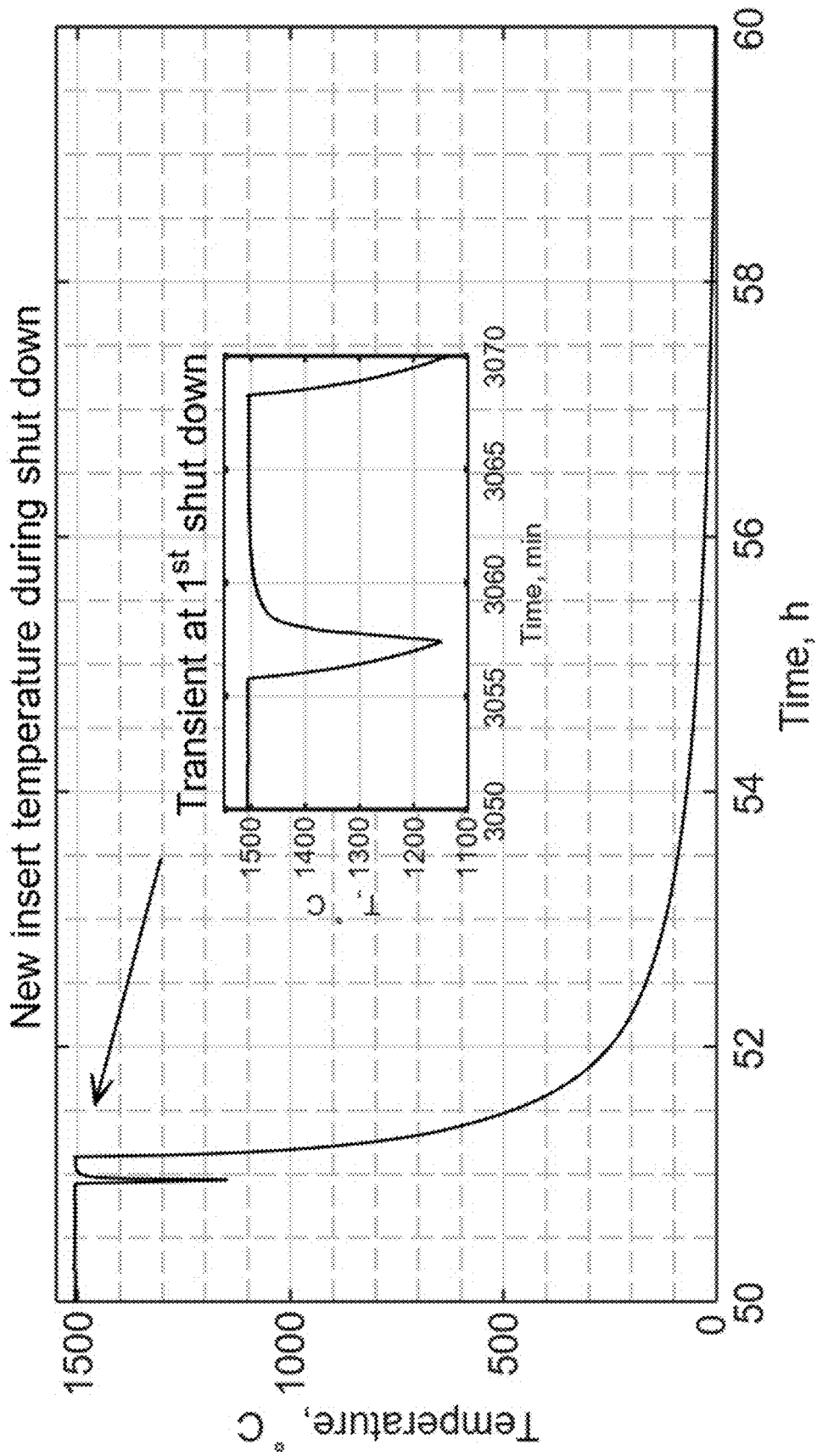
FIG. 7: Thermal transient during shut down.
Figure 8:
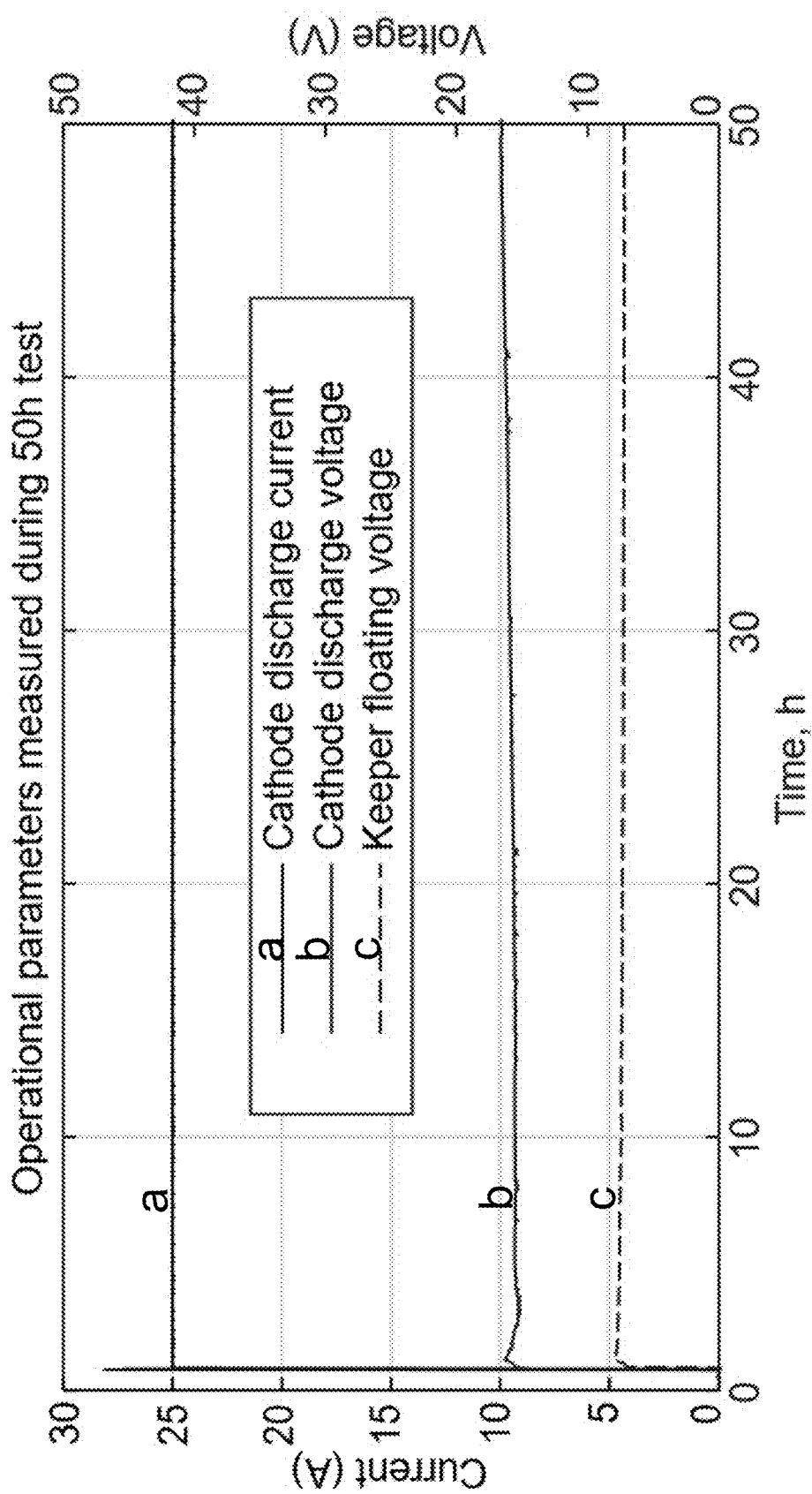
FIG. 8: Cathode operational parameters measured during 50 hr test: discharge voltage and current, and keeper voltage.
Figure 9:
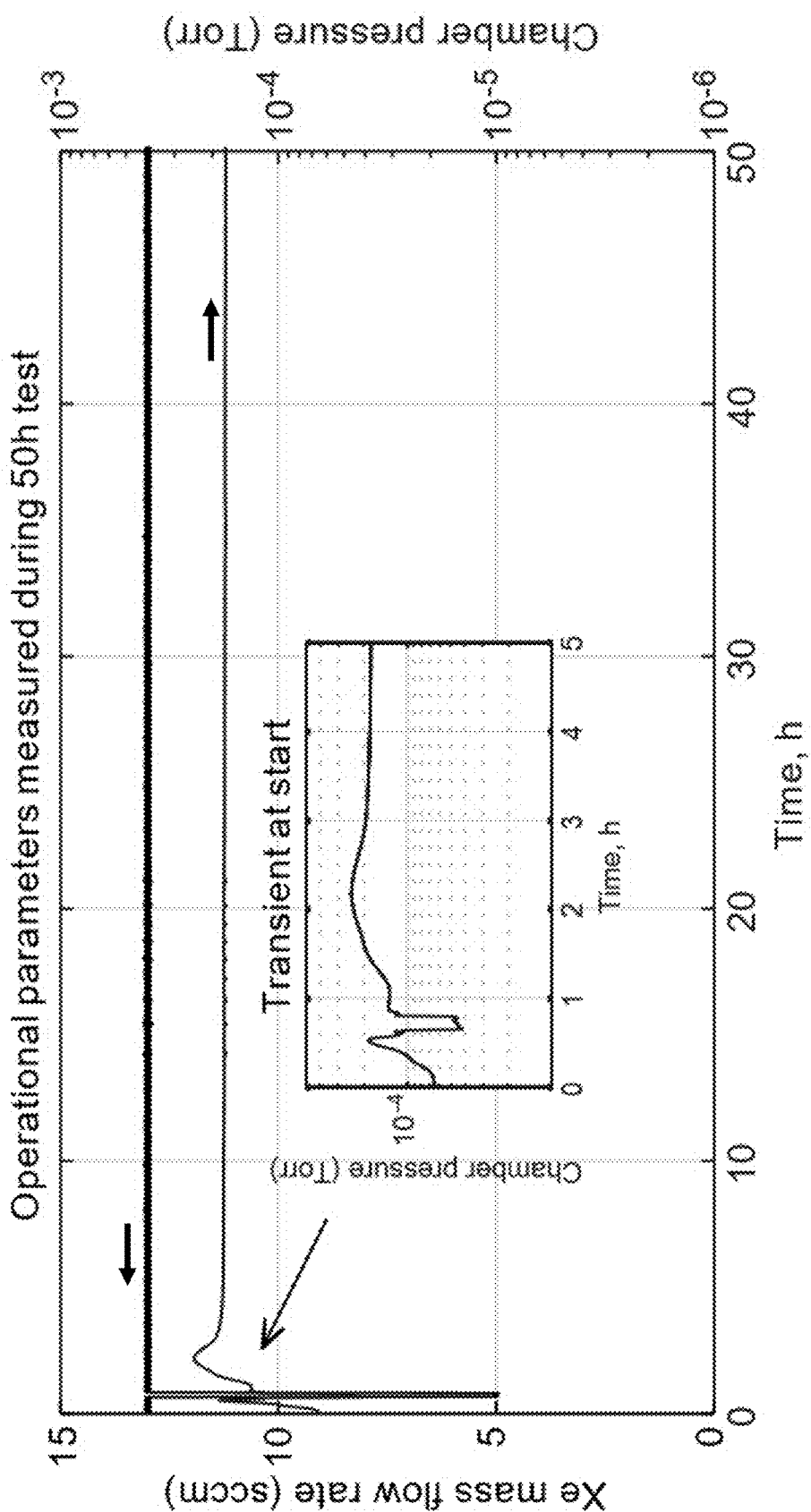
FIG. 9: Cathode operational parameters measured during 50 hr test: chamber pressure and Xe mass flow rate. Arrows indicate which y-axis corresponds to the respective data.

Results:

Cathode Operating Conditions:

The cathode was operated for 50 hr in the aforementioned vacuum chamber and its performance was measured with a data acquisition system. FIG. 6 shows the temperature of the insert measured with a Type C thermocouple for the 50 hr test. FIG. 7 shows the shut down procedure and cool down curve. FIG. 8 shows the main discharge voltage, current and keeper voltage during the test. FIG. 9 shows the vacuum chamber pressure and Xe mass flow rate fed into the cathode.

Figure 10:
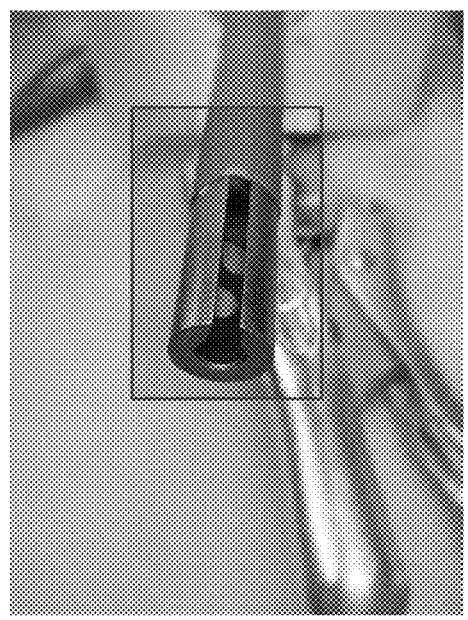
FIG. 10: Test sample (part B) after the 50 hr test. Sample shows carbon contamination in most of its internal area.

In FIG. 6 a temperature transient is observed. The behavior of the transient is similar in terms of showing a fast cool down during the first 5 hr of the cathode operation and slower cool down during the following 45 hr. Of note, while the transients were highly reproducible, a temperature at steady state about 200° C. higher is observed. Upon dissembling the cathode, it is found that most of the thermionic active area of the insert part B was coated in black, see FIG. 10. The source of this contamination was most likely the graphite pusher placed upstream of the insert. Prior to this 50 hr test, the cathode assembly (including the pusher but excluding the insert) was thoroughly outgassed. The outgassing lasted for ~24 hr at 1300° C. It is unclear whether the outgassing procedure was insufficient (higher temperature or longer processing time required) or this contaminant is sputtered off the pusher walls by energetic ions. Insert temperature increments due to carbon contamination have been observed. It is believed that this contamination is the reason for the abnormal temperature at steady state in this test. Fortunately, the carbon contamination did not affect the test article (part A) significantly. Nonetheless, these observations highlight an important unsolved problem with LaB$_6$ cathodes, namely material compatibility. Graphite is considered as the best suited material to be in contact with LaB$_6$ at high temperature given the knowledge available in the literature and from practitioners in the field. This is also true given our own experience. However, in light of the contamination issues introduced here, more work needs to be done to perfect its utilization.

Morphology Identification—Scanning Electron Microscopy (SEM):

In FIG. 11 the microscopic evolution of the morphology of the surface of the material can be observed. The image on the left corresponds to a surface that was produced by electrical discharge machining (EDM) from the billet as the test sample. On the right one can observe the test sample after exposure to the cathode plasma for 50 hr. The most remarkable detail in the pictures is the faceted appearance of the surface that corresponds to the area of the test sample exposed to the high density plasma (downstream side or right hand side in FIG. 11). On the left hand side of the test sample (exposed to a much lower plasma density), the surface morphology seems to be increasing in roughness but facets are not visible.

Figure 12:
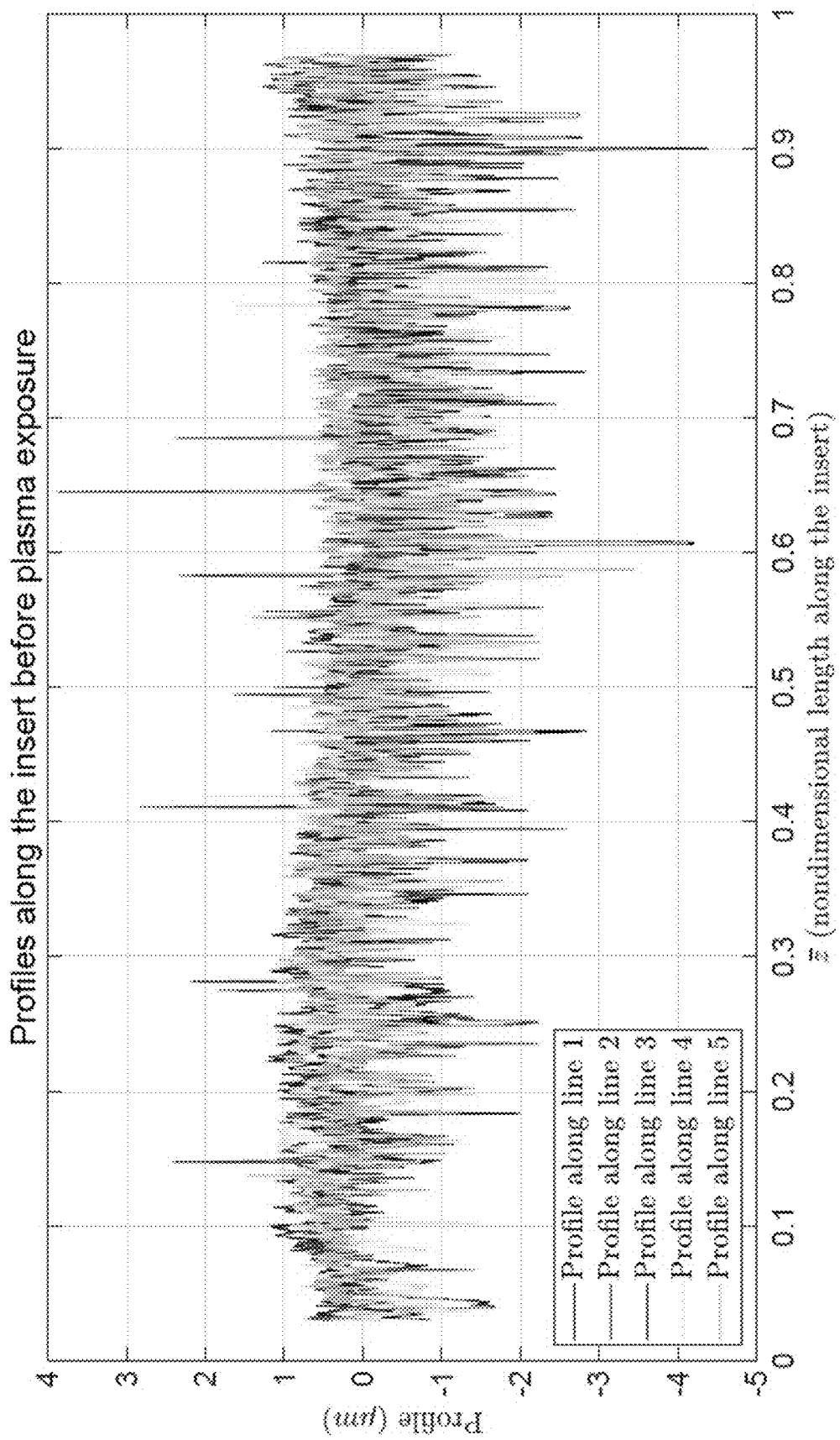
FIG. 12: Surface profiles acquired before plasma exposure.
Figure 13:
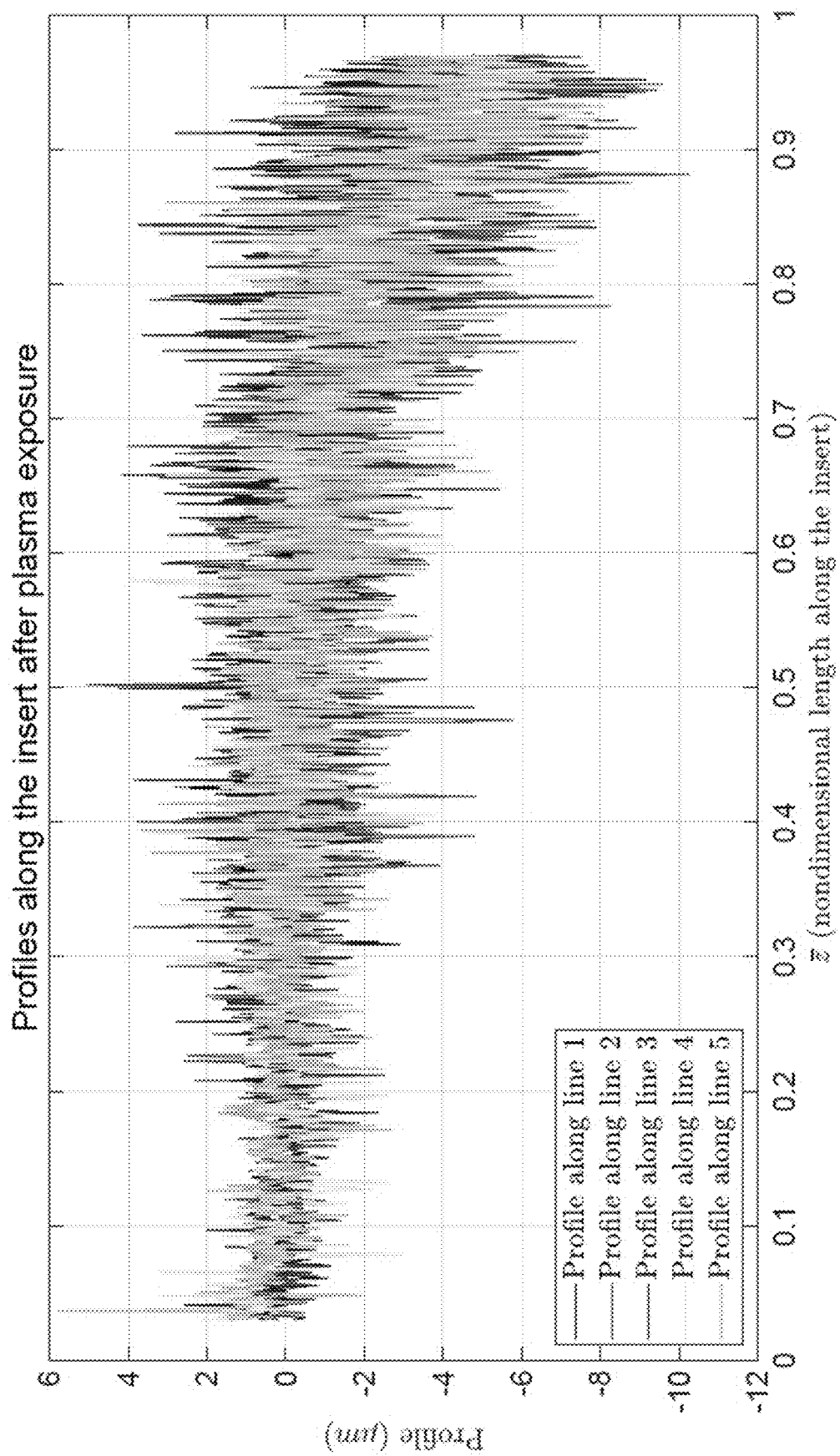
FIG. 13: Surface profiles acquired after plasma exposure.

Topology Characterization—Profilometry:

The profiles measured along the five lines depicted in FIG. 4 before plasma exposure are shown in FIG. 12 and for the sample after plasma exposure in FIG. 13.

As can be observed, the sample roughness after EDM is on the order of 2 μm peak-to-peak and deviation from flatness is on the order of 1 μm. The spikes in FIG. 12 are small imperfections in the surface.

In FIG. 13 the profiles after plasma exposure show a roughness on the order of 2 μm peak-to-peak in the upstream region of the sample ($\bar{z}$~0.1) that increases up to 8 μm peak-to-peak in the downstream region. Furthermore, one can observe the profiles deviating from the upstream flat region which correspond to the mass of insert lost due to the action of the downstream high density plasma. These results are in agreement with the morphology observed qualitatively in FIG. 11.

Figure 14:
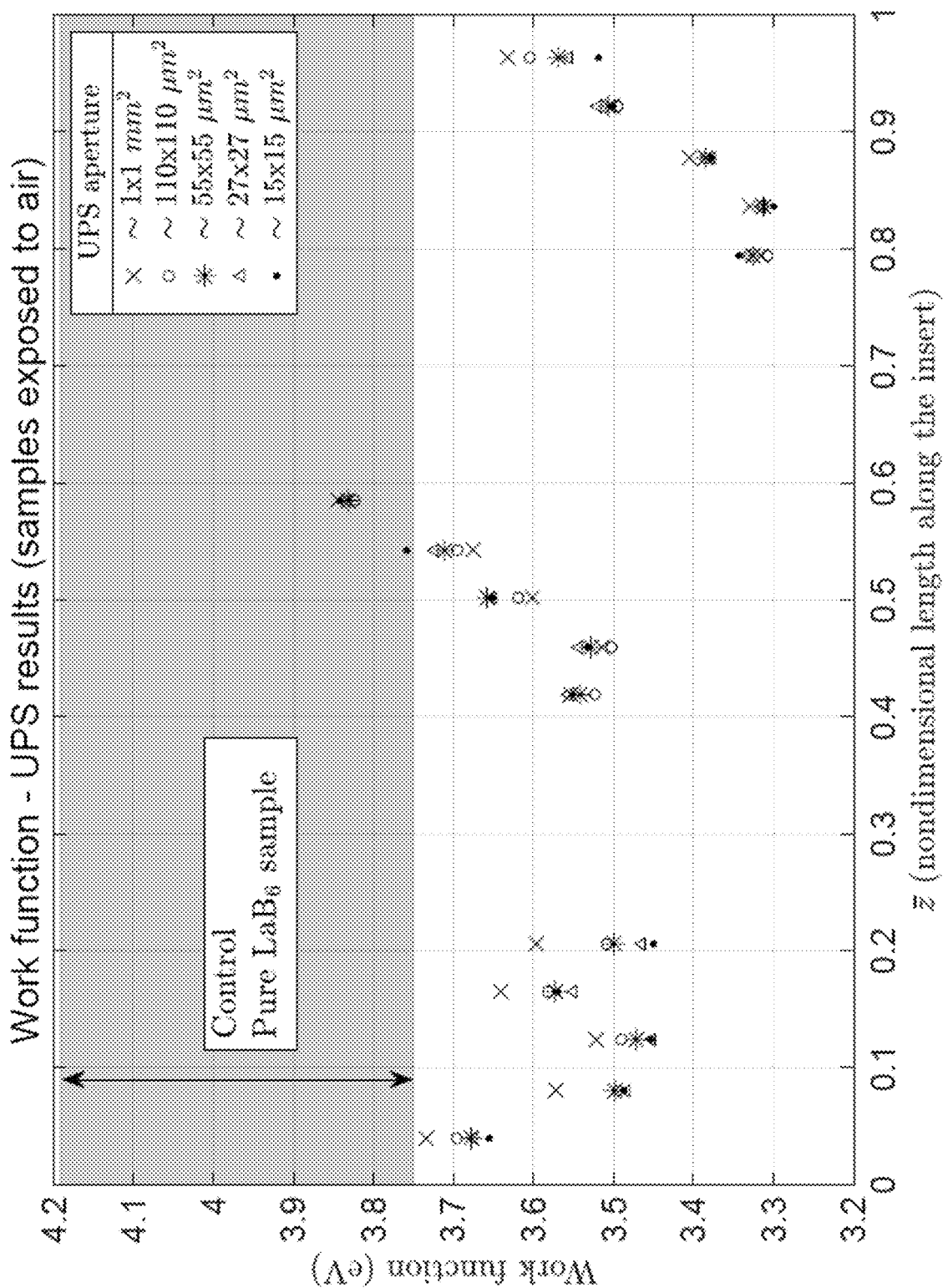
FIG. 14: Work function measurements acquired with UPS.

Direct Work Function Measurement—Ultraviolet Photoelectron Spectroscopy:

Results for the work function measurements are shown in FIG. 14. There are five color bands that correspond to the work function measurement obtained in the control sample in five randomly chosen locations. At every location, the work function measurements were acquired five times with increasing aperture size of the UPS.

Figure 38:
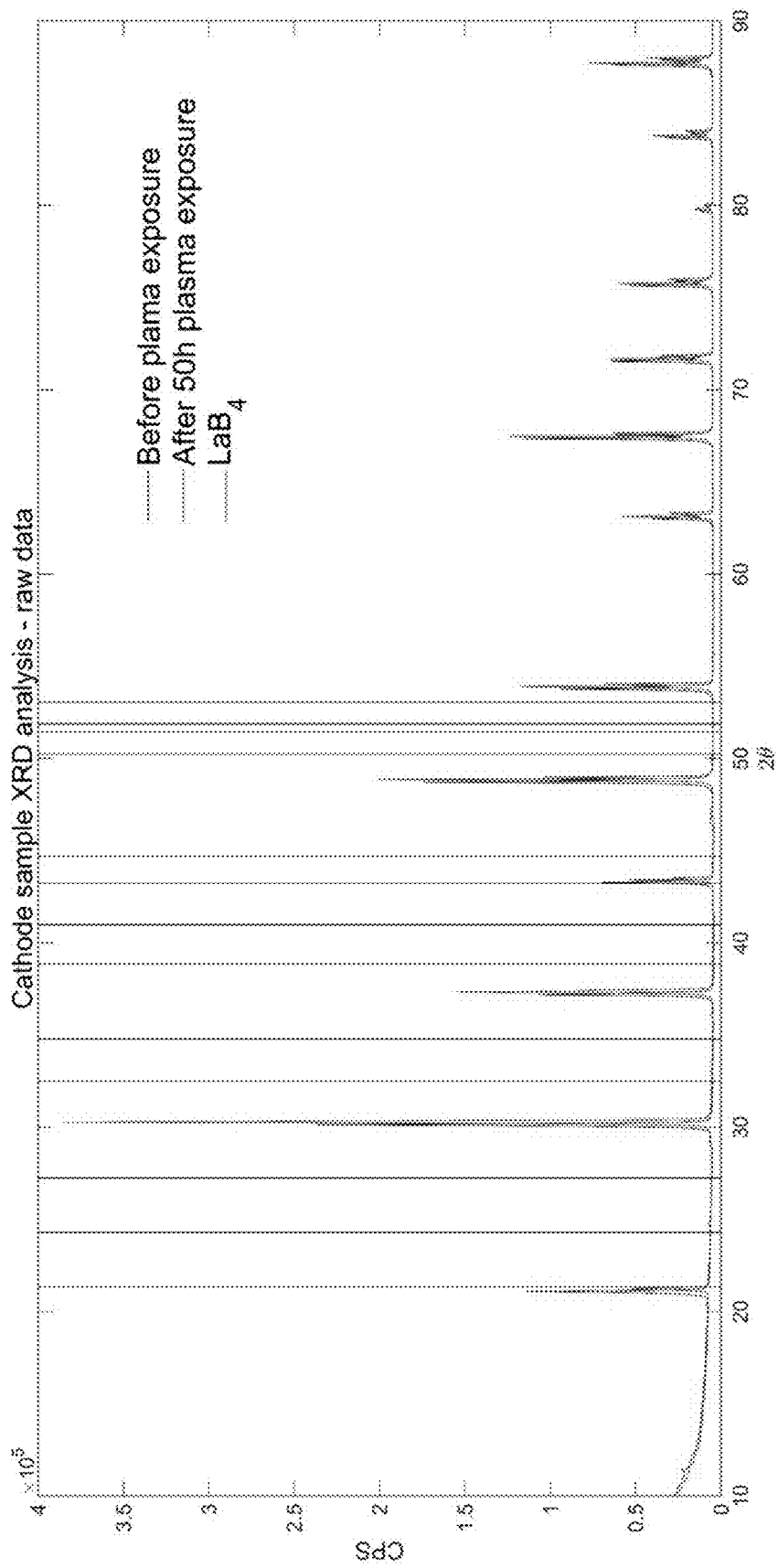
FIG. 38: XRD patterns for polycrystalline $LaB_6$ sample, before and after treatment with plasma according certain embodiments herein. Comparison with LaB4 database ICDD 00-024-1015.
Figure 39:
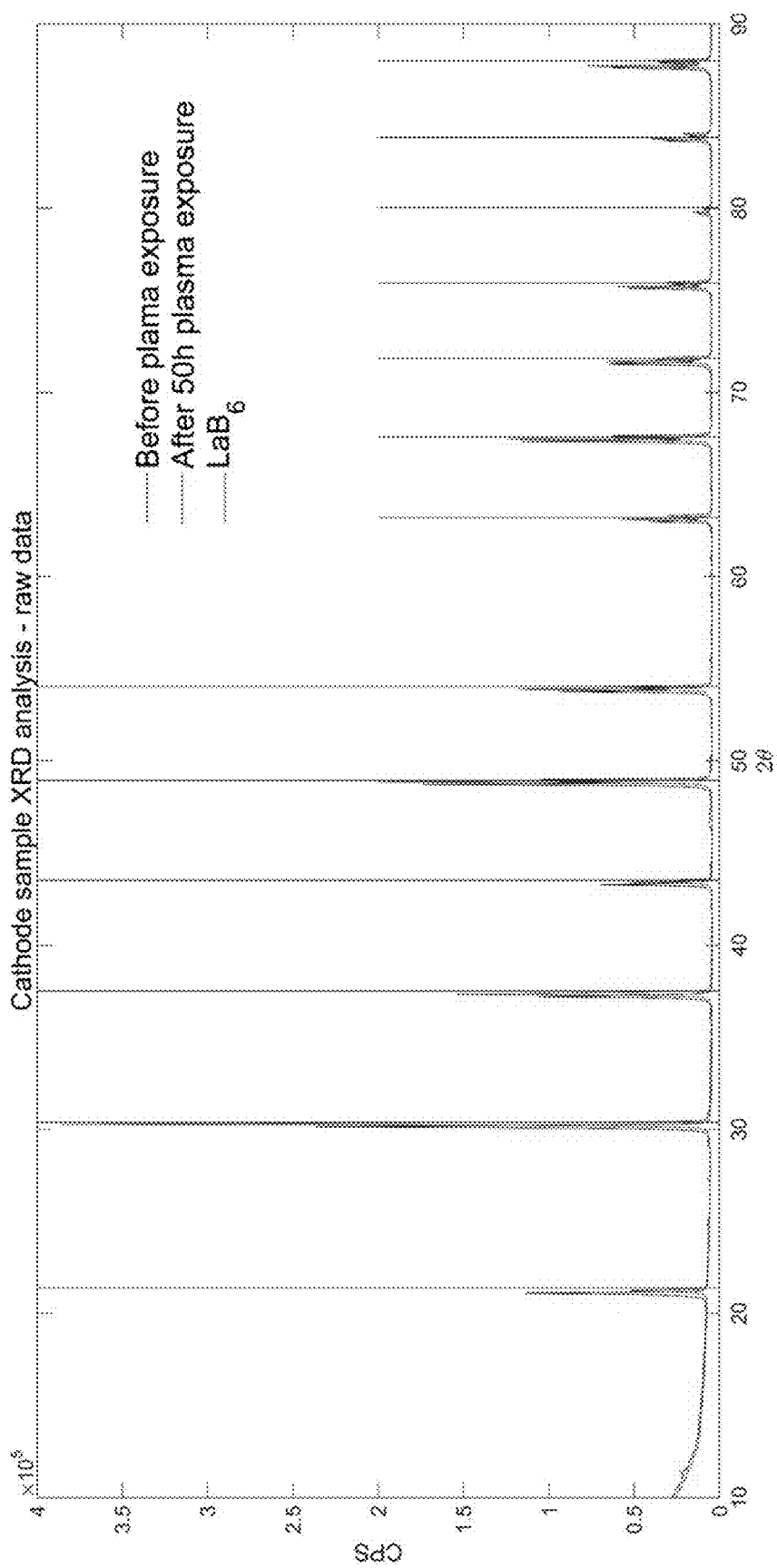
FIG. 39: XRD patterns for polycrystalline $LaB_6$ sample, before and after treatment with plasma according certain embodiments herein. Comparison with $LaB_6$ database ICDD 00-006-0401.
Figure 40:
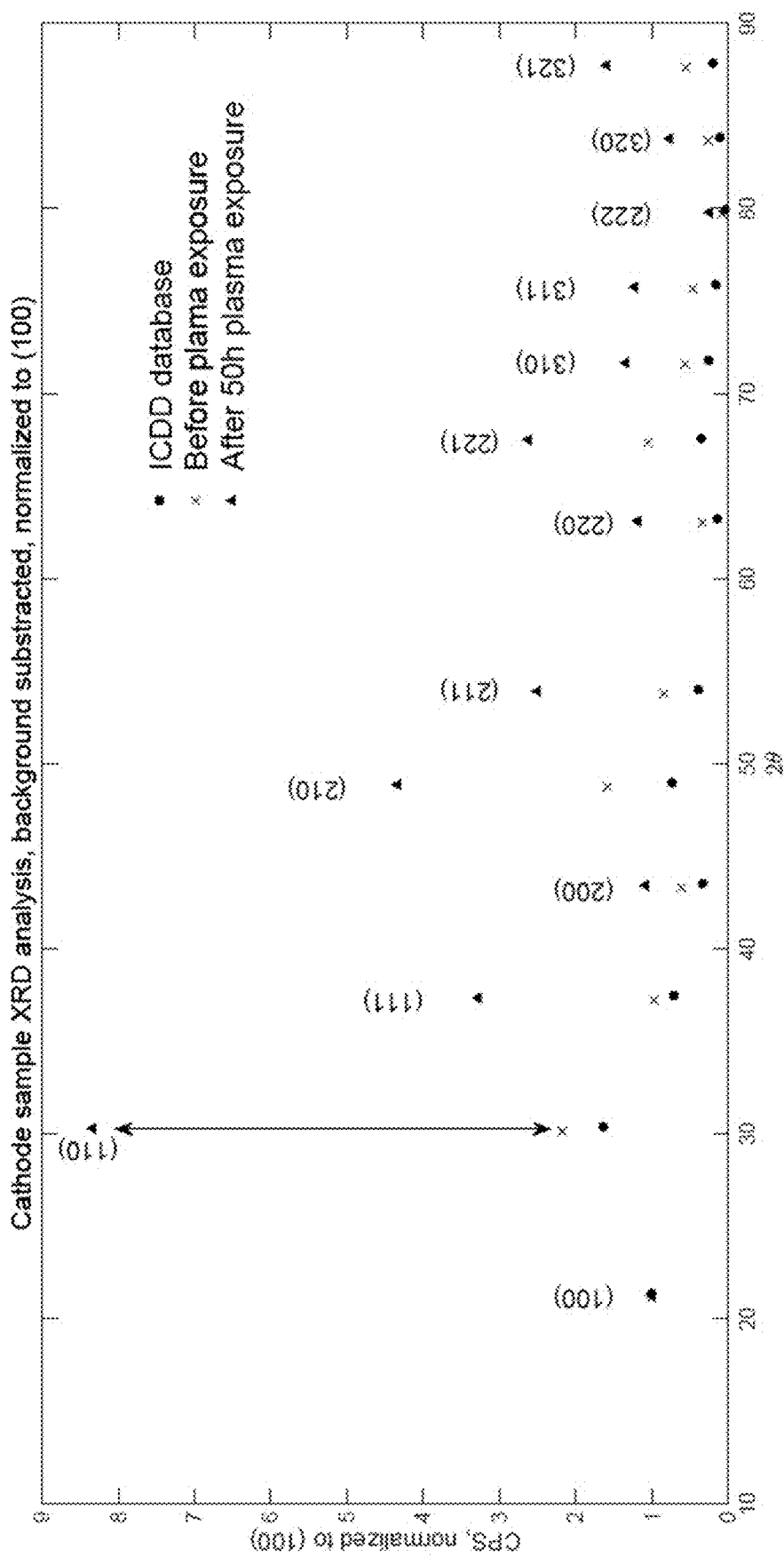
FIG. 40: XRD patterns for polycrystalline $LaB_6$ sample, before and after treatment with plasma according certain embodiments herein. Double arrow indicates that the peak corresponding to the (110) plane increased after plasma treatment disproportionately with respect to the other peaks or plane positions, indicating crystallographic texture. Comparison with $LaB_6$ database ICDD 00-006-0401.
Figure 41:
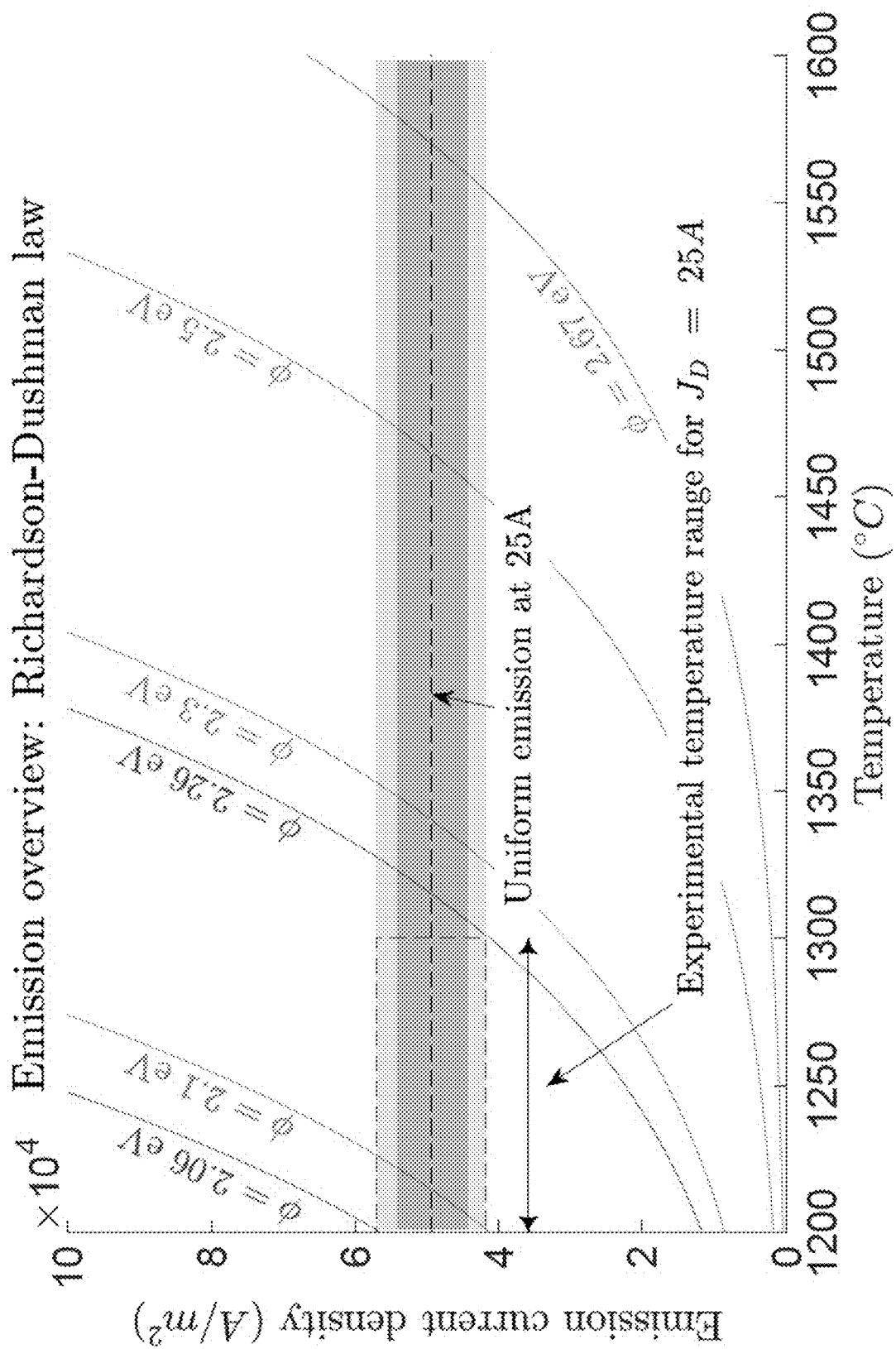
FIG. 41: A plot of emission current density vs. temperature, corresponding to the Richardson-Dishman Law.

X-Ray Powder Diffraction Results:

XRD spectra before and after plasma exposure are shown in FIGS. 38-40. In FIGS. 38-40 it is obvious that the XRD profiles before and after the test sample was exposed to the cathode plasma are not aligned with the lines that represent the peak locations for $LaB_4$. On the other hand, the match is significant when comparing the profiles with the peak locations for $LaB_6$.

Figure 15:
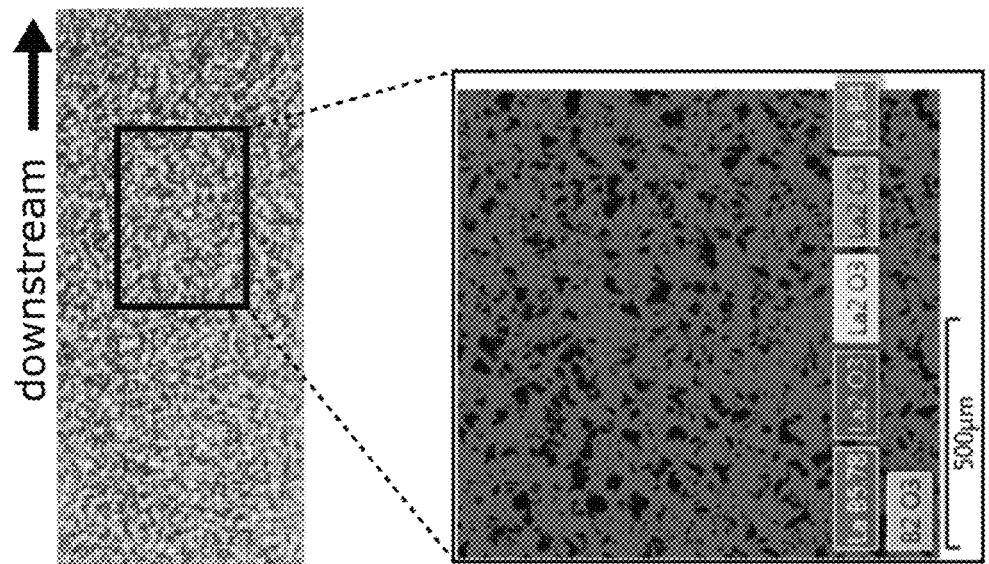
FIG. 15: EBSD phase identification map of the sample in the upstream and downstream location of the test sample. The orientation of the test sample indicates the downstream end of the cathode (towards the orifice plate).
Figure 15:
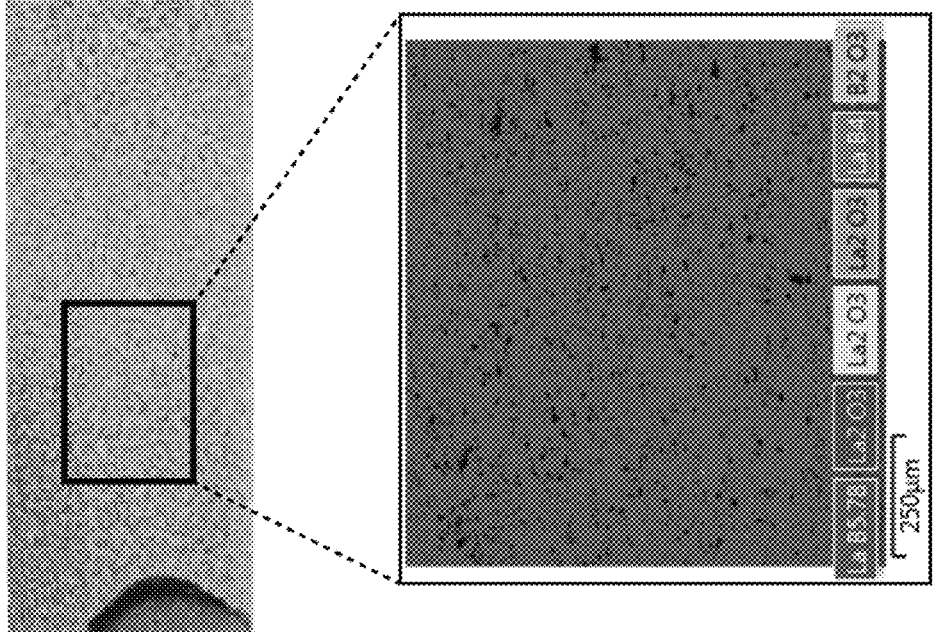

Electron Backscatter Diffraction Results:

The results from the EBSD analysis can be found in FIG. 15. The phase identification map on the left corresponds to a 1 mm² area in the upstream end of the test sample, whereas the one on the right corresponds to the downstream end. As can be seen, the Kikuchi patterns belong to crystalline $LaB_6$. The patterns were also compared with La oxide, B oxide and $LaB_4$. Similarly to the XRD results, EBSD did not detect the presence of crystalline $LaB_4$.

Discussion:

Work Function Measurement by UPS:

UPS was employed to directly measure the differences in work function at plasma-exposed and control areas of $LaB_6$ inserts by UPS (FIG. 14). First, it is important to note that all the measurements are above 3.3 eV, which is considerably higher than the value of 2.66 eV for polycrystalline LaB6 obtained by Lafferty[4]. These differences are not unexpected given that in the work of Lafferty, work function was estimated using a $LaB_6$ sample in a vacuum cathode configuration at high temperature and results were extrapolated using the Richardson plot method. In contrast, the photoemission work function is measured by UPS of a $LaB_6$ sample at room temperature that has been exposed to the atmosphere. It is proposed that the observed differences in the absolute values of the work function measurements are likely due to adventitious carbon or oxidation of the surface from exposure to air after the experiment was concluded. Despite these differences, since putative atmospheric contaminants such as carbon are constant throughout the samples, the relative differences in work function measurements across the insert are still comparable.

The measurements for the control sample provided work functions ranging from 3.75 to almost 4.2 eV. However, in the case of the test sample, the work function measured at 15 locations along the emitter sample ranges from 3.3 to 3.86 eV. It is contemplated this is a real trend in the work function of the sample, associated with exposure to Xe plasma. Consistent with this hypothesis, it is noted that the lowest values of the work function are found in the downstream region of the insert, about $\bar{z}$~0.8-0.9. This is the region which was exposed to high density plasma and showed a faceted morphology, as can be seen in FIG. 11. It is reasonable to believe that the facets shown in FIG. 11 could correspond to the $LaB_6$ crystals which exhibit lower work function. Hence, the work function observed in the downstream end of the insert shown in FIG. 14 would be the effect of such texturing.

For each location, 5 apertures were used. The work function spread for each location can reach 0.15 eV in some of the measurements, and as small as 0.02 eV in other instances. It is unclear at this point the nature of this variability. In the sputtered gold sample, the range was 0.094 eV.

Figure 34A:
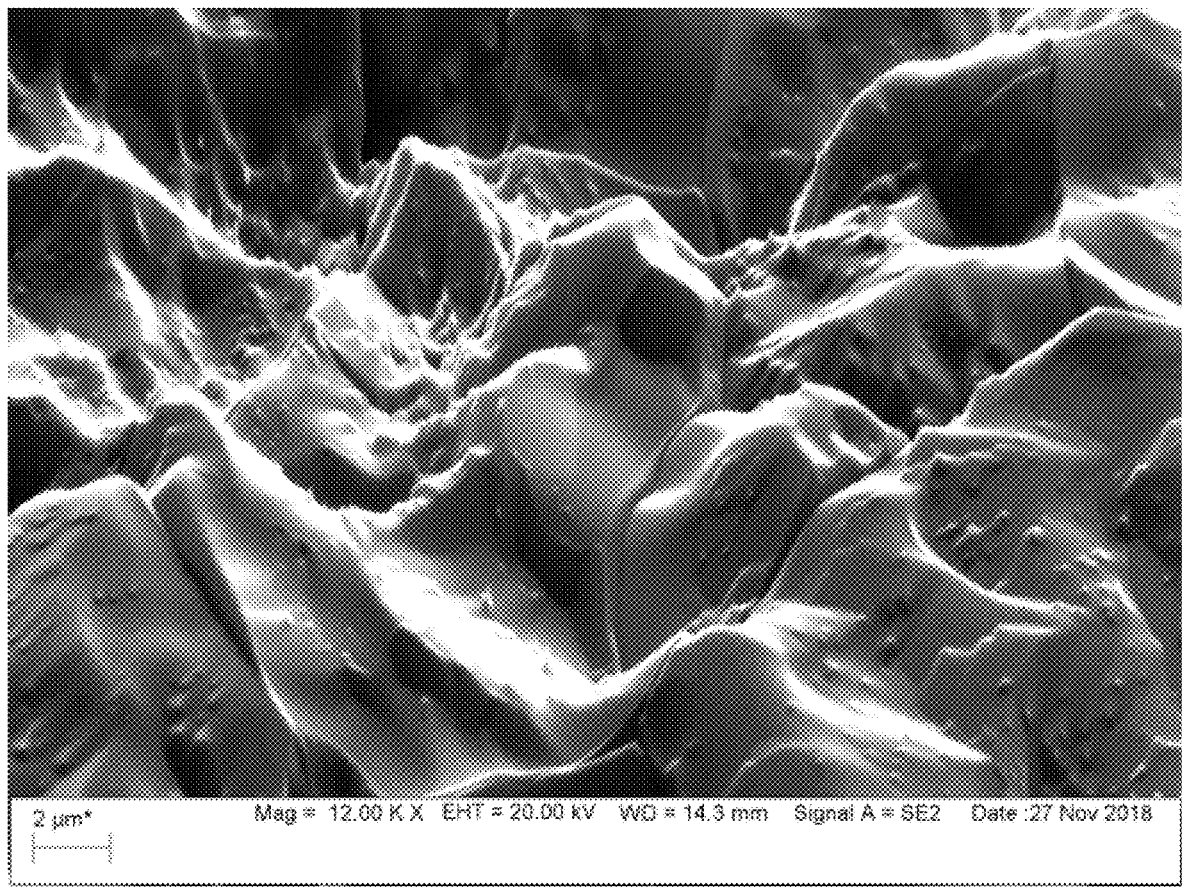
FIGS. 34A-34B: SEM images of polycrystalline $LaB_6$ sample exposed to (FIG. 34A) low density plasma and (FIG. 34B) high density plasma, according to certain embodiments herein. After high density plasma, there is evidence of exposure of crystallographic planes.
Figure 34B:
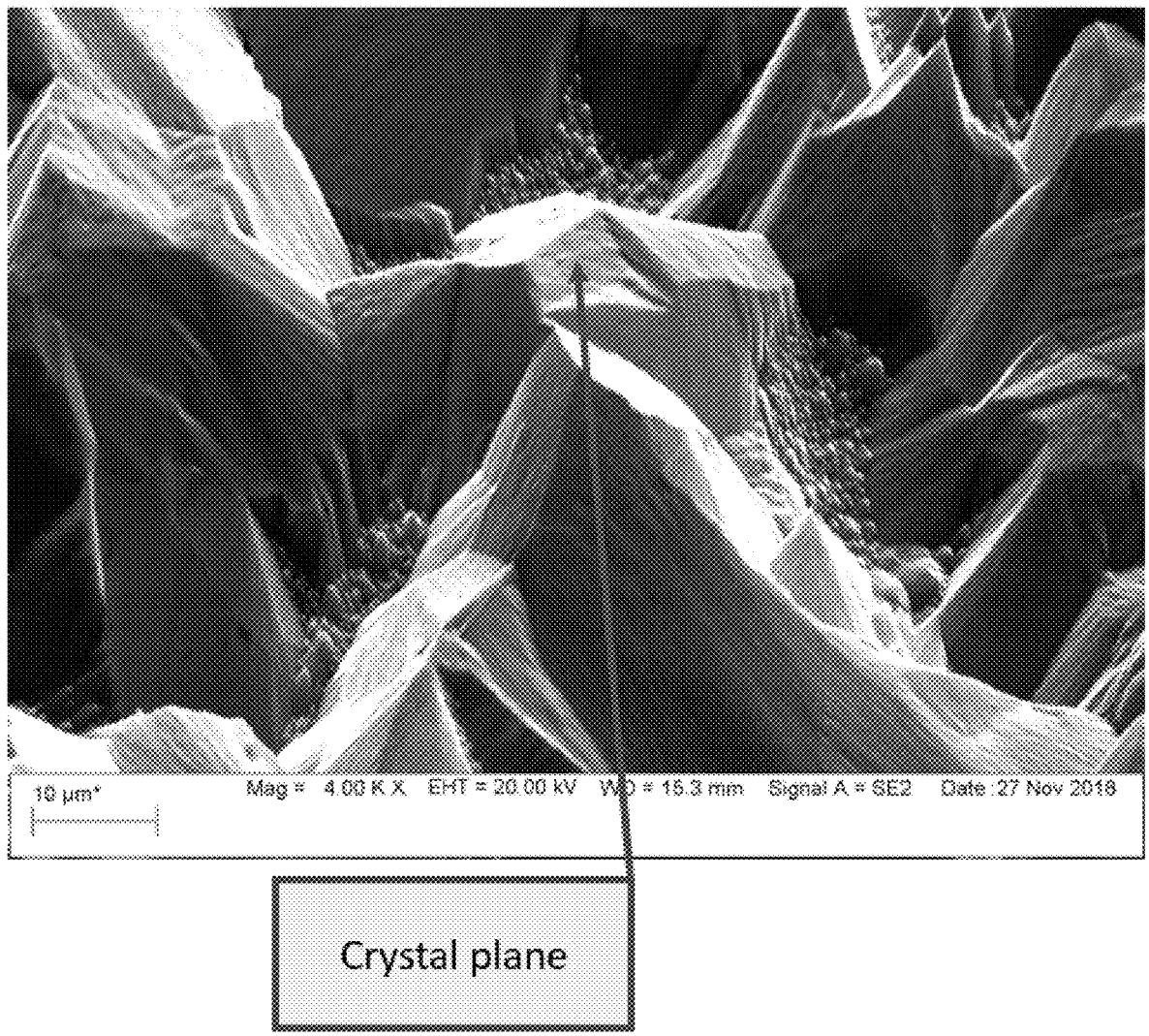
Figure 35:
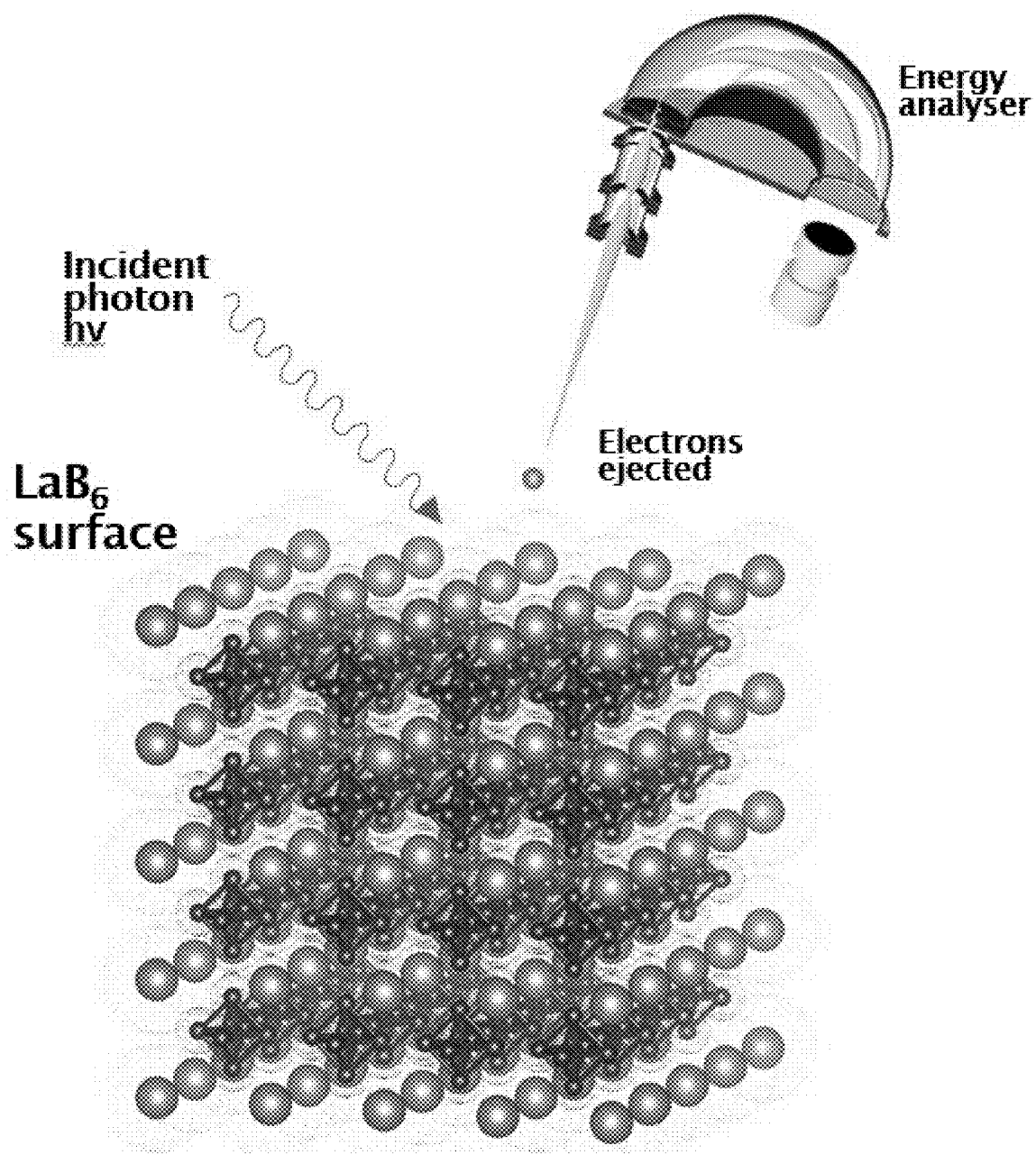
FIG. 35: An illustration of direct work function measurement with ultraviolet photoemission spectrometry.
Figure 36B:
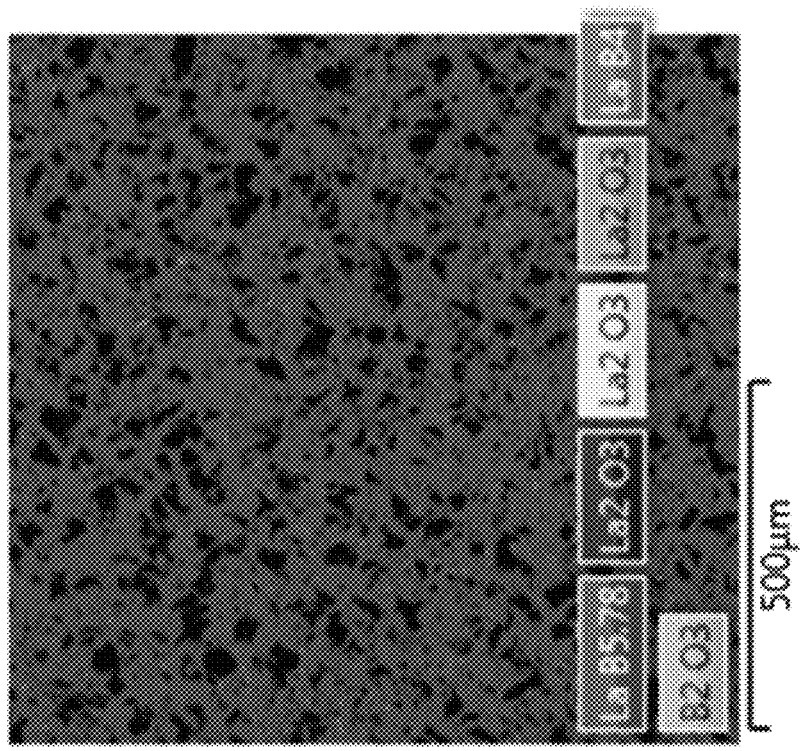
FIGS. 36A-36B: EBSD phase identification map of the sample at locations of exposure to low plasma density (FIG. 36A) or high plasma density (FIG. 36B). Results indicate LaB4 is not present at the surface.
Figure 36A:
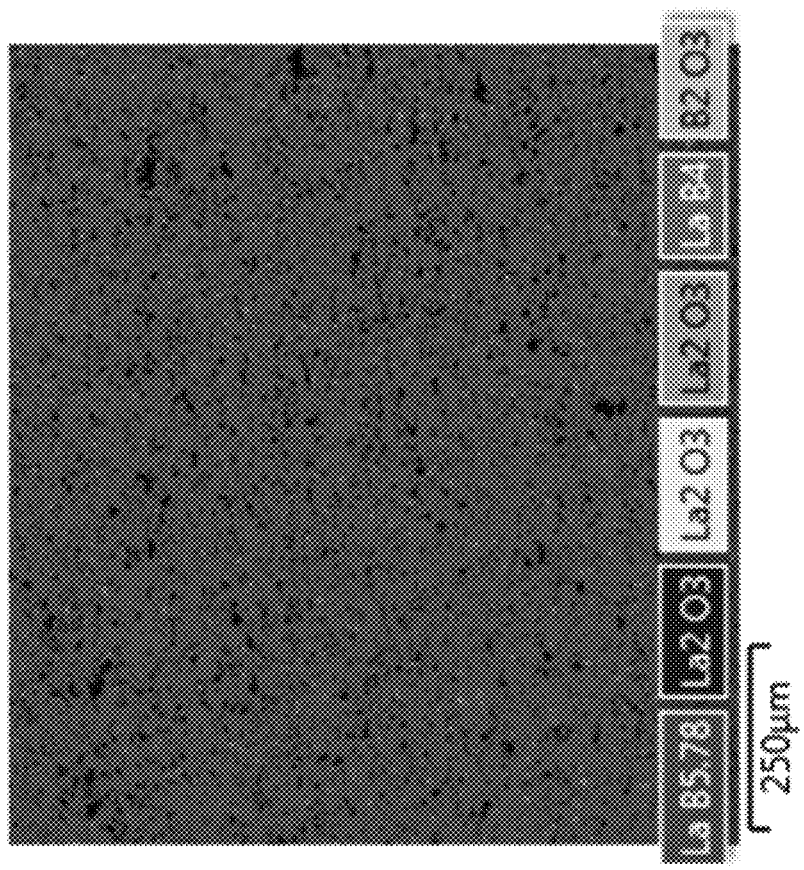
Figure 37:
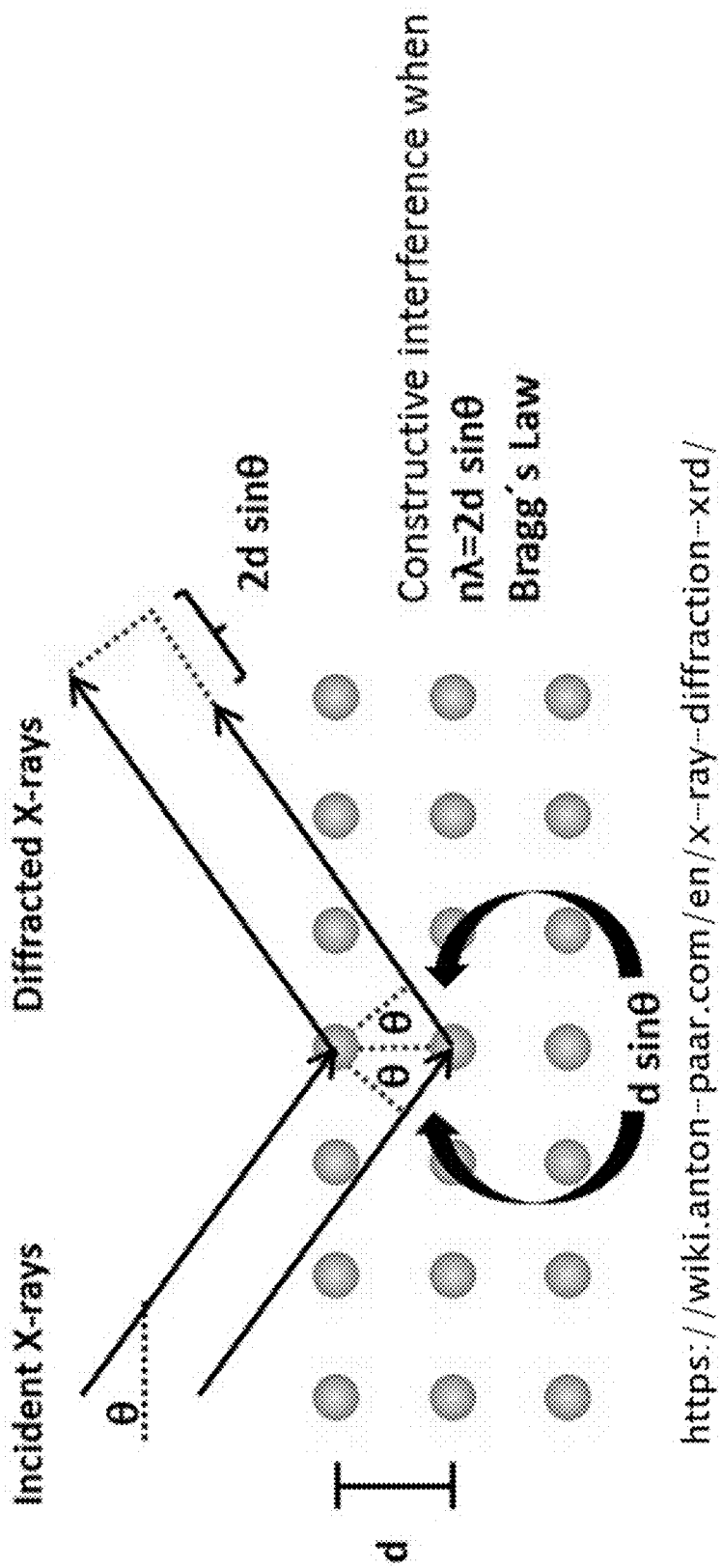
FIG. 37: Surface analysis by X-ray diffraction (SRD).

Crystallographic Analysis by XRD:

XRD showed that $LaB_4$ is not present in the crystalline form in the cathode sample before or after plasma exposure. However, it is possible that $LaB_4$ could be present in an amorphous state after the cathode cools. Nonetheless, amorphous substances are not faceted, as they lack lattice ordering. Given the faceted appearance of the downstream end of the insert surface in FIG. 11, amorphous $LaB_4$ is not found in this end of the cathode. Another possibility is that $LaB_4$ could be present while the cathode is running but it transitions to $LaB_6$ as the cathode cools down. The only locations where this might exist are in the crevices between the peaks shown in FIG. 11 and the upstream end of the insert. FIG. 34B shows a SEM picture of the surface, where crevices are easily distinguishable and hold an apparently amorphous substance. One possibility that explains the formation of amorphous substance in the crevices is quenching of melted material due to the fast cool down rates obtained at cathode shut down. The melting point of $LaB_6$ and $LaB_4$ are both above the cathode operating temperature, therefore, it is not believed this is the mechanism behind their formation. An alternative explanation is that the amorphous-looking structure in the crevices is not a sign of lack of crystallinity but is instead a result of ion etching. Crystals with high surface energy are more rapidly etched away than crystals with low surface energy (highly stable). The material in the valleys has lower chances of being impacted by returning plasma ions (as those ions can interact with the peaks on their way to the valleys) and therefore, it takes them longer to be etched away. If this mechanism is indeed the one occurring during the 50 hr test, it can explain the different temperature gradients observed and in FIG. 6.

The peaks before and after sample exposure to the cathode plasma are shifted relative to each other and do not align perfectly with the peak location from the database, see Table 1. Small shifts of this scale are either due to different stress states of the sample or lack of calibration in the instrument. The sample was manufactured by hot isostatic pressing (HIP) and after the exposure to the plasma the sample was subject to a fast cool down. It is then reasonable to believe that different stress states appear in the sample before and after plasma exposure, which could explain the peak shifts. Another feature worth mentioning is the double peaks that appear at some peak locations, for example, in FIG. 40 at the (111) crystal location. This is most likely due to the lack of perfect monochromatic X-ray emission by the XRD X-ray source combined with the long integration times.

TABLE 1

XRD diffraction peak location analysis. Table shows location values (in degrees) of XRD diffraction peaks for $LaB_6$ as reported in the literature, and as estimated in our measurements on the test sample before and after plasma exposure.

| Crystal face | $PL_{ICDD}^{mean}$ | $PL_{ICDD}^{std}$ | $PL_{bp}$ | $PL_{ap}$ | $E(PL_{bp})$ | $E(PL_{ap})$ |
|---|---|---|---|---|---|---|
| (100) | 21.37 | 0.0206 | 21.15 | 21.24 | −0.220 | −0.133 |
| (110) | 30.38 | 0.0035 | 30.15 | 30.28 | −0.233 | −0.103 |
| (111) | 37.46 | 0.0358 | 37.21 | 37.34 | −0.255 | −0.125 |
| (200) | 43.52 | 0.0069 | 43.28 | 43.41 | −0.236 | −0.106 |
| (210) | 48.95 | 0.0187 | 48.73 | 48.86 | −0.224 | −0.094 |
| (211) | 54.00 | 0.0173 | 53.77 | 53.91 | −0.233 | −0.093 |
| (220) | 63.22 | 0.0097 | 63.02 | 63.11 | −0.197 | −0.107 |
| (221) | 67.57 | 0.0166 | 67.34 | 67.50 | −0.228 | −0.068 |
| (310) | 71.78 | 0.0497 | 71.56 | 71.66 | −0.223 | −0.123 |
| (311) | 75.88 | 0.0514 | 75.65 | 75.75 | −0.230 | −0.130 |
| (222) | 79.92 | 0.0916 | 79.68 | 79.78 | −0.243 | −0.144 |
| (320) | 83.85 | 0.0075 | 83.67 | 83.77 | −0.177 | −0.077 |
| (321) | 87.86 | 0.1144 | 87.63 | 87.73 | −0.229 | −0.129 |

$PL_{ICDD}^{mean}$: peak intensity mean value based on $ICDD_{006\_0401}$, $ICDD_{034\_0427}$ and $ICDD_{065\_1831}$
$PL_{ICDD}^{std}$: peak intensity standard deviation value based on $ICDD_{006\_0401}$, $ICDD_{034\_0427}$ and $ICDD_{065\_1831}$
$PL_{bp}$: peak location before plasma exposure
$PL_{ap}$: peak location after plasma exposure
$E(PL_{bp}) = PL_{bp} - PL_{ICDD}^{mean}$
$E(PL_{ap}) = PL_{ap} - PL_{ICDD}^{std}$ In FIG. 40 (see also FIGS. 38-39) it is shown the comparison of the intensities of the three most significant crystal orientations in the XRD analysis for the sample before and after plasma exposure along with the three best quality database points found for $LaB_6$ in the ICDD database. Each set has been normalized to the peak intensity of its own (110) peak. The XRD relative intensities between peaks for a powder sample that show no texture is a fingerprint for each material.

The relative intensity between crystals (111) and (100) based on data from the ICDD database is $$\frac{I_{ICDD}^{mean,(111)}}{I_{ICDD}^{mean,(100)}} = 0.71$$

(see Table 2), for the test article case prior to exposure is $$\frac{I_{bp}^{(111)}}{I_{bp}^{(100)}} = 0.96 \text{ and after is } \frac{I_{ap}^{(111)}}{I_{ap}^{(100)}} = 3.3.$$

The discrepancy of this ratio for the test sample before exposure is 36% relative to the mean relative intensity from the ICDD data. In the case of the sample after the exposure it is 361%. The difference in this ratio between the sample after exposure and the ICDD data is a consequence of the development of a non random crystal distribution at the surface of the sample, in other words, a texture has developed. Similar results can be found by examining the rest of the XRD spectrum.

TABLE 2

XRD diffraction peak intensity analysis. Table shows intensity values of XRD diffraction peaks for $LaB_6$ as reported in the literature, and as estimated in our measurements on the test sample before and after plasma exposure.

| Crystal face | $I_{ICDD}^{mean}$ | $I_{ICDD}^{std}$ | $R_{ICDD}^{(100)}$ | $\dfrac{I_{bp}}{I_{bp}^{(100)}}$ | $\dfrac{I_{ap}}{I_{ap}^{(100)}}$ | $E_\%\left(\dfrac{I_{bp}}{I_{bp}^{(100)}}\right)$ | $E_\%\left(\dfrac{I_{ap}}{I_{ap}^{(100)}}\right)$ |
|---|---|---|---|---|---|---|---|
| (100) | 0.61 | 0.077 | 1.00 | 1.00 | 1.0 | 0 | 0 |
| (110) | 1.00 | 0.000 | 1.64 | 2.18 | 8.3 | 33 | 410 |
| (111) | 0.43 | 0.058 | 0.71 | 0.96 | 3.3 | 36 | 361 |
| (200) | 0.20 | 0.015 | 0.33 | 0.61 | 1.1 | 83 | 226 |
| (210) | 0.45 | 0.012 | 0.73 | 1.59 | 4.3 | 116 | 490 |
| (211) | 0.24 | 0.014 | 0.39 | 0.85 | 2.5 | 119 | 544 |
| (220) | 0.09 | 0.013 | 0.14 | 0.34 | 1.2 | 145 | 747 |
| (221) | 0.22 | 0.015 | 0.35 | 1.05 | 2.6 | 197 | 644 |
| (310) | 0.16 | 0.009 | 0.25 | 0.57 | 1.3 | 123 | 429 |
| (311) | 0.10 | 0.007 | 0.16 | 0.46 | 1.2 | 191 | 680 |
| (222) | 0.03 | 0.013 | 0.04 | 0.07 | 0.2 | 81 | 491 |
| (320) | 0.07 | 0.013 | 0.11 | 0.26 | 0.8 | 141 | 613 |
| (321) | 0.12 | 0.010 | 0.20 | 0.55 | 1.6 | 180 | 710 |

$I_{ICDD}^{mean}$: peak intensity mean value based on $ICDD_{006\_0401}$, $ICDD_{034\_0427}$ and $ICDD_{065\_1831}$
$I_{ICDD}^{std}$: peak intensity standard deviation value based on $ICDD_{006\_0401}$, $ICDD_{034\_0427}$ and $ICDD_{065\_1831}$
$I_{bp}$: peak intensity before plasma exposure
$I_{ap}$: peak intensity after plasma exposure $$E(X) = \left(\frac{X - R_{ICDD}^{(100)}}{R_{ICDD}^{(100)}}\right) \times 100$$

$R_{ICDD}^{(100)} = I_{ICDD}^{mean}/I_{ICDD}^{mean,(100)}$

EBSD:

In the downstream area analyzed (see FIG. 15), there is a higher portion of the data points (black areas on the image) that do not match any of the six crystalline structures listed, compared to the portion exhibit on the upstream area. There are three possible explanations for this phenomena: first, the pattern could belong to an unknown crystalline phase, and therefore, it is not compared with the correct pattern set from the database; second, there is no pattern due to the presence of an amorphous substance at the surface. Third, this data could be due to the lack of flatness that is observed in the morphology of the surface on the downstream end of the sample, see FIG. 34B. In this case, the Kikuchi patterns exist but cannot reach the EBSD detector, either because they are out of focus, or because the projection lies outside the detection area of the apparatus. It is not believed that the amorphous hypothesis is correct because the amorphous patches that appear in the crevices of the sample have a characteristic length on the order of ~5 μm and the size of the unidentified regions in the EBSD image data is on the other of ~50 μm. It is believed the effect of the surface morphology on the back-scattered pattern is the most promising explanation. The fact that the upstream map contains significantly fewer data points without match compared to the downstream one and the correlation with surface roughness, suggest that the change in morphology is behind the increase of unidentifiable data-points.

Figure 16:
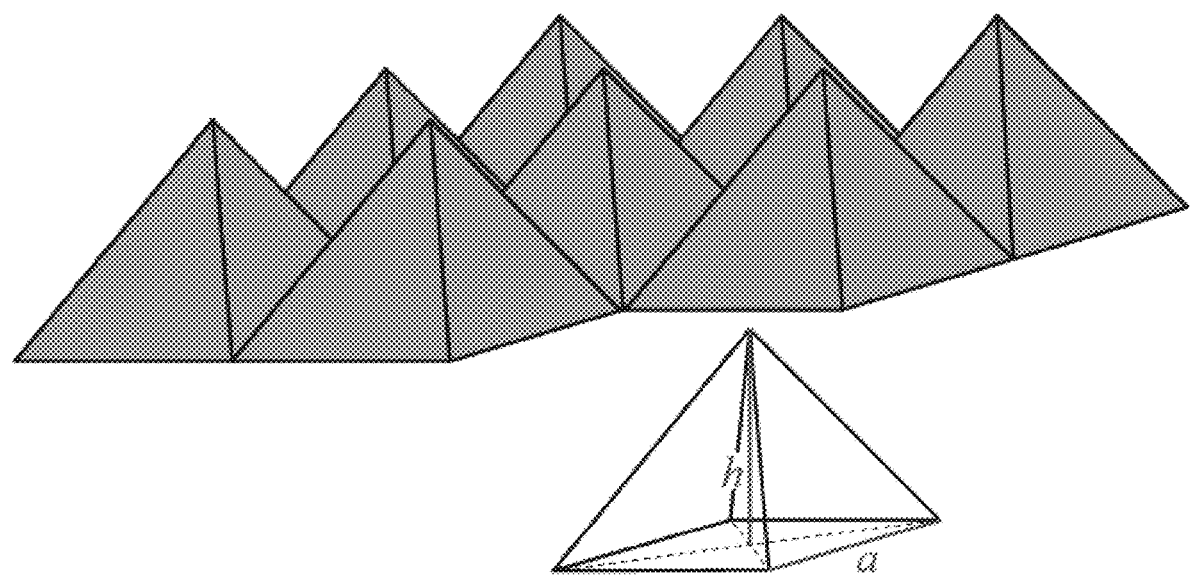
FIG. 16: Idealized surface morphology for effective emissive area estimation.
Figure 17:
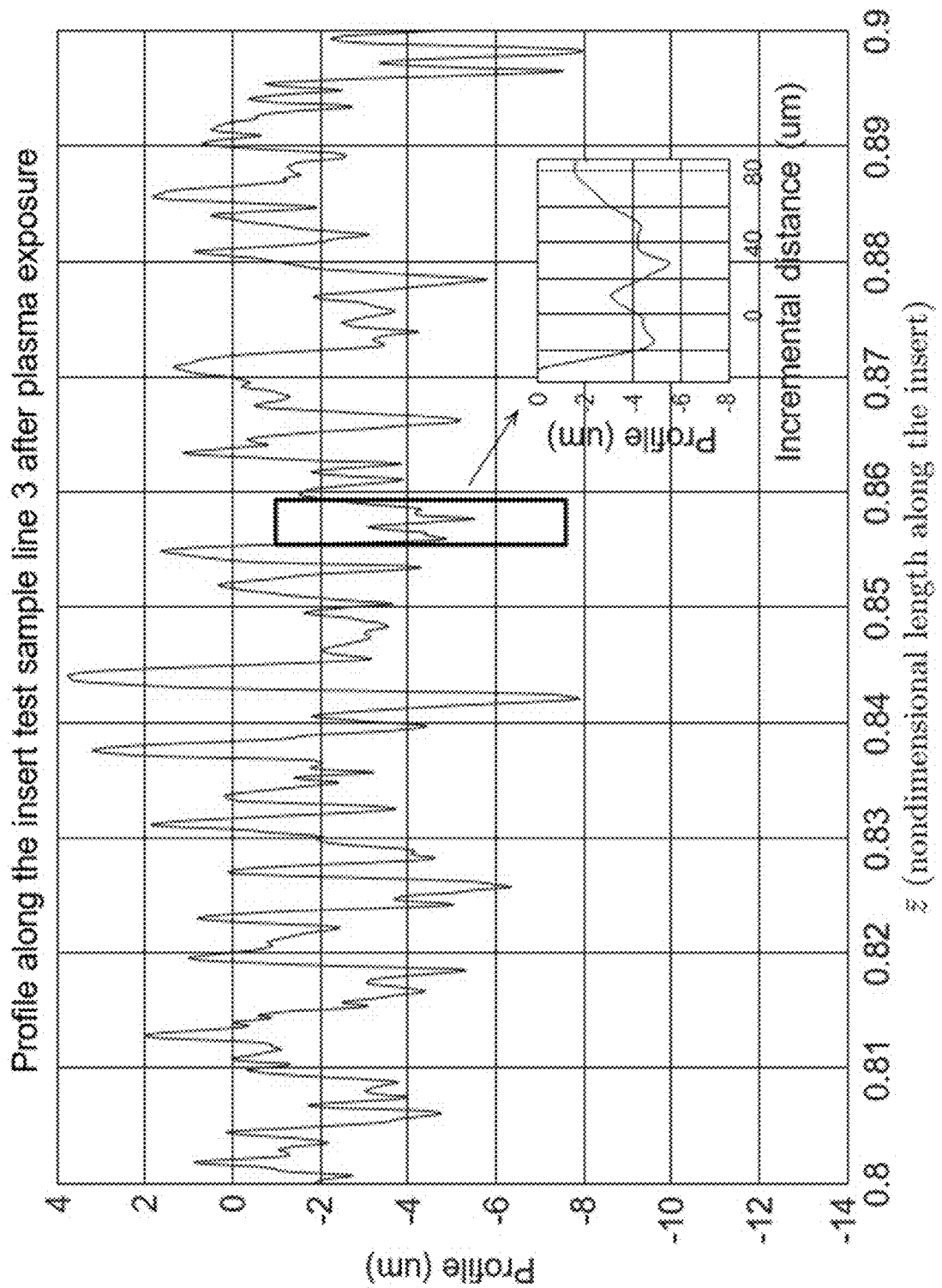
FIG. 17: Test sample profile after plasma exposure along line 3.
Figure 18A:
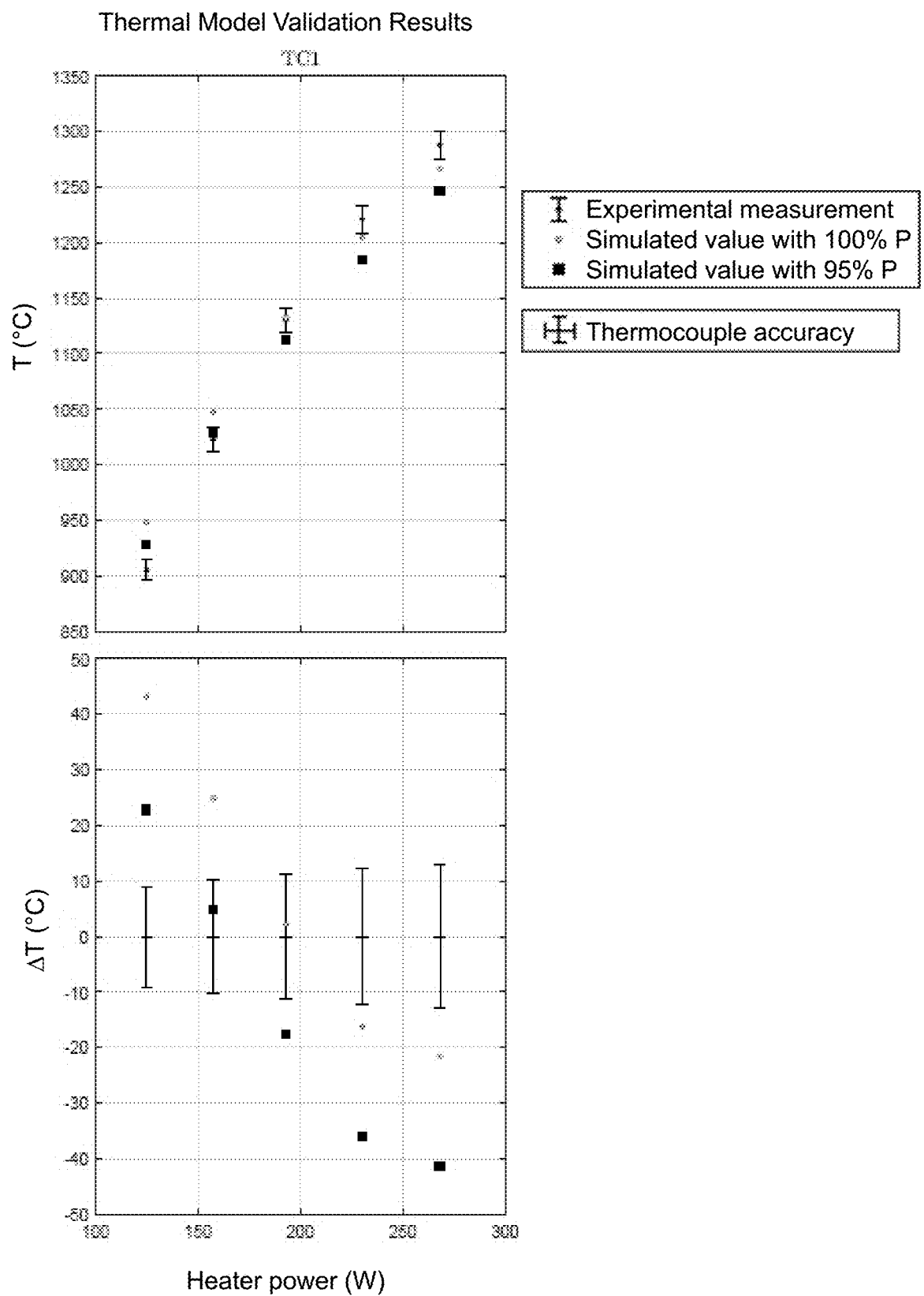
FIGS. 18A-18E: Plots of temperature vs. heater power showing COMSOL thermal model validation results.
Figure 18B:
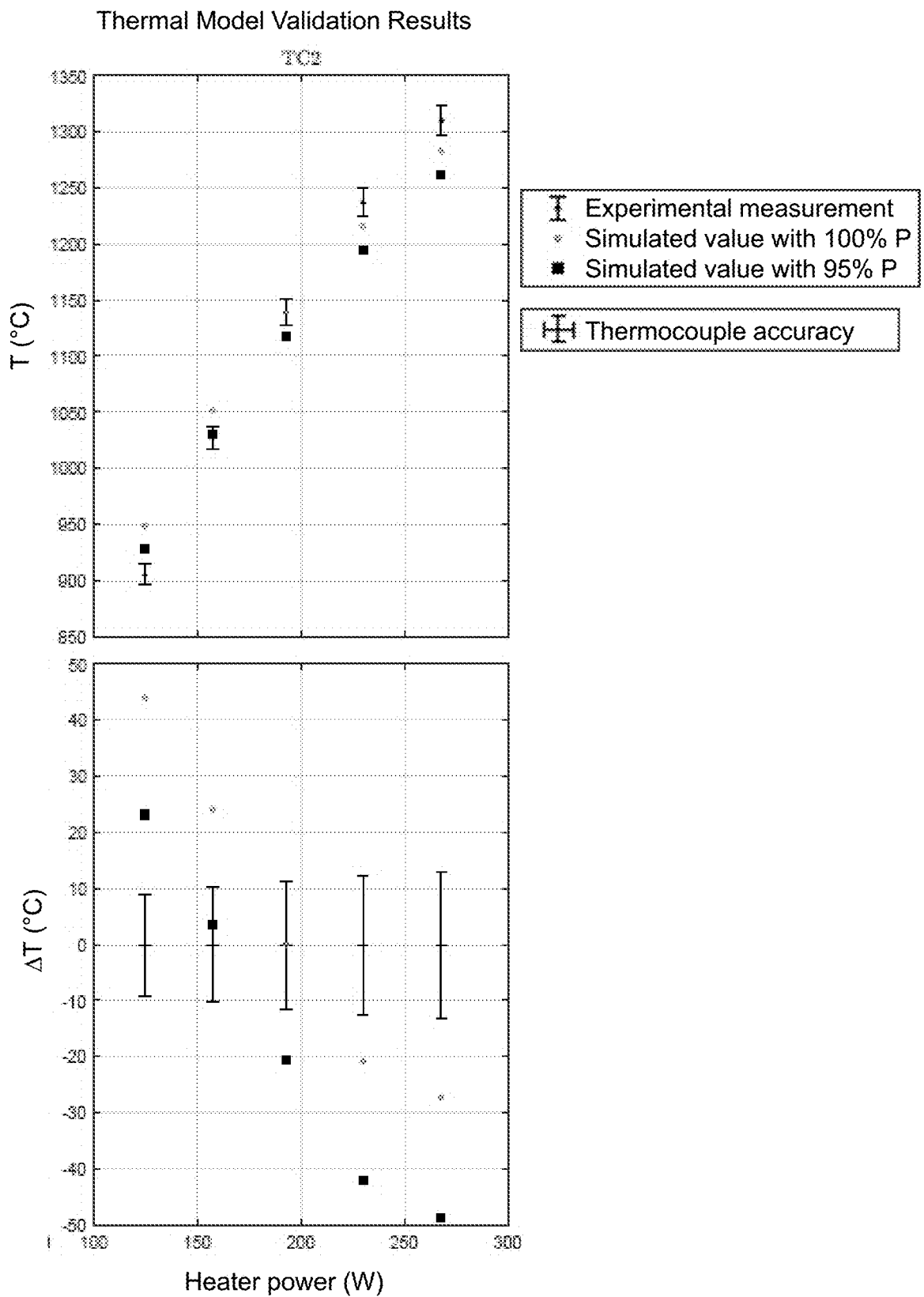
Figure 18C:
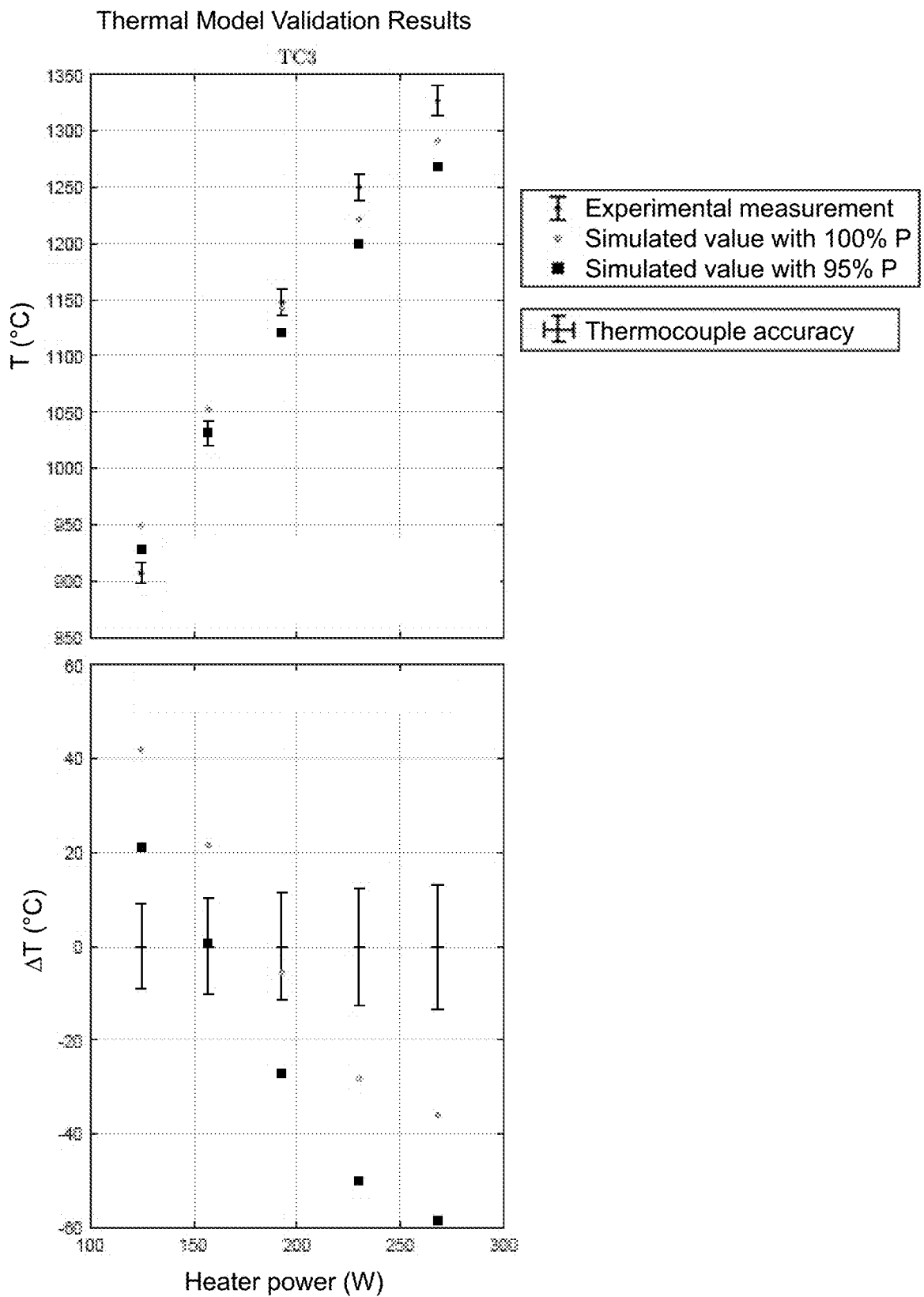
Figure 18D:
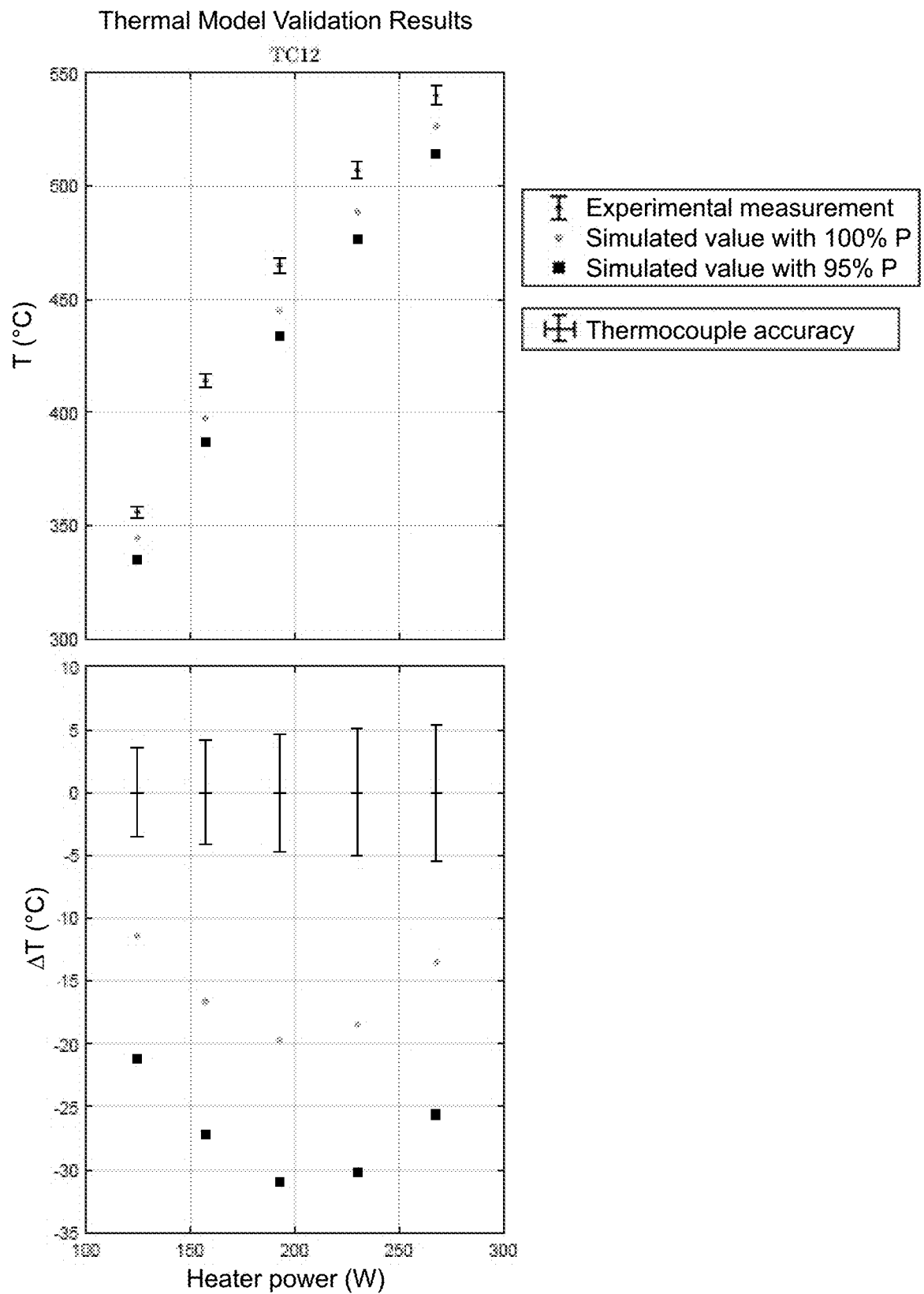
Figure 18E:
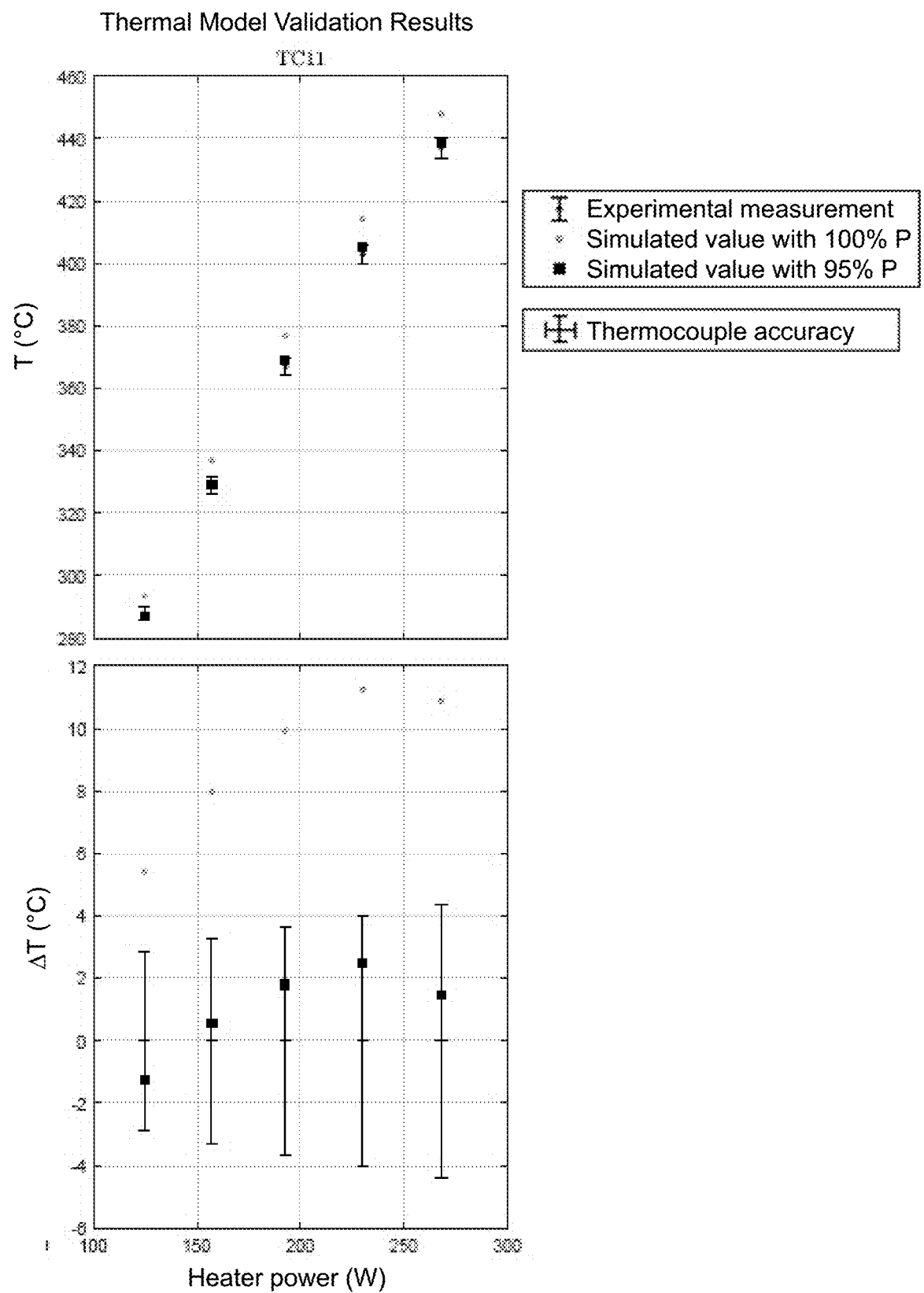

Morphology:

The observed roughness at the downstream end of the insert suggests that the effective emissive area has increased. Cathode operating temperature depends on the total thermionic emission for the given cathode operating point, which in turn depends on the size of the emitting area. An increase in insert surface area could therefore result in a reduction of the cathode operating temperature. To address the contribution of surface roughening to the observed lower operating temperature at steady state, the insert surface increase is quantified following plasma exposure. Based on the morphology at the roughest end of the insert observed by SEM, it is assumed a simplified model where the surface is composed of square pyramids, see FIG. 16. The pyramid height (h in FIG. 16) is estimated from the distance between valleys and peaks detected by profilometry analysis FIG. 13. The maximum value for this distance is 12 μm. In order to dimensionalize the size of the pyramids (a in FIG. 16), the profile of the surface along line 3 is used, FIG. 17. The profile of the downstream end of the insert shows that the pyramids side length is bigger than 30 μm. Assuming h=12 μm and a=30 μm, the surface area is 1.28 times the nominal area; a=20 μm and h=15 μm would result in a 1.8 times increase of the nominal area. The latter assumption is a large overestimation, especially given that sharp roughening is only present in the downstream end of the insert. Even when the effective area is doubled, the expected reduction of temperature is no more than 70° C. Therefore, while surface roughening may contribute to lower operating temperatures, it cannot fully explain the cathode thermal behaviour at steady state.

Conclusions

Collectively, the temperature evolution of the $LaB_6$ hollow cathode and the work function measurements with UPS presented in this study suggest that 50 hr exposure to the internal plasma of a hollow cathode improves the work function of polycrystalline $LaB_6$ with respect to the work function of the material prior to the exposure. Specifically, the work function measurement was performed in the test article at room temperature after exposure to the atmosphere, which suggests that the effect of the interaction of the plasma with the surface is permanent (the work function reduction is present even when the sample is not interacting with the plasma). The permanent reduction of the work function explains the different thermal transient behavior observed in our previous work [1] between a sample exposed to the plasma after manufacturing and a sample that has been exposed for a significant period of time.

In addition, it is learned that in the downstream end of the cathode, where the work function measured is the lowest, $LaB_6$ crystal faces have been exposed, as evidenced by SEM image of that area showing a faceted morphology. Furthermore, according to the XRD data Xe plasma creates a crystallographic texture at the $LaB_6$ surface. In summary, data showed that plasma-exposed insert surface consists of exclusively $LaB_6$, displays a faceted morphology and a crystallographic texture, and has a permanently reduced work function. Taken together, these results suggest that plasma-surface interaction induces a preferential exposure of $LaB_6$ crystal orientation associated with reduced work function (with respect to the vacuum value of 2.66 eV). From the thermodynamic point of view, given that those crystals survived the interaction with plasma ions, they should be among the most highly stable crystals of $LaB_6$. Therefore, it is anticipated that these crystals correspond to the lowest surface energy crystals of $LaB_6$, which according to a DFT study [6] are the crystals which exhibit the lowest work function of the material. The results of our study are in agreement with that theory.

With respect to the presence of $LaB_4$ in the sample after plasma exposure, both EBSD and XRD analyses show no evidence of this compound. However, there is a possibility that $LaB_4$ exists while the cathode is in operation and it transitions to $LaB_6$ as the cathode cools down. In this Example, the cathode is cooled down as fast as possible with the goal of freezing the chemistry at the surface of the insert. It will be of interest to model the kinetics of the transformation between $LaB_4$ and $LaB_6$ and compare it with the cool down rates of this work in order to understand the probability of the existence of $LaB_4$ prior to the cathode being shut down.

It is advisable to gain more insight into the La recycling hypothesis [1] in order to experimentally confirm that La gets recycled. Short thermal transients occur as the operating condition of the cathode is changed. Since the timescale of these transients is only few minutes, it is unlikely that they are caused by the crystallographic evolution of the insert surface. However, these short transients could be explained by a dynamic redeposition of ionized lanthanum which depends on the transport of this species by the specifics of the plasma distribution for each operating point of the cathode. In this case, the forced cationic termination that the recycled La would exert in the crystals of $LaB_6$ could be behind the aforementioned short time scale thermal transients. Those terminations would not be stable without the constant recycling of La, as the naturally terminated boron crystals would reappear when the operating condition of the cathode changes the plasma structure in the internal domain of the cathode and therefore affect the recycling intensity. The formation of $LaB_4$ could also explain the short thermal transients only if $LaB_4$ exhibits a lower work function than $LaB_6$ and at the same time, the kinetics of the transformation towards $LaB_6$ are on a short timescale, one that matches the observations of this discussion. Additional work should be done to confirm that La is effectively recycled in the insert plasma.

References Corresponding to Example 1

[1] Pablo Guerrero et al. "Work function reduction in lanthanum hexaboride hollow cathodes operated in gas discharges". In: 35th International Electric Propulsion Conference. Atlanta, Ga., USA, 2017, pp. 2017-399. url: https://iepc2017.org/sites/default/files/speaker-papers/iepc-2017_399.pdf%20http://erps.spacegrant.org/IEPC_2017/IEPC_2017_399.pdf (cit. on pp. 113, 114, 146, 147).

[2] Robert G. Jahn and Edgar Y. Choueiri. "Electric Propulsion". In: Encyclopedia of Physical Science and Technology. Vol. 5. 6. Elsevier, 2003, pp. 125-141. doi: 10.1016/60-12-227410-5/00201-5 (cit. on p. 113).

[3] Dan M. Goebel and Ira Katz. Fundamentals of Electric Propulsion: Ion and Hall Thrusters VO. 2008, pp. 1-507. doi: 10.1002/9780470436448 (cit. on p. 114).

[4] J. M. Lafferty. "Boride Cathodes". In: Journal of Applied Physics 22.3 (March 1951), pp. 299-309. doi: 10.1063/1.1699946 (cit. on pp. 114, 138).

[5] Pablo Guerrero et al. "Hollow cathode thermal modelling and self-consistent plasma solution: work function evaluation for a LaB 6 cathode." In: AIAA-SAE-ASEE Joint Propulsion Conference. 2018 (cit. on p. 114).

[6] M A Uijttewaal, G. A. de Wijs, and R. A. de Groot. "Ab Initio and Work Function and Surface Energy Anisotropy of LaB 6". In: The Journal of Physical Chemistry B 110.37 (September 2006), pp. 18459-18465. doi: 10.1021/jp063347i (cit. on pp. 114, 115, 147).

[7] Jian Wang et al. "Work functions of metal hexaborides: Density functional study". In: Modern Physics Letters B 32.2 (2018), pp. 1-8. doi: 10.1142/S0217984918500070 (cit. on p. 114).

[8] S. A. Chambers et al. "Cesium and oxygen coadsorption on LaB6, single crystal surfaces". In: Surface Science 118.1-2 (June 1982), pp. 75-92. doi: 10.1016/0039-6028(82)90015-2 (cit. on p. 116).

[9] R Thompson. "Production, Fabrication and Uses of Borides". In: The Physics and Chemistry of Carbides, Nitrides and Borides. Ed. by Robert Freer. Dordrecht: Springer Netherlands, 1990, pp. 113-120. doi: 10.1007/978-94-009-2101-6{¥}8 (cit. on p. 116).

Example 2: Hollow Cathode Plasma Model

All plasma simulations presented herein have been performed with the 2D axisymmetric solver of the partially ionized gas in hollow cathode discharges called OrCa$_2$D.

The physics models, conservation equations and numerical methods in OrCa$_2$D have been described in detail in previous articles [23,5,24,25] and will only be described briefly here. The code solves the conservation laws for three species in the partially-ionized gas: electrons, xenon ions and xenon neutrals. It is assumed that only singly-charged ions are present and that quasi-neutrality prevails except inside sheaths which are handled with appropriate boundary conditions. The Navier-Stokes equations are solved for the neutral gas only inside the cathode up to a "transition boundary" at which the method to obtain the solution changes to a collisionless approach that assumes neutrals follow straight-line trajectories [26]. The Euler equations for mass and momentum of ions are solved in the entire computational domain. A separate energy equation is solved for the ions, allowing for distinct temperatures for the two heavy species. Ionization, charge exchange and electron-ion collisions are accounted for in the equations and modeled either as source or drag terms. The solution for the electrons is obtained from a combination of Ohm's law, energy, and current conservation equations. An idealized model for the anomalous enhancement in the resistivity, which is now known to occur in the cathode plume [27,28] due the excitement of ion acoustic turbulence (IAT) there, is included in Ohm's law. The model is based on the formulations of Sagdeev and Galeev (S&G) [29] and is described in more detail in a paper by Mikellides, et al. [30].

The emitted electron current density from the insert is specified according to the Richardson-Dushman equation for thermionic emission [31]. The emitter temperature is implemented as a boundary condition in OrCa$_2$D using a 4th-order (or lower) polynomial that provides the temperature as a function of axial position along the emitter. The field-enhanced emission due to the Schottky effect is included, and its implementation in OrCa$_2$D is described in [32]. The work function must be provided and its value depends on the specific case studied. It is important to emphasize that net emission is determined not only by the emission current density but also by the current density of electrons and ions that are adsorbed by the emitter wall. This is also accounted for in OrCa$_2$D as described in [23,5]. For boundaries that are electrically conducting, electron and ion collection is accounted for in both limits of ion-attracting and an ion-repelling sheaths. This boundary condition was described in detail in [33]. At the anode, current is collected as specified by the discharge current. It is also assumed that ions become neutralized after they strike it and return back to the computational region as neutrals with a thermal speed that is based on the specified temperature of the anode.

Figure 19:
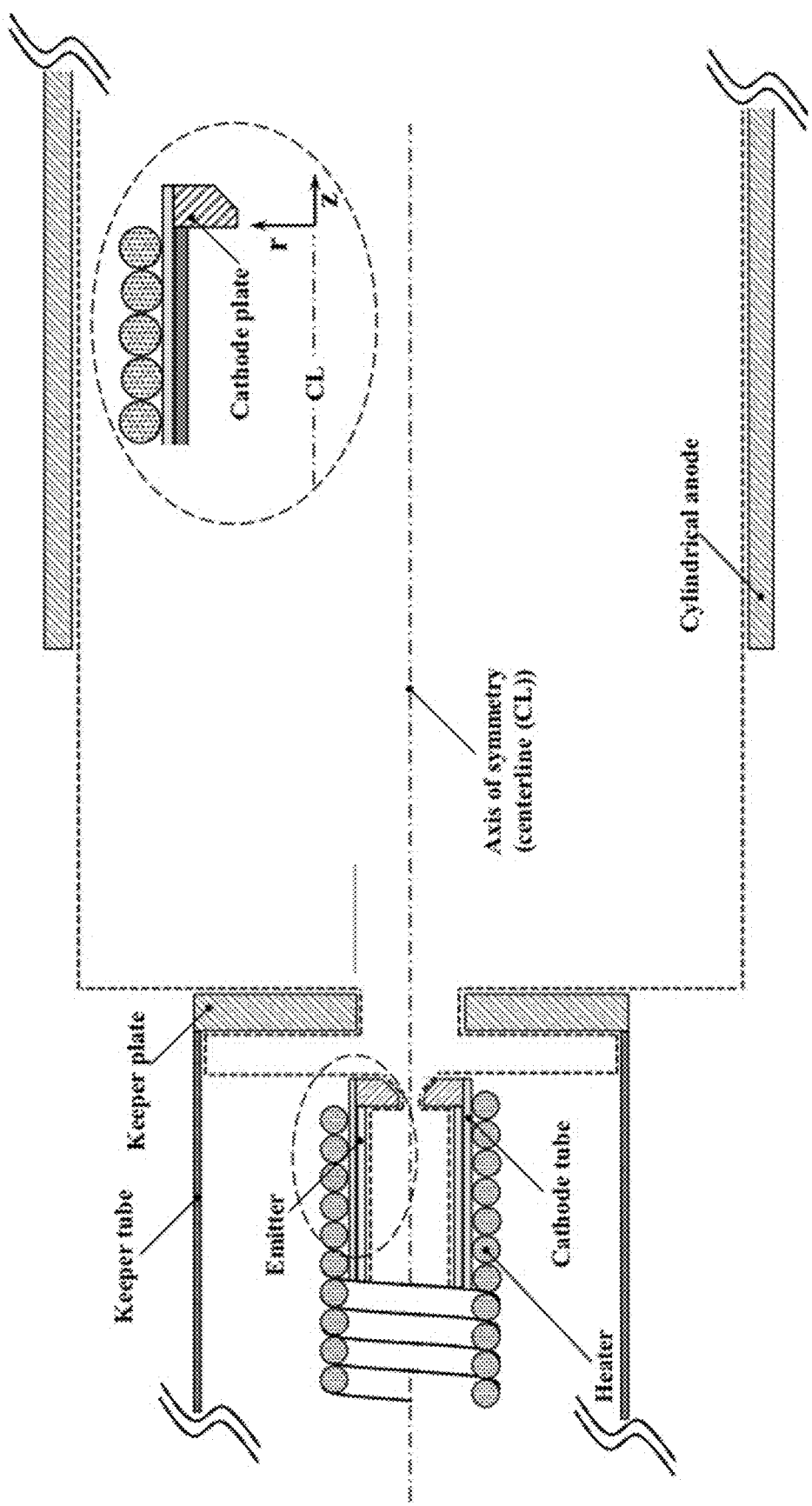
FIG. 19: Schematic of the computational domain (blue dashed outline) used in the $OrCa_2D$ simulations, in a region near the cathode electrodes and plume (not to-scale).
Figure 20:
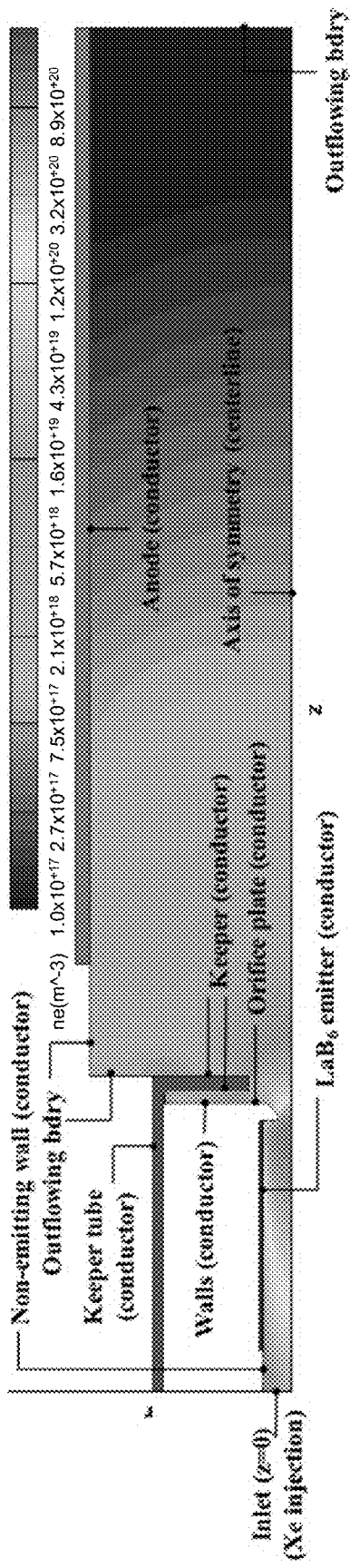
FIG. 20: $OrCa_2D$ numerical simulation (half) domain showing naming conventions for all relevant boundaries of the $LaB_6$ cathode. (Also shown is the simulation result for the electron number density, $n_e$ (the details of which are described later in this article).

In the experiments that provided the conditions and measurements for the cathode investigated here, a cylindrical anode was used [6]. The OrCa$_2$D computational domain in the vicinity of the cathode plate and near plume is outlined in FIG. 19. The full domain from a representative simulation of the cathode is shown in FIG. 20. The two figures also provide naming conventions for the various cathode components and boundary conditions that are relevant to this study. The inlet boundary is defined to be at z=0 in the domain. The keeper was set to collect no net current (i.e. it was floating), which was accounted for in the simulations through appropriate boundary conditions. A zero-current condition also was specified at the out-flowing boundaries (FIG. 20). A magnetic field was not applied in the experiments or the simulations.

The highest Xe$^+$ number density expected in the cathode is on the order of $n_{i\_max}=10^{21}$ m$^{-3}$. Using that estimate for the plasma density, the photon mean free path based on the Planck opacity or the Rosseland opacity is much larger than 10 cm and 2.5 m respectively [34,35]. Thus, the plasma is considered transparent and it does not interact with the thermal radiation mechanisms described above.

At every global iteration step, a new temperature profile is input to the plasma solver. OrCa$_2$D was configured to find the plasma solution that provides the keeper voltage that matches the experimentally measured value of $V_K$. Then, the new heat fluxes associated with the converged plasma solution are input into the thermal model in order to generate an updated temperature profile for the insert ($T_{insert}(Z)$). This is one of the many approaches that can be used to update the plasma solution at every iteration. This approach provided the most stable convergence in the global sense because the plasma solution is always close to the one that matches the experimental value of $V_K$, and only the heat fluxes are being influenced by the small changes in the plasma distribution and the updated value of the work function.

During the simulation, the evolution of the plasma solution is monitored by several numerical probes positioned throughout the computational domain. A convergence criterion has been implemented in OrCa$_2$D that is based on the time-averaged computed variables. The algorithm computes the percent change in the main plasma variables within a specified time increment, from all numerical probes. The simulation is terminated when the maximum percent change is less than $10^{-6}$. The MATLAB® framework was built to be able to manipulate this convergence criterion as needed. The current configuration requires the plasma solver to produce more accurate results as the global simulation gets closer to the self-consistent solution. This strategy optimizes global convergence computational time without affecting the fidelity of the final solution.

Initial Plasma Solution for the Coupled Plasma-Thermal Simulations:

To start the coupled plasma-thermal simulations an initial solution of the plasma must be provided. This is obtained with OrCa$_2$D as follows. The mass flow rate and discharge current are required as inputs to the simulation. They are therefore specified directly in the code based on the conditions under which the experiment was conducted, namely 13 sccm and 25 A. To achieve the specified discharge current, an iteration is performed on a single coefficient that determines the level of resistivity enhancement due to the IAT in the cathode plume, as described in more detail in Mikellides, et al. [36]. The discharge voltage is set in the simulations at 25 V to match the experiments. The temperature along the emitter $T_{insert}(T)$, is specified using a 2nd-degree polynomial fit to measurements using three type C thermocouples. The simulation iterates on the value of the work function to obtain the measured keeper voltage of 4.2 V.

Figure 22:
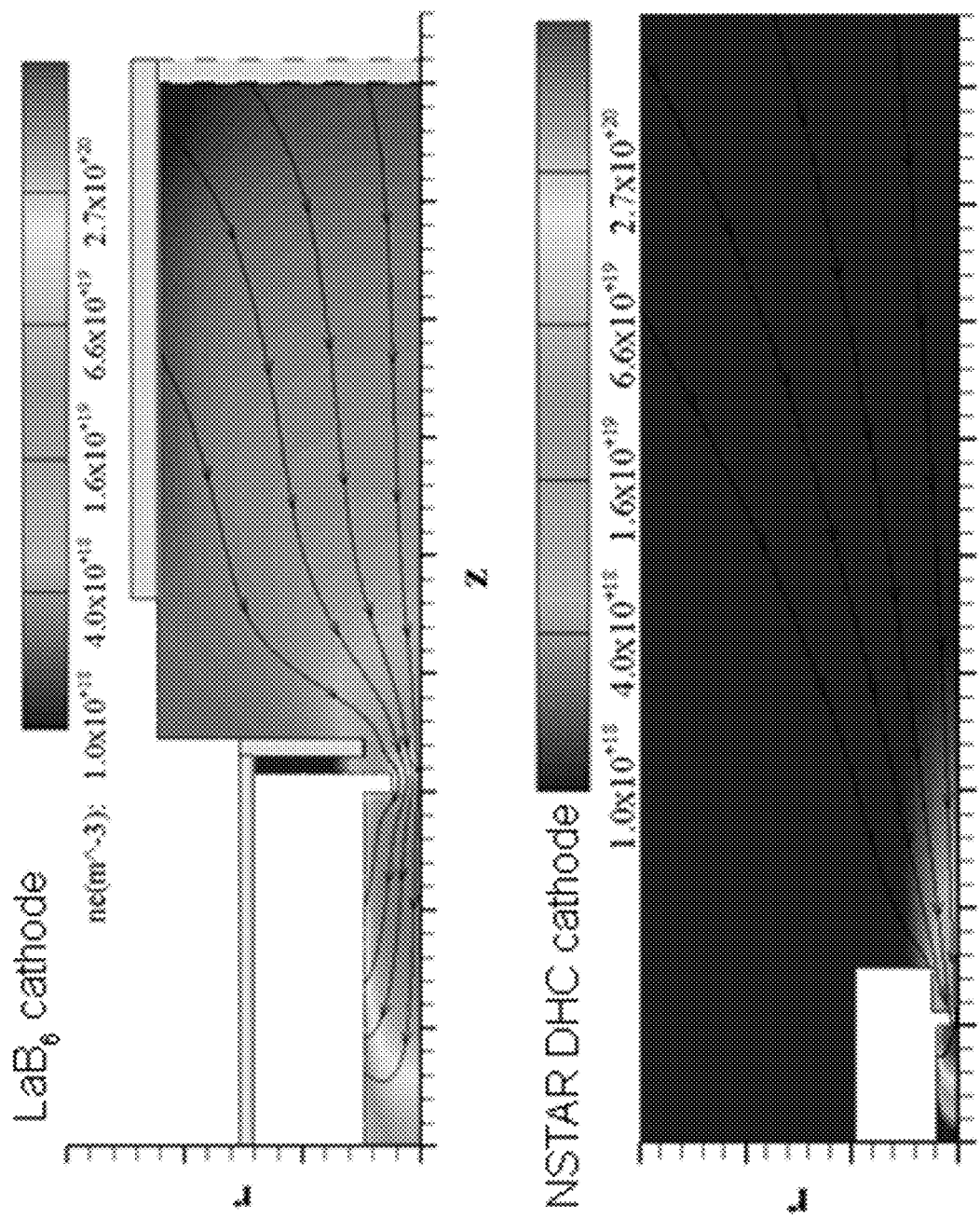
FIG. 22: Comparison of a $LaB_6$ hollow cathode operating at 100 A and 12 sccm with a BaO cathode (called NSTAR DHC) operating at 13.3 A and 3.7 sccm. $OrCa_2D$ simulation results for the electron number density showing the significantly different geometries of the two cathodes. Also shown are representative electron current density streamlines. [2]

Plasma Model Validation:

Unlike general-purpose computational tools, such as commercial computational fluid dynamics (CFD) and scientific magneto hydrodynamics (MHD) codes, OrCa$_2$D was developed to simulate a very specific problem, namely the hollow cathode discharge. A main reason for developing a new code to do this was that the physics that drive the discharge are uniquely diverse in these devices and span a wide range of spatial and temporal scales. Hence, it became evident very early that attempts to model the problem using general-purpose tools, or some modified version of them, would be futile and that a tailored mathematical and numerical approach had to be developed from scratch. A consequence of this is that the ability to validate the strongly-coupled governing physics models, or even subsets of these models, using existing analytical solutions were very limited. Thus, OrCa$_2$D's validation has been pursued largely by direct comparisons with laboratory measurements, which themselves carry uncertainties of varying degrees. Because neither the simulations nor the experiments performed to validate them are straightforward, the comparisons between the numerical results and the laboratory measurements have varied. A typical example is provided in FIG. 22, which shows comparisons between OrCa$_2$D and experimental results for two very different hollow cathodes [32]. In the small cathode (bottom), called NSTAR DHC, the agreement between electron number densities was well within the uncertainty of the measurement whereas in the larger cathode the simulation under-predicted the measurement in the interior by about a factor of 1.7. Despite this discrepancy, the agreement with the plasma potential and electron temperature in this same cathode was found to be less than 10% and 25%, respectively.

Development of the code began in 2004 and since then it has been used to simulate numerous hollow cathodes, operating under a wide range of conditions [23,5,37,24,33,25, 38]. In most cases, each investigation focused on a given geometry at a fixed or a range of operating conditions to elucidate specific physics such as electrode erosion [23,24, 33], emission and related sheath physics [37,5], power deposition and thermal response of the cathode [2,39,37], effects of neutral gas viscosity [25], BaO material transport [40,41], operation at high discharge currents [32], and electron transport due to ion-acoustic turbulence [42]. In many cases, especially early in the development of OrCa$_2$D, comparisons between simulations and laboratory measurements helped advance the physics models, thereby improving the fidelity of the code. Occasionally, even with the more accurate models, larger discrepancies would be obtained in one cathode compared to another (such as those shown in FIG. 22). Since the code solves the same governing equations for every cathode, part of these discrepancy variations were due to uncertainties that are difficult to quantify, for example in the inputs to the simulations and/or in the laboratory measurements, and/or due to subtle differences between simulation and experimental setup. For example, in FIG. 22, the emitter temperature (a required boundary condition for OrCa$_2$D), was not known as well in the 100-A cathode as it was in the 13.3-A cathode, which the authors identified as a possible source of the discrepancy in the density.

Heat Flux Model:

The inner region plasma consists of three fluids—neutrals, electrons and ions. Depending on the operating point of the cathode, different fluxes of those species reach the internal cathode surfaces exposed to the plasma. These fluxes heat the cathode, thus maintaining operating temperatures. The heat fluxes are computed following Eqs. 3.4, 3.5 and 3.6

$$\dot{q}_{ther} = -j_{ther}\varphi \quad (3.4)$$

$$\dot{q}_e = -j_{e-return}(2T_e + \varphi) \quad (3.5)$$

$$\dot{q}_i = -j_{i-return}\left(\alpha_{EAC}^0 f(\beta)\left(\varphi_{sheath} + \frac{T_e}{2}\right) + \alpha_{ISC}E_{NC}\right) \quad (3.6)$$

where $\dot{q}_{ther}$, is a cooling heat flux term due to electrons going over the work function barrier of the insert. $\dot{q}_e$ and $\dot{q}_i$ are heating terms associated with the return current of electrons and ions. $j_{ther}$ is the thermionically emitted electron current density defined by $$j_{ther}(\phi, T) = DT^2 \exp\left(\frac{-e(\phi - \phi_{Schottky})}{K_B T}\right) \cdot j_{e-return}$$

is the return current density of electrons. $j_{i-return}$ is the return current density of ions. $\varphi$ is the work function of the insert. $T_e$ is the electron temperature at the sheath edge. $\varphi_{sheath}$ is the potential of the sheath. $\alpha_{ISC}$ is the ion survival probability. $\alpha_{EAC}^0$ is the energy accommodation coefficient for normal-to-the-surface angle of incidence $\beta$. $f(\beta)$ is the function that models the dependence of the energy accommodation coefficient with ion-surface incidence angle. $E_{NC}$ is the energy associated with the neutralization event, with a maximum possible value equal to the ionization potential of the first excited state of the gas minus the work function of the surface.

In the cathode used in this study, the main thermal load consists of ions returning to the cathode, accelerated in the sheath and pre-sheath. The main cooling load comes from the thermionic emission of electrons into the plasma. The emitter and the orifice plate receive approximately the same net heat load. The next relevant heat load is received by the keeper. The electron heating effect is insignificant given the low electron return current collected.

The total amount of energy that ions returning to the cathode bring with them consists of the energy picked up as the ions are accelerated through the potential of the sheath $j_{i\text{-}return} \varphi_{sheath}$, their thermal energy $j_{i\text{-}return} T_e/2$ (due to the plasma potential drop in the pre-sheath), and the ionization potential (IP) of the specific gas used, in our case, xenon [43]. The exact amount of heat transferred to a surface when an ion collides with it depends on the following factors: ion survival probability, energy accommodation factor, and neutralization mechanism.

The ion survival probability $\alpha_{ISC}$ quantifies the probability that an ion will be neutralized when it interacts with a surface. In our case, the low energy of the noble gas ions returning to the surfaces of the cathode (<50 eV) indicate that one can assume 0% probability of ion survival rate ($\alpha_{ISC}=1$) [44].

The return current of electrons is estimated following classical sheath theory [43]. Returning electrons heat the material by the work function as they descend through the potential barrier of the surface. They also transfer their kinetic energy, computed as the flux weighted average kinetic energy [2].

Energy Accommodation Coefficient:

The energy accommodation coefficient $\alpha_{EAC}$ depends on the inelastic behavior of the interaction between ions and the atomic structure of the surface, therefore, it is a function of the energy and incident angle of the ions with respect to the normal of the surface (β). $\alpha_{EAC}$ only affects the potential and thermal energy of the ions, where $a_{EAC}^0$ is the energy accommodation factor for normal ion incidence and f(β) is the function that accounts for deviations with respect to the normal. In this Example, the canonical form of f(β)=cos(β) is used as the ions become merely perpendicular to the surface due to the strong action of the sheath, and therefore, the results are basically insensitive to the functional form of f(β).

Figure 23:
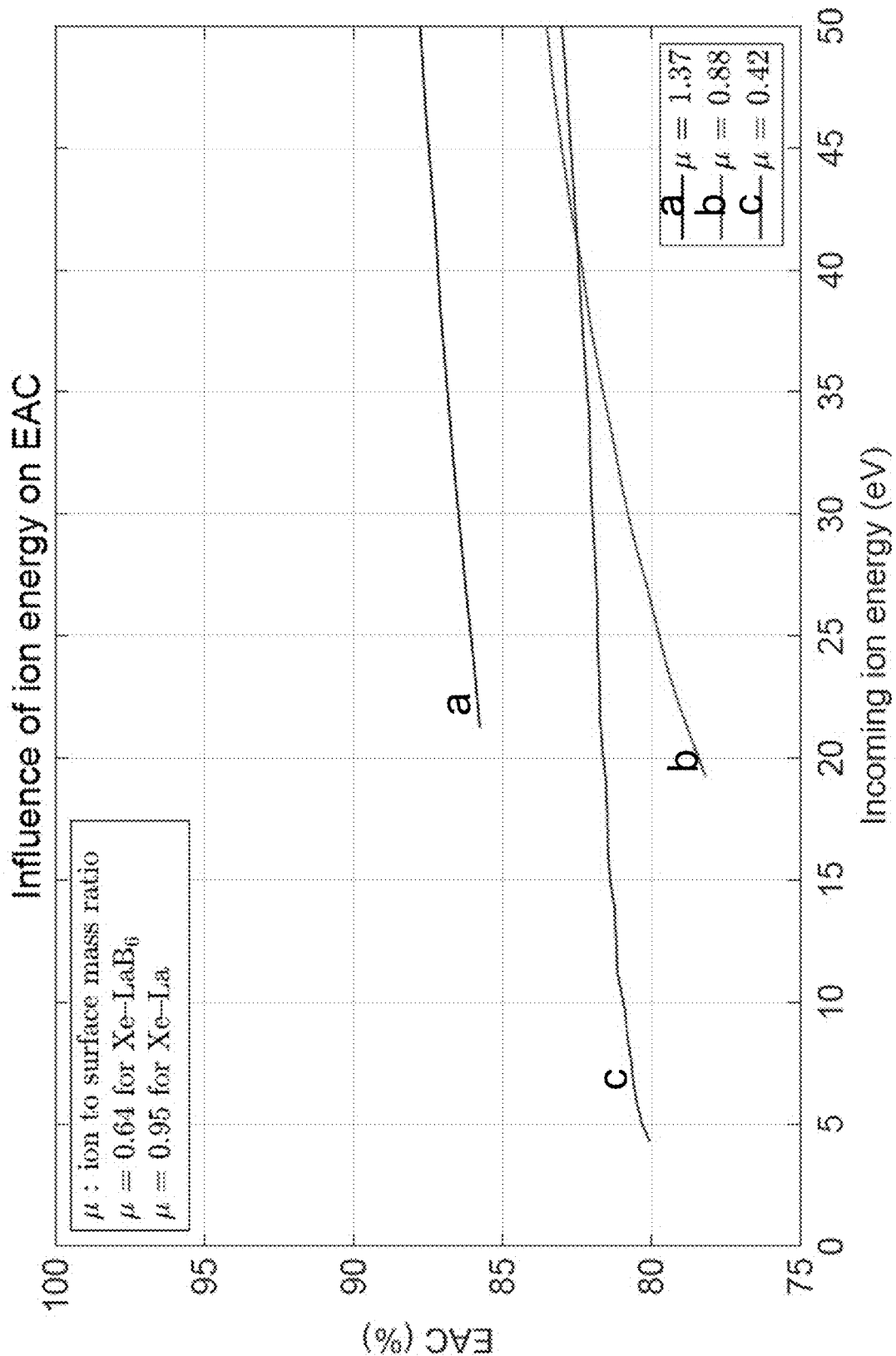
FIG. 23: EAC as a function of ion-surface mass ratio and ion energy. Data from [45].

The energy accommodation coefficient (EAC) strongly depends on the mass ratio (p) between gas ions and surface atoms. The EAC is different for ion-surface interaction and neutral-surface interaction. To our knowledge, there are no data available in the literature for the system $Xe^+$—$LaB_6$ in the energy range of interest for this work. In order to bound the effect of the EAC in our case, the results of the only data available for the interaction between low energy ions and polycrystalline surfaces [45] is extrapolated, see FIG. 23. In our case, Xe ions interact with $LaB_6$ crystals. Depending on the crystal, the interaction will occur with lanthanum atoms (when the crystal is purely terminated in La, like the crystal (001)) or a molecular form of $LaB_6$, depending on how many boron atoms participate on the interaction. In the case $Xe^+$—$LaB_6$, $\mu_{Xe^+\text{-}LaB_6}=0.64$ and in the case $Xe^+$—La, $\mu_{Xe^+\text{-}La}=0.95$. According to Shuvalov's experimental data, the $EAC_{Xe+}$-$LaB_6$ for ion energies lower than 50 eV must be lower than 90% and higher than 75%.

Neutralization Model:

The energy associated with the neutralization event is accounted for in $E_{NC}$. There are two possible families of neutralization mechanisms based on how many steps it takes for the neutralization event to be completed: single or two step. The selection of mechanism depends on the surface internal electron density distribution where the ions collide, and on the energy level of ionized and first excited neutral states of the incoming ion.

One Step Neutralization Model:

Among the single step neutralization mechanisms only two are applicable to the case where low energy ions impact solid surfaces: resonant tunneling neutralization and Auger neutralization. The leading theory describes resonant neutralization as the dominant mechanism by which low energy ions neutralize upon interactions with conductive surfaces [46]. Auger neutralization can still exist in this case, with a much smaller probability. Only when the density of states (DOS) in the solid is not aligned with the energy levels in the ion, Auger neutralization takes a dominant role. This is the case when $He^+$ interact with metals. In our case, if the neutralization event between $Xe^+$ and $LaB_6$ occurs following a single step, it will most probably do it by resonant neutralization. In this case, incident xenon ions are neutralized as they come closer to the surface by tunneling an electron from the appropriate energy band of the solid into an energy hole of the ion, thus creating a ground state xenon neutral. In this case the energy given to the surface is the ionization potential of xenon minus the work function of the surface $E_{NC}$=IP−WF, where IP=$E(Xe^+)$−$E(Xe^0)$.

Two Step Neutralization Model:

The alternative neutralization model consists of resonant neutralization to the first excited state of xenon ($Xe^*$) followed by Auger de-excitation to the ground state of xenon (Xe) [47]. This mechanism is only possible if the work function of the material is low enough, thus allowing electrons from the appropriate energy level in the material to fill the respective energy hole in the ion, creating an excited neutral. In the case of xenon, the difference between the ionized and the first excited state is $E(Xe^+)$−$E(Xe^*)$=3.81 eV [48]. This means that only the emitter surface can be modelled with this two step neutralization model, as the other surfaces are pure metals and their work function is greater than 3.81 eV. The probability of creating excited neutrals is higher than creating ground state atoms because electrons have to tunnel through a lower potential barrier.

In the first step, the amount of heat exchanged between the ion and the surface is due to the transfer of one electron per ion neutralized, $E(Xe^+)$−$E(Xe^*)$−WF. During the second step, the excess of energy contained in the excited xenon neutral relaxes to the ground state xenon neutral by transferring that energy to the solid. The electrons in the solid will then be excited with this energy. Depending on the distribution of the energy in the solid, a different population of electrons will be excited and a portion of them will be emitted by means of Auger de-excitation. We model that yield with a parameter, $\gamma_{Auger}$. In summary, the total amount of energy deposited in the solid due to neutralization per ion strike is $E_{NC}$=IP−WF−$\gamma_{Auger}(E(Xe^*)−E(Xe^0))$.

As a side effect, electrons are emitted from the solid at a rate $j_e^A=\gamma_{Auger}j_{i\text{-}return}$. These electrons get accelerated away from the emitter by the emitter sheath. This component was accounted for in $OrCa_2D$ when computing the net charge exchange at the emitter surface. To date, there does not exist a theory or simulation capable of estimating the value of $\gamma_{Auger}$ given specific ions and solids. However, it is possible to experimentally quantify it. To our knowledge, this has never been measured for the combination $Xe^+$—$LaB_6$. Values below $\gamma_{Auger}=3$ have been measured for several noble gases at different charge states interacting with tungsten [49].

Figure 21:
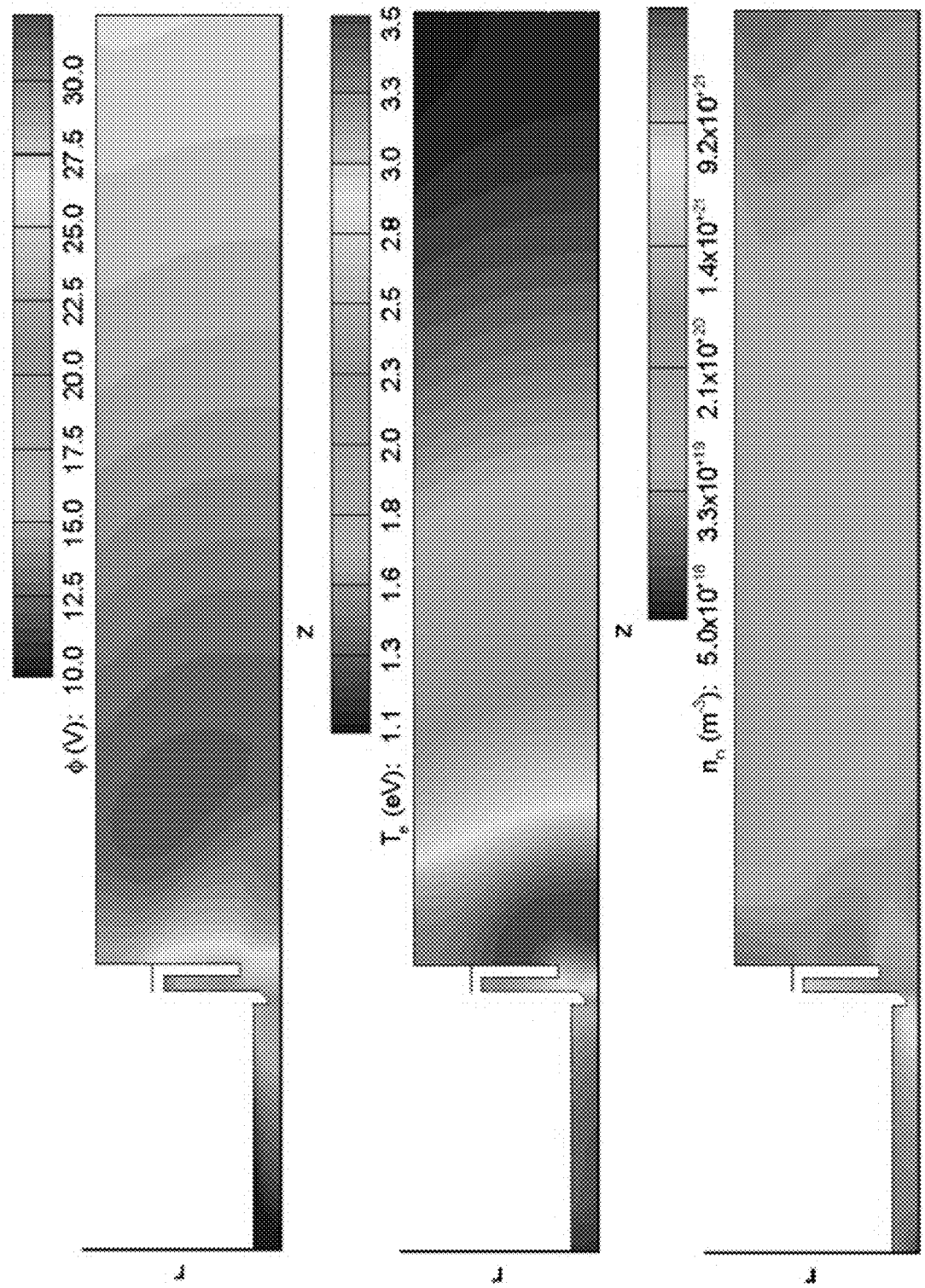
FIG. 21: Steady-state solution for the plasma potential ($\varphi$), electron temperature ($T_e$) and neutral gas density ($n_n$) from the $OrCa_2D$ simulations with an initial emitter temperature profile. The solution was used to calculate the initial heat fluxes for the coupled plasma-thermal simulations.

Iterative Solution:

As noted earlier, the plasma solution in FIG. 21 is used to calculate the initial heat fluxes for the coupled plasma-thermal simulations. During the coupled simulations the approach to obtain the steady-state OrCa$_2$D solution at each intermediate global iteration remains essentially the same. The exception is that at each iteration a new polynomial fit to the emitter temperature is defined at the OrCa$_2$D emitter boundary, based on the solution provided by the thermal model. With the newly defined temperature, OrCa$_2$D then proceeds to obtain the new steady-state solution by performing the two aforementioned iterations in parallel, namely on the anomalous transport coefficient to attain the specified discharge current (25 A) and on the work function to attain the measured keeper voltage (4.2 V).

Figure 24:
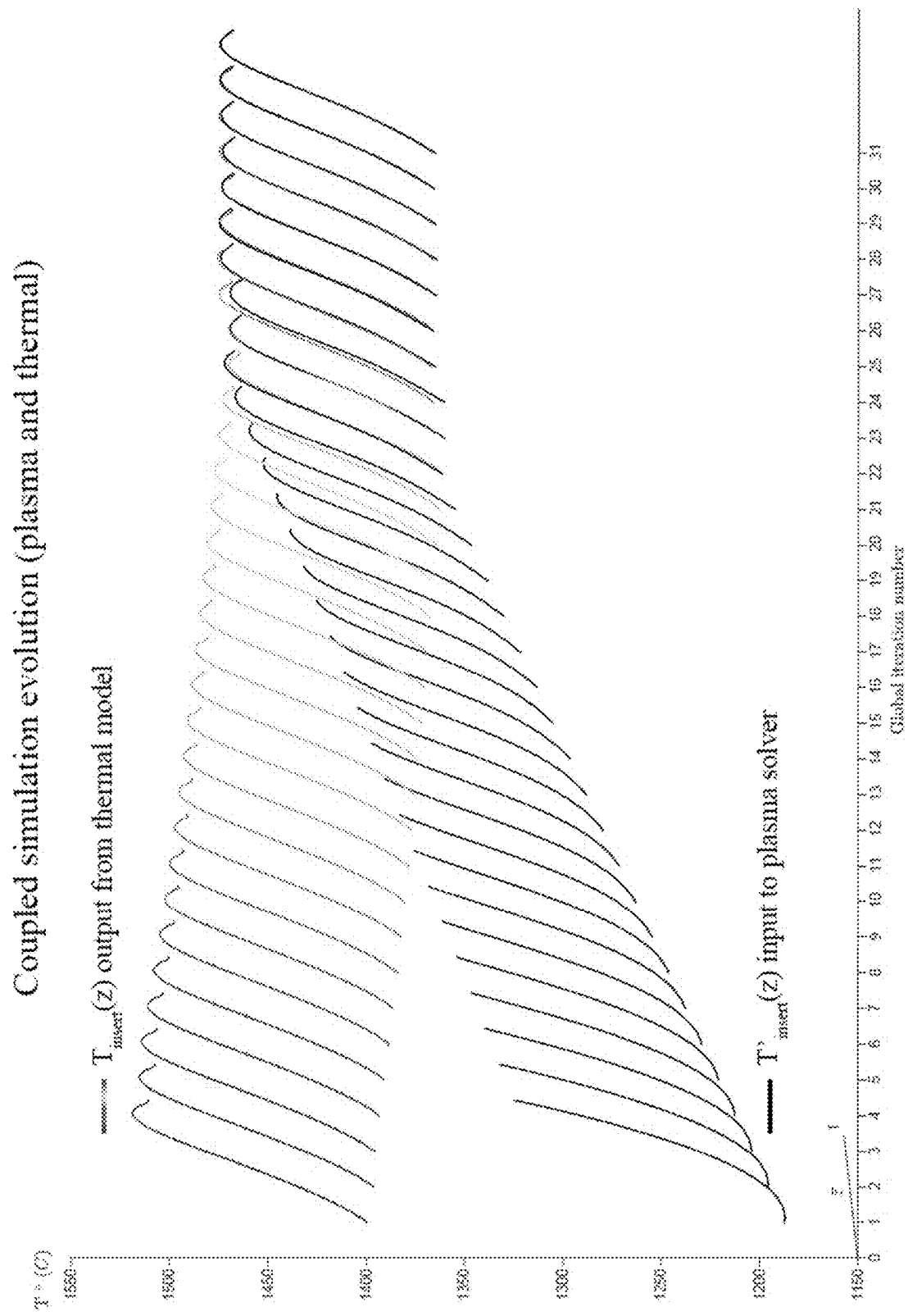
FIG. 24: Evolution of the temperature input to $OrCa_2D$ (black curves) and output from COMSOL thermal model based on heat fluxes from the last iteration of $OrCa_2D$ (colored curves).

Initializing the coupled plasma-thermal model with the aforementioned plasma solution produces the evolution of temperature $T_{insert}(z)_i$ and global $T_{insert}(z)_i$ at every global iteration step i, as shown in FIG. 24.

Results:

We employed the novel scheme described above to study the self-consistent solution of a LaB$_6$ cathode running at $J_D$=25 A and $\dot{m}_{Xe}$=13 sccm with the experimentally measured values of $V_K$=4.2 V and $V_D$=25 V for the keeper and discharge voltage. In the simulations presented here, the plasma convergence criterion was set to 0.002%.

Baseline Thermal Model, $\alpha_{EAC}^0$=1, One Step Neutralization:

The self-consistent solution $(T_{insert}(Z)_i=T'_{insert}(z)_i)$ is a baseline thermal model. The modelling approach for the heat fluxes assumes $\alpha_{EAC}^0$=1, and $f(\beta)$=1. The neutralization mechanism is the single step resonant neutralization to Xe$^0$ and the work function profile along the insert is constant. In this case the work function converged to 2.55 eV and the net return current was 19.76% of the discharge current.

Notably, the converged insert temperature profile does not match the thermocouple measurements, with the solution predicting higher temperature (~150° C.) than that measured with thermocouples. The thermocouple measurement approach was thoroughly analyzed previously [6], and it was determined that the discrepancy observed in the coupled converged solution cannot be explained by an inaccuracy of the temperature measurements. Therefore, is it determined that this discrepancy must the result of modelling inaccuracies in either the plasma, heat flux or thermal models.

Sensitivity to Errors in Plasma Model Results:

We did not perform a sensitivity analysis for the plasma model as such analysis is outside the scope of this work. However, the heat fluxes are primarily dictated by the return and thermionic currents which are coupled with the plasma solution. It is of interest for future work to thoroughly study the dependence of the heat fluxes on the assumptions and sensitivities of the different variables involved in the definition of the plasma solution.

Sensitivity to Thermal Model Assumptions:

To understand the sensitivity of the thermal model to the different parameters that define it, we studied the impact of parameter variations from the baseline thermal model. The most sensitive parameter in the cathode thermal behavior is the value for the total hemispherical emissivity of tantalum $(\varepsilon_{Ta})$. $\varepsilon_{Ta}$ is used to model the radiation properties of the cathode tube, the heater and the radiation shield. $\varepsilon_{Ta}$ in the literature is obtained for pure polished material. We observed darkening of different Ta cathode components, indicating impurities, that may increase the actual value of the emissivity. The darkening was particularly prominent on the radiation shielding, therefore, we used a value of $\varepsilon_{Ta}$+0.2 for this component in order to obtain the agreement shown in FIGS. 18A-18E. This value was also used in a baseline simulation.

We created a new thermal model to understand how the baseline thermal model validation is impacted by the increase of the emissivity that defines the radiation properties for some of its components. This new thermal model underestimates the global thermal losses of the cathode, and therefore, for any given power input, the temperature distribution of the inner region (insert region) is colder than the experimental values, see FIG. 25. The only difference between this thermal model and the baseline is that we have added 0.4 to the $\varepsilon_{Ta}$ from literature in the material properties utilized to model the radiation shield, as opposed to 0.2 used in the baseline.

Figure 25A:
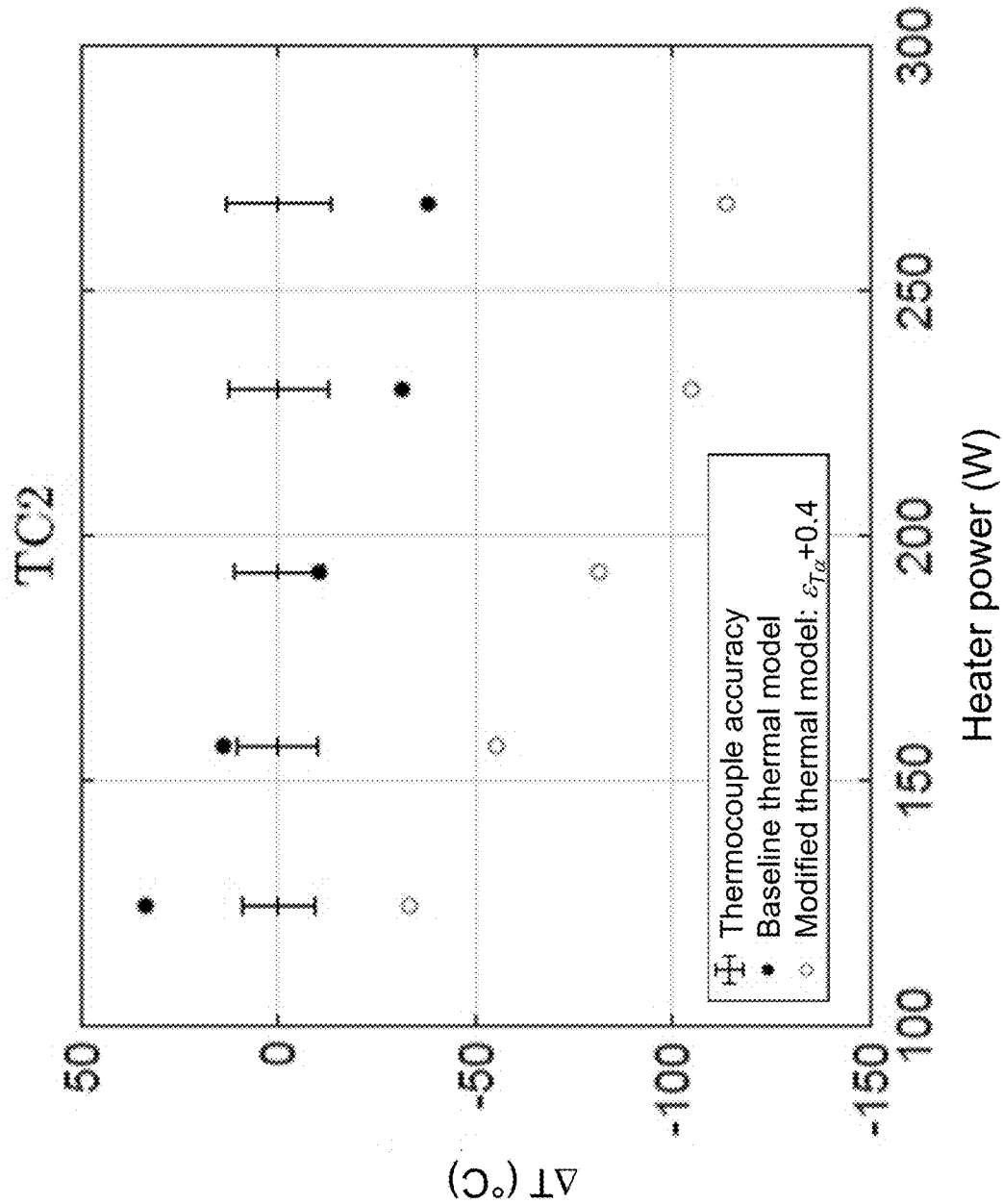
FIGS. 25A-25C: COMSOL thermal model validation results. Comparison between thermal model baseline and modified version with 0.4 addition to the emissivity of the radiation shield for (FIG. 25A) TC2, (FIG. 25B) TC12, and (FIG. 25C) TC11.
Figure 25B:
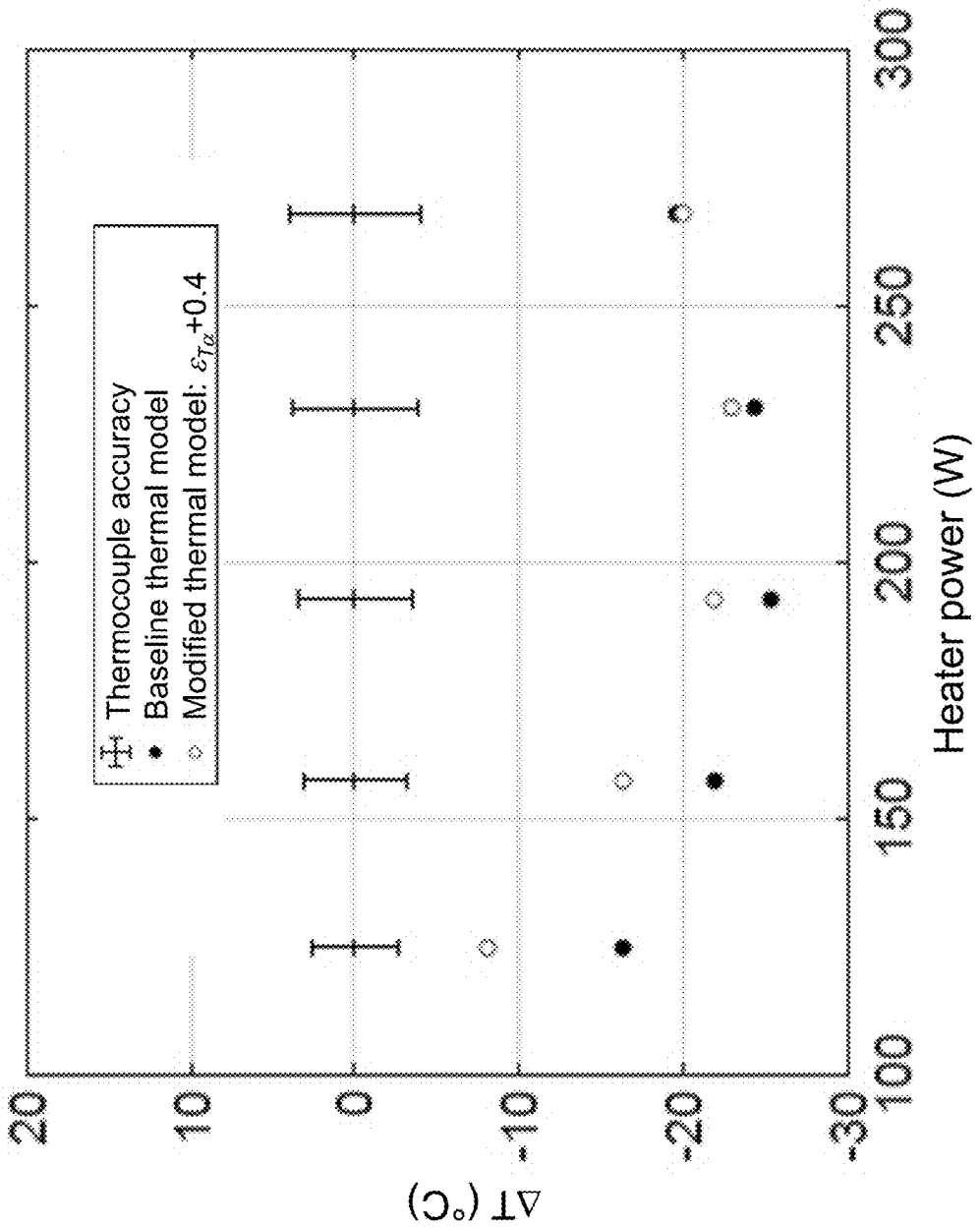
Figure 25C:
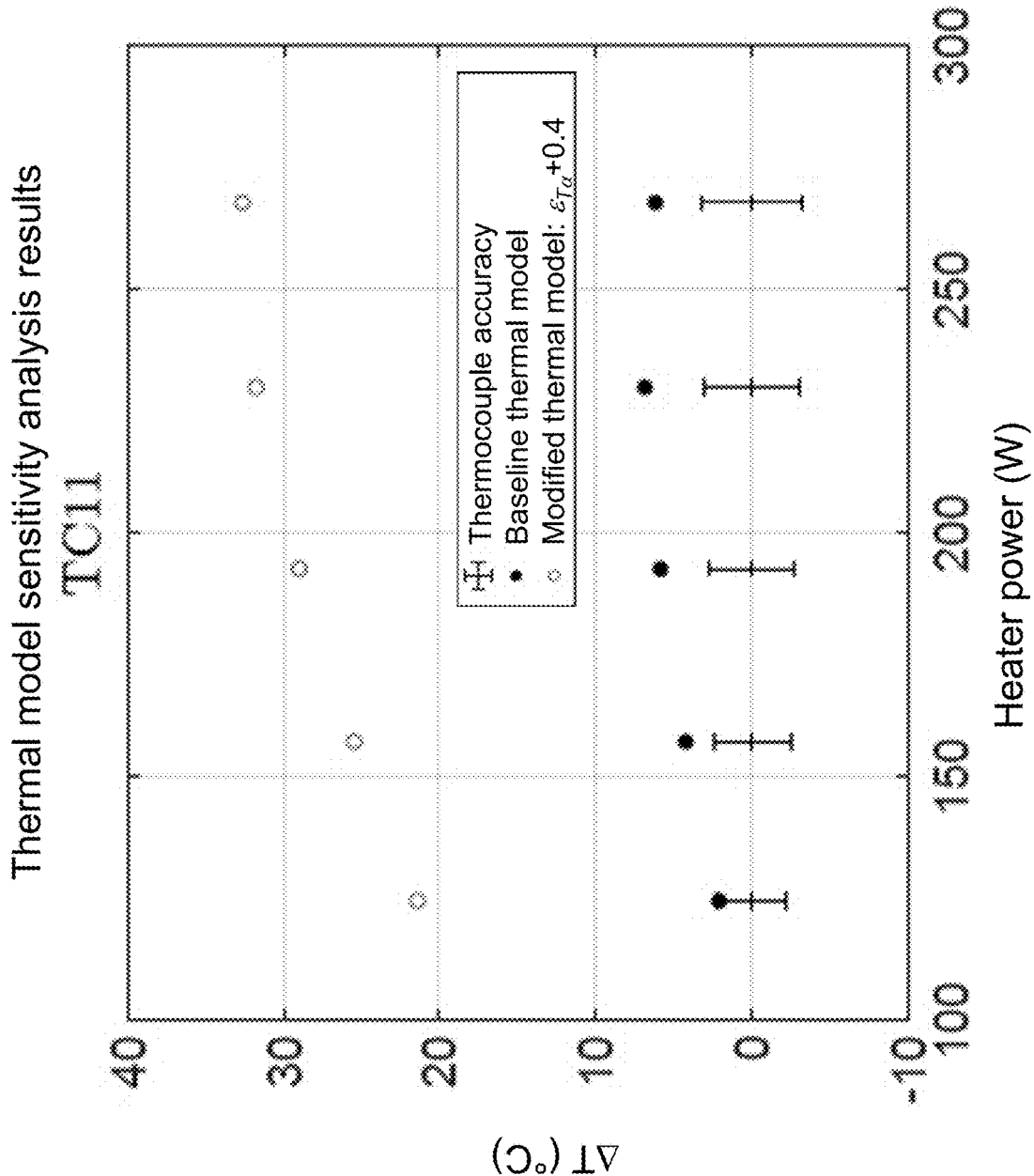
Figure 26:
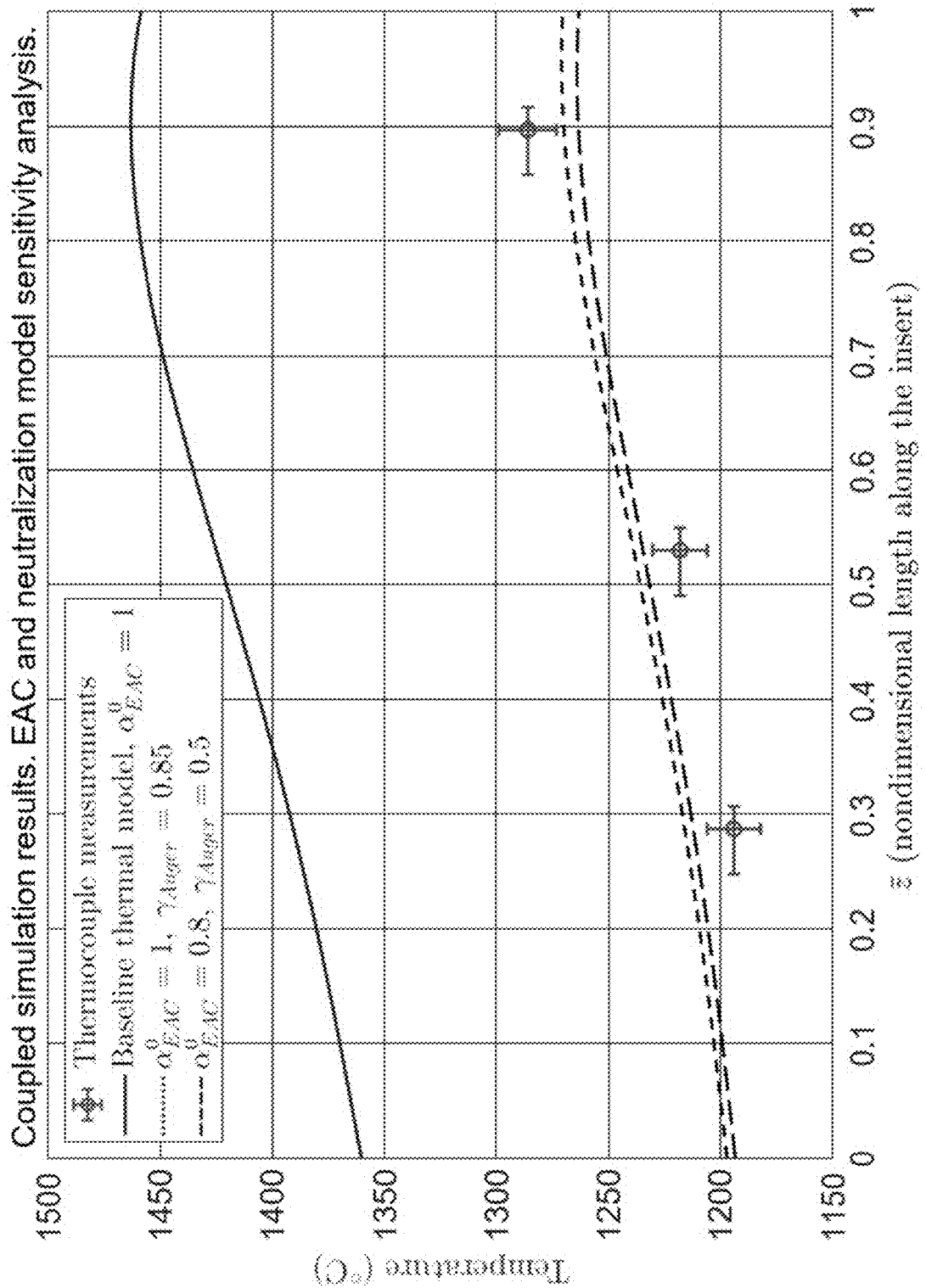
FIG. 26: Converged temperature results for the baseline thermal model. Sensitivity analysis for EAC and neutralization model. Experimental values shown for comparison.

In FIG. 25 we have simplified the validation results by removing the absolute values of the experiments and simulations that we showed in FIGS. 18A-18E. As TC$_1$, TC$_2$ and TC$_3$ give very similar results due to their physical proximity, we only show results for TC$_2$. We have also removed the two simulation series 100% P and 95% P, and only show the mean temperature simulated by both. Results for this thermal model show that TC$_2$ is cooler than the experimental results by a minimum of ~30° C. and a maximum of ~110° C. In addition, the new thermal model estimates ~70° C. cooler temperatures for all power levels than those for the baseline.

In order to estimate the sensitivity of the coupled system to inaccuracies in the thermal model, we varied two parameters and ran the global simulation until the converged solutions of the system were found. These included $\varepsilon_{Ta}$ (20% increase with respect to the literature values) for every Ta component, and $\varepsilon_{Ta}$ used in the definition of the radiation shield (0.2 increase above the value used in the baseline).

When we increase the value of the emissivity for modelling the radiation shield by 0.4 above the literature values, we are effectively overestimating the losses in the cathode as shown in FIG. 25 by the cooler response of the insert. However, that does not affect the response of the coupled solution significantly (~6° C.). This occurs because in the coupled system, the overestimation of the thermal losses creates a temperature solution that results in lower thermionic emission. In this case the plasma solution cannot converge given that the total discharge current of 25 A cannot be satisfied. Therefore, the new plasma solution (self-consistent with this perturbed thermal model) is different than the one for the baseline thermal model.

A more significant overestimation of the losses was performed by using 120% of the literature values for the Ta emissivity for every Ta component in the cathode. The response of the converged solution using this modified thermal model was still not significantly cooler (~24° C.). Therefore, the discrepancy between the converged global simulation results and the experimental values cannot be explained by any reasonable modification of the cathode thermal characteristics that result in an increase of the thermal model heat losses.

Sensitivity to Plasma Model Parameters:

The discrepancy between the predicted and observed temperature values could also be related to inaccuracies in the plasma solver results due to sensitivities in the input parameters defining the cathode operating point. The plasma solution depends on four experimentally measured variables and the modelling techniques. The four empirical variables—$\dot{m}_{Xe}$, $J_D$, $V_D$, and $V_K$—were measured with accuracies that do not affect the final solution significantly. However, the solution of the coupled system strongly depends on the value of $V_K$. $V_K$ is ultimately used to find the work function at every global iteration step. We studied the sensitivity to $V_K$ by reducing it to 3.5 V (0.7 V less than the actual measurement).

The self-consistent insert temperature solution was reduced by ~30° C. in this case. This result suggests that inaccuracies in $V_K$ modelling are not a likely explanation of the observed difference between experimental and modelling results.

Sensitivity to Energy Accommodation Coefficient:

The results also showed that the solution is indeed insensitive to f (β) and if $\alpha_{EAC}^0=0.75$ at every surface of the cathode, the converged solution does not agree with the experimental values as. The temperature distribution at convergence is in this case (~74° C.) cooler than the one obtained for the baseline thermal model.

Sensitivity to Work Function Distribution:

In this Example, also studied is the dependence of the self-consistent solution on work function distributions along the emitter ($\varphi(z)$). This study was motivated by the observation of discoloration along the emitter, suggesting chemistry evolution due to plasma interaction which could result in such axial variations in the work function. The impact on the magnitude of the work function or its spatial dependence is difficult to capture experimentally, as it is difficult to measure the work function or the chemical state of the surface while the cathode is running. However, to get an initial estimate of the sensitivity of the self-consistent solution to work function distributions, we decided to study the effect of linear and parabolic work function profiles whose mean magnitude is adjusted according to the self-consistent model needs. The amplitude of those profiles is 0.2 eV, value chosen arbitrarily to get an initial estimation of the sensitivity of the solution to a plausible real scenario. We use $\alpha_{EAC}^0=0.75$ for all the work function profiles studied.

The self-consistent solutions show that the temperature distribution is not greatly affected by the work function profiles utilized in this study. The net effect on the insert temperature is a shifted temperature distribution ~30° C. cooler than the solution with constant work function profile. Similarly for Profile 3, it is ~25° C. cooler. For profiles 2 and 4, the shift is towards higher temperatures, by ~20° C.

Sensitivity to Neutralization Model:

A much better agreement was found when the two step neutralization model was employed. In this case, $\gamma_{Auger}=0.85$ ($\alpha_{EAC}^0=1$) was sufficient to find a reasonable agreement with the experimental results, with work function convergence at 2.27 eV. Similar agreement was found when $\gamma_{Auger}=0.5$ and $\alpha_{EAC}^0=0.8$, in which case the work function is 2.25 eV.

Discussion:

The converged solution is defined by the COMSOL thermal baseline model and the OrCa$_2$D plasma solution necessary to match $V_D$ and $V_K$ at the operating point utilized in this test case. Coupling both models imposes an additional constraint in the solution, therefore, one less degree of freedom is available. Thus, $\varphi$ and $T_{insert}(z)$ are the inherent results of this coupled system.

We have shown in FIG. 24 that the simulation approach is successful and convergence occurs.

In order to find agreement with experimental measurements we need to employ one or the other of two major assumptions. One assumption is that $\alpha_{EAC}^0$ is smaller than 0.75 if resonant neutralization dominates the charge exchange process of ions that interact with solids for every surface at the cathode-plasma interface. However, we propose that this scenario is unlikely: accommodation coefficients are dominated by the mass ratio between the ions and the atoms of the surface. According to the most extensive data set that we could find in the literature [45] extended to the Xe$^+$—LaB$_6$ case, $\alpha_{EAC}^0$ is not expected to be lower than 0.8.

Figure 27:
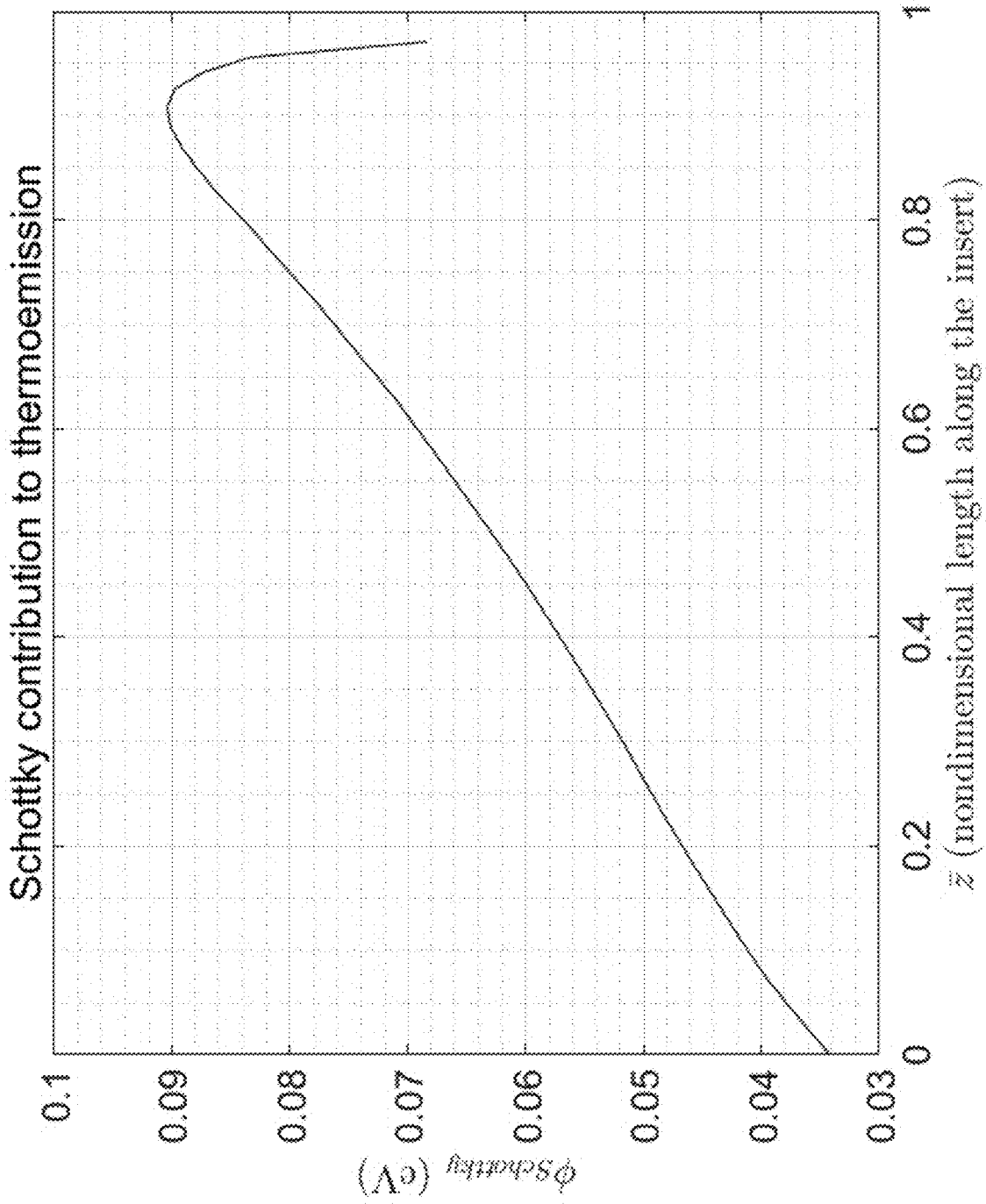
FIG. 27: Contribution of the Schottky effect for the final self consistent solutions.
Figure 28:
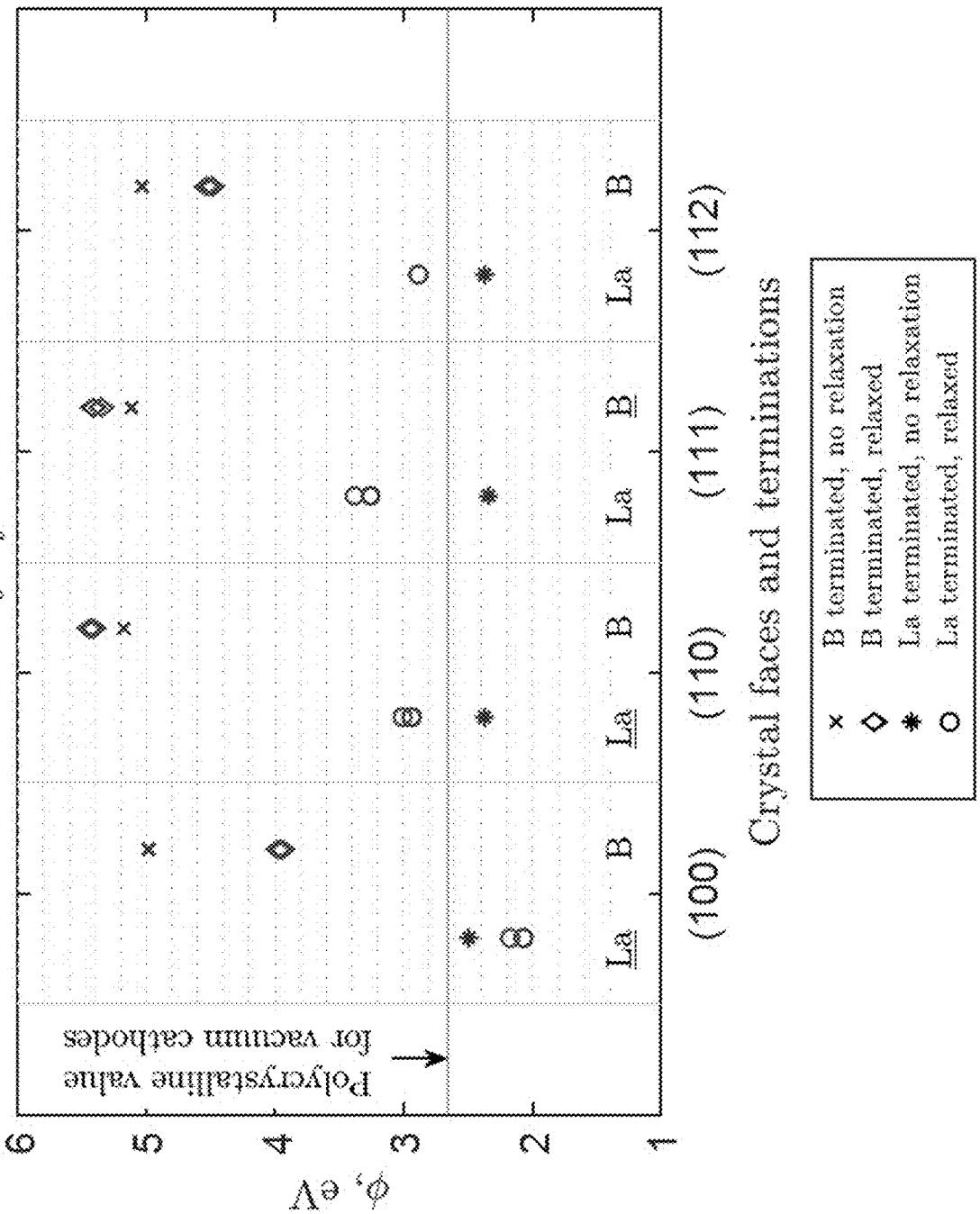
FIG. 28: Work function of different $LaB_6$ crystal faces computed from DFT simulations. Data in blue is from [20]. Data in red is from [17]. Polycrystalline value is from [6]. Known natural terminations are underlined [16]. It shows the work function of the different crystals of $LaB_6$, including the minimum work function of the (100).

An alternative assumption that leads to an agreement between simulation results and experimental measurements is that the ion-surface interaction is governed by the two step neutralization process described above, with either $\gamma_{Auger}=0.85$ and $\alpha_{EAC}^0=1$ or $\gamma_{Auger}=0.5$ and $\alpha_{EAC}^0=0.8$. In each case, the work function predicted by the simulation platform is 2.27 and 2.25 eV respectively. These values corroborate our previous finding that LaB$_6$ inserts exposed to plasma in hollow cathodes display reduced work function [6] with respect to the previously reported value of 2.67 eV [3] measured in the vacuum diode configuration for polycrystalline LaB$_6$. The most significant of them, for the test case analyzed here, is the ~20% ion return current that the interior cathode plasma direct towards the insert walls. The contribution of the Schottky effect can be observed in FIG. 27.

Two step neutralization is a well-established process in systems comprising low energy ions neutralizing with low work function surfaces. To our knowledge the mechanism of Xe ion neutralization with LaB$_6$ solids has not been specifically addressed by empirical studies. Experimental work to confirm our model that Xe ions neutralize with LaB$_6$ solids following a two step neutralization mechanism in similar conditions should be performed.

We studied the behavior of the self-consistent cathode simulation approach with respect to work function axial distribution $\varphi(z)$. The work function profiles tested did not influence the solution to the extent necessary to find agreement with the experimental results. The work function distribution might be non-uniform in the cathode, but we learned that the self-consistent solution is not heavily influenced by the studied $\varphi(z)$ profiles.

The baseline thermal model could be improved upon by experimentally testing individual components or small subgroups of components of the cathode and comparing the results with corresponding thermal simulations. In that manner we can likely reduce the variability observed in FIGS. 18A-18E over the different power settings. Those studies would focus on trying to measure a more realistic emissivity for Ta in the actual components using a calibrated thermal camera. In addition, an improved modelling technique could be used to simulate the radiation shield and the contact between cathode tube and heater coils. However, given the results of the sensitivity analysis for the overestimation of the global heat losses of the cathode, it is not possible that refining the thermal characteristics of the cathode will explain the difference between temperature measurements and a self-consistent solution.

Uncertainties in the plasma model should be identified and their impact in the self-consistent solution should be quantified. This is a very challenging goal given the number of variables involved and the inherently non-linear behavior of the plasma model. It is not clear at this point whether or not such study can be accomplished within a reasonable amount of time given the computational cost of each simulation and the number of variables to be studied.

In conclusion, in order to predict the temperature distribution of the cathode in any configuration and operating condition we still need to identify which of the mechanisms studied here are in fact occurring in the cathode and to what extent they affect the cathode. Experimental work is necessary to obtain that knowledge.

References Associated with Example 2

[1] Gaétan Sary, Laurent Garrigues, and Jean-Pierre Boeuf. "Hollow cathode modeling: II. Physical analysis and parametric study". In: Plasma Sources Science and Technology 26.5 (March 2017), p. 055008. doi: 10.1088/1361-6595/aa6210 (cit. on p. 61).

[2] Ira Katz et al. "Thermal model of the hollow cathode using numerically simulated plasma fluxes". In: 23.3 (2007). doi: 10.2514/1.21103 (cit. on pp. 61, 85, 86, 87, 89).

[3] J. M. Lafferty. "Boride Cathodes". In: Journal of Applied Physics 22.3 (March 1951), pp. 299-309. doi: 10.1063/1.1699946 (cit. on pp. 61, 63, 104).

[4] Walter H. Kohl. Handbook of materials and techniques for vacuum devices. AIP-Press, 1997, pp. XVI, 498. isbn: 978-1563963872 (cit. on p. 62).

[5] Ioannis G Mikellides et al. "Hollow cathode theory and experiment. II. A two-dimensional theoretical model of the emitter region". In: JOURNAL OF APPLIED PHYSICS (2005), pp. 1-14. doi: 10.1063/1.2135409 (cit. on pp. 62, 69, 78, 82, 85).

[6] Pablo Guerrero et al. "Work function reduction in lanthanum hexaboride hollow cathodes operated in gas discharges". In: 35th International Electric Propulsion Conference. Atlanta, Ga., USA, 2017, pp. 2017-399. url: https://iepc2017.org/sites/default/files/speaker-papers/iepc-2017_399.pdf%20http://erps.spacegrant.org/IEPC_2017/IEPC_2017_399.pdf (cit. on pp. 63, 66, 82, 93, 104).

[7] N. D. Milošvić et al. "Thermal Properties of Tantalum Between 300 and 2300K". In: International Journal of Thermophysics 20.4 (1999), pp. 1129-1136. doi: 10.1023/A:1022659005050 (cit. on pp. 71, 72).

[8] Takaho Tanaka. "The thermal and electrical conductivities of LaB 6 at high temperatures". In: Journal of Physics C: Solid State Physics 7.9 (May 1974), pp. L177-L180. doi: 10.1088/0022-3719/7/9/001 (cit. on p. 72).

[9] Edmund K Storms. "The emissivity of LaB6 at 650 nm". In: Journal of applied physics 4450 (1979). doi: 10.1063/1.326438 (cit. on p. 72).

[10] C. Y. Ho, R. W. Powell, and P. E. Liley. Thermal Conductivity of the Elements: A comprehensive review. 1974. doi: 10.1063/1.3253100 (cit. on p. 72).

[11] General Electric Company and Nela Park. "Radiating Characteristics of Tungsten and Tungsten Lamps". In: Journal of the Optical Society of 35.2 (1945), pp. 108-113. doi: 10.1364/JOSA.35.000108 (cit. on p. 72).

[12] A. G. Worthing and W. E. Forsythe. "Total emissivity powers and resistivities of tungsten at incandescence". In: Physical Review 18 (1921), pp. 144-147 (cit. on p. 72).

[13] W. E. Forsythe and E. M. Watson. "Resistance and Radiation of Tungsten as a Function of Temperature". In: Journal of the Optical Society of America 24.4 (April 1934), p. 114. doi: 10.1364/JOSA.24.000114 (cit. on p. 72).

[14] W. D. KINGERY et al. "Thermal Conductivity: X, Data for Several Pure Oxide Materials Corrected to Zero Porosity". In: Journal of the American Ceramic Society 37.2 (February 1954), pp. 107-110. doi: 10.1111/j.1551-2916.1954.tb20109.x (cit. on p. 72).

[15] S Weisenburger. "Heat transport measurements in polycrystalline graphites up to 2600C (Report on an international cooperative measuring programme)". In: High Temperatures—High Pressures 5 (1973), pp. 475-480 (cit. on p. 72).

[16] Bufa Zhang, John Redgrove, and Jamie Clark. "New apparatus for measurement of the spectral, angular, and total emissivity of solids". In: High Temperatures—High Pressures 35-36.3 (2003), pp. 289-302. doi: 10.1068/htjr124 (cit. on p. 72).

[17] N/A. Military Handbook—MIL-HDBK-5H: Metallic Materials and Elements for Aerospace Vehicle Structures. U.S. Department of Defense, 1998, pp. 3-261. isbn: 978-1-59124-543-8 (cit. on p. 72).

[18] Chang-da Wen and Issam Mudawar. "Experimental Investigation of Emissivity of Aluminum Alloys and Temperature Determination Using Multispectral Radiation Thermometry (MRT) Algorithms". In: Journal of Materials Engineering and Performance 11.5 (October 2002), pp. 551-562. doi: 10.1361/105994902770343818 (cit. on p. 72).

[19] Michael F. Cohen and Donald P. Greenberg. "The hemi-cube". In: ACM SIGGRAPH Computer Graphics 19.3 (July 1985), pp. 31-40. doi: 10.1145/325165.325171 (cit. on p. 73).

[20] Urs Meyer. "Hemi-Cube Ray-Tracing: A Method for Generating Soft Shadows". In: Eurographics 90 (1990), pp. 365-376 (cit. on p. 73).

[21] A. F. Emery et al. "Validation of Radiation Computations using View factors and COMSOLs Hemicube Approaches". In: COMSOL Conference 2009 Boston (2009) (cit. on p. 73).

[22] P. D. Desai et al. "Electrical Resistivity of Selected Elements". In: Journal of Physical and Chemical Reference Data 13.4 (October 1984), pp. 1069-1096. doi: 10.1063/1.555723 (cit. on pp. 75, 76).

[23] Ioannis G Mikellides and Ira Katz. "Wear Mechanisms in Electron Sources for Ion Propulsion, 1: Neutralizer Hollow Cathode". In: Journal of Propulsion and Power 24.4 (2008). doi: 10.2514/1.33461 (cit. on pp. 78, 82, 85).

[24] Ioannis G Mikellides et al. "Wear Mechanisms in Electron Sources for Ion Propulsion, II: Discharge Hollow Cathode". In: Journal of Propulsion and Power 24.4 (2008). doi: 10.2514/1.33462 (cit. on pp. 78, 85).

[25] Ioannis G Mikellides. "Effects of viscosity in a partially ionized channel flow with thermionic emission". In: Physics of Plasmas (2009), pp. 1-10. doi: 10.1063/1.3056397 (cit. on pp. 78, 85).

[26] Ira Katz and Ioannis G. Mikellides. "Neutral gas free molecular flow algorithm including ionization and walls for use in plasma simulations". In: Journal of Computational Physics 230.4 (2011), pp. 1454-1464. doi: 10.1016/j.jcp.2010.11.013 (cit. on p. 78).

[27] Ioannis G Mikellides et al. "Evidence of nonclassical plasma transport in hollow cathodes for electric propulsion". In: Journal of Applied Physics (2007), pp. 1-11. doi: 10.1063/1.2710763 (cit. on p. 80).

[28] Benjamin A. Jorns, Ioannis G. Mikellides, and Dan M. Goebel. "Ion acoustic turbulence in a 100-A LaB6 hollow cathode". In: Physical Review E—Statistical, Nonlinear, and Soft Matter Physics 90.6 (2014), pp. 1-10. doi: 10.1103/PhysRevE.90.063106 (cit. on p. 80).

[29] R. Z. Sagdeev A. A. Galeev. Nonlinear plasma theory. New York: W.A. Benjamin, Inc, 1969 (cit. on p. 80).

[30] Ioannis G Mikellides et al. "Numerical Simulations of a Hall Thruster Hollow Cathode Plasma". In: 30th International Electric Propulsion Conference. 2007, pp. 1-12 (cit. on p. 80).

[31] Saul Dushman. "Electron emission from metals". In: Phys. Rev. 21 (1923), pp. 623-636. doi: 10.1103/PhysRev.21.623 (cit. on p. 80).

[32] Ioannis G Mikellides et al. "Numerical Simulations of the Partially Ionized Gas in a 100-A LaB6 Hollow Cathode". In: IEEE Transactions on Plasma Science 43.1 (January 2015), pp. 173-184. doi: 10.1109/TPS.2014.2320876 (cit. on pp. 80, 85).

[33] Ioannis G Mikellides et al. "The discharge plasma in ion engine neutralizers: Numerical simulations and comparisons with laboratory data". In: Journal of Applied Physics (2010), pp. 1-12. doi: 10.1063/1.3514560 (cit. on pp. 82, 85).

[34] Jesús Garcia Rubiano et al. "Study of the radiative properties of plasma mixtures of interest for ICF chamber design using the ATMED code". In: 39th EPS Conference on Plasma Physics 2012, EPS 2012 and the 16th International Congress on Plasma Physics. Vol. 3. 2012, P4.157. isbn: 9781622769810 (cit. on p. 82).

[35] R. Rodriguez et al. "Determination and analysis of plasma parameters for simulations of radiative blast waves launched in clusters of xenon and krypton". In: Plasma Physics and Controlled Fusion 54.4 (2012). doi: 10. 1088/0741-3335/54/4/045012 (cit. on p. 82).

[36] Ioannis G. Mikellides et al. "Investigations of Spot-to-plume Mode Transition in a Hollow Cathode Discharge Using 2-D Axisymmetric Plasma Simulations". In: 54th AIAA/SAE/ASEE Joint Propulsion Conference, AIAA Propulsion and Energy Forum: American Institute of Aeronautics and Astronautics. 2018, pp. 1-23 (cit. on p. 83).

[37] Ioannis G Mikellides et al. "Plasma processes inside dispenser hollow cathodes". In: Physics of Plasmas 13. May (2006), p. 063504. doi: 10.1063/1.2208292 (cit. on p. 85).

[38] Dan M Goebel et al. "Hollow cathode theory and experiment. I. Plasma characterization using fast miniature scanning probes". In: Journal of Applied Physics 98.11 (2005), p. 113302. doi: 10.1063/1.2135417 (cit. on p. 85).

[39] Ira Katz et al. "Insert Heating and Ignition in Inert-Gas Hollow Cathodes". In: IEEE Transactions on Plasma Science 36.5 (October 2008), pp. 2199-2206. doi: 10.1109/TPS.2008.2004363 (cit. on p. 85).

[40] James E Polk et al. "Tungsten and barium transport in the internal plasma of hollow cathodes". In: Journal of Applied Physics 105.0021-8979 (2009), pp. 113301-13. doi: 10.1063/1.3111970 (cit. on p. 85).

[41] Angela M Capece et al. "Oxygen transport in the internal xenon plasma of a dispenser hollow cathode". In: 153302 (2014). doi: 10.1063/1.4871755 (cit. on p. 85).

[42] Ioannis G. Mikellides et al. "Evidence of nonclassical plasma transport in hollow cathodes for electric propulsion". In: Journal of Applied Physics 101.6 (March 2007), p. 063301. doi: 10.1063/1.2710763 (cit. on p. 85).

[43] Dan M. Goebel and Ira Katz. Fundamentals of Electric Propulsion: Ion and Hall Thrusters V0. 2008, pp. 1-507. doi: 10.1002/9780470436448 (cit. on p. 89).

[44] Homer D. Hagstrum. "Reflection of Noble Gas Ions at Solid Surfaces". In: Physical Review 123.3 (August 1961), pp. 758-765. doi: 10.1103/PhysRev. 123.758 (cit. on p. 89).

[45] V. A. Shuvalov. "Energy accommodation for gas ions on a polycrystalline material". In: Journal of Applied Mechanics and Technical Physics 24.6 (1983), pp. 778-785. doi: 10.1007/BF00905614 (cit. on pp. 90, 104).

[46] R. Carmina Monreal. "Auger neutralization and ionization processes for charge exchange between slow noble gas atoms and solid surfaces". In: Progress in Surface Science 89.1 (2014), pp. 80-125. doi: 10.1016/j.progsurf.2014. 01.001 (cit. on p. 91).

[47] H. D. Hagstrum, P. Petrie, and E. E. Chaban. "Interaction of the He+ and Ne+ ions with Ni(100)-K and Cu(100)-K surfaces having variable potassium coverage". In: Physical Review B 38.15 (November 1988), pp. 10264-10279. doi: 10.1103/PhysRevB.38.10264 (cit. on p. 91).

[48] Jørgen E. Hansen and Willy Persson. "Revised analysis of singly ionized xenon, Xe II". In: Physica Scripta 36.4 (October 1987), pp. 602-643. doi: 10.1088/0031-8949/36/4/005 (cit. on p. 92).

[49] Homer D. Hagstrum. "Auger Ejection of Electrons from Tungsten by Noble Gas Ions". In: Physical Review 96.2 (October 1954), pp. 325-335. doi: 10.1103/PhysRev.96.325 (cit. on p. 92).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, method, electrode, material, and combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

The term "±" refers to an inclusive range of values, such that "X±Y," wherein each of X and Y is independently a number, refers to an inclusive range of values selected from the range of X−Y to X+Y.

We claim:

1. A method for treating a polycrystalline material, the method comprising:
exposing a surface of the polycrystalline material to a plasma thereby changing the surface of the polycrystalline material from being characterized by a starting condition to being characterized by a treated condition;
wherein:
the surface comprises a plurality of crystallites each having a composition $MB_6$, M being a metal element;
the plasma comprises ions, the ions being characterized by an average ion flux selected from a range of 1.5 to 100 A/cm$^2$ and an average ion energy that is less than a sputtering threshold energy of the plurality of $MB_6$ crystallites in a presence of said plasma;
the starting condition of the surface is characterized by a first average work function and the treated condition of the surface is characterized by a second average work function; and the second average work function is less than the first average work function.

2. The method of claim 1, wherein M is La, Ce, Sr, Ba, Y, Gd, Sm, Th, Ca, Ti, Zr, Ni, Ta, Cr, Mn, Fe, Sc, Hf, V, Nb, Mo, W, Tc, Re, Ru, Os, Co, Rh, Ir, Pd, Pt, Li, Na, K, Be, Mg, Al, Si, B, or any combination of these.

3. The method of claim 1, wherein the plasma comprises ions characterized by an average ion energy selected from a range of 10 eV to 100% of the sputtering threshold energy of the plurality of $MB_6$ crystallites of the surface in the presence of said plasma characterized by said average ion energy and said average ion flux.

4. The method of claim 1, wherein the plasma comprises ions characterized by an average ion energy selected from a range of 25 to 35 eV and an average ion flux selected from a range of 1.5 to 100 A/cm$^2$.

5. The method of claim 1, wherein said ions of the plasma are characterized by said average ion flux within 1 μm of said surface of the polycrystalline material and/or wherein said ions of the plasma are characterized by said average ion energy within 1 μm of said surface of the polycrystalline material.

6. The method of claim 1, wherein the ions of the plasma are ionization products of one or more gases, the one or more gases comprising $CH_2$, $BCl_3$, $Cl_2$, $CF_4$, $CHF_3$, HBr, $O_2$, $NCl_3$, $SiF_4$, $NF_3$, HCl, $H_2$, $C_2F_6$, $C_3F_8$, $SiCl_4$, SiCl, $SF_6$, $N_2$, He, Ne, Ar, Kr, Xe, or any combination of these.

7. The method of claim 1, wherein at least 95% of the ions are N ions, He ions, Ne ions, Ar ions, Kr ions, and/or Xe ions.

8. The method of claim 1, wherein the surface is characterized by a temperature selected from a range of −273° C. to 2000° C. during the step of exposing and/or wherein the step of exposing is performed for a time selected from a range of 1 ns to 100 hours.

9. The method of claim 1, wherein the step of changing comprises etching the surface due to exposure of the surface to the plasma.

10. The method of claim 1, wherein the starting condition of the surface is further characterized by a first degree of crystalline texture and the treated condition of the surface is further characterized by a second degree of crystalline texture; and wherein the second degree of crystalline texture is greater than the first degree of crystalline texture.

11. The method of claim 1, wherein the starting condition of the surface is characterized by a lack of crystalline texture and wherein the treated condition of the surface is characterized by having crystalline texture.

12. The method of claim 1, wherein the surface having the treated condition is characterized by a preferred crystalline orientation being (100).

13. The method of claim 1, wherein the second average work function is less than the first average work function by a value greater than 0 eV and less than or equal to 0.6 eV.

14. The method of claim 1, wherein the second average work function is selected from a range of 2.07 eV to 2.6 eV.

15. The method of claim 1, wherein the treated condition of the surface persists for at least 24 hours after the step of exposing is terminated.

16. The method of claim 1, wherein at least 95% of crystallites of the surface have the composition $MB_6$.

17. The method of claim 1, wherein the polycrystalline material is a part of an electrode of a device.

18. The method of claim 1, wherein the surface has a cylindrical or other three-dimensional contour.

19. The method of claim 1, wherein the ions are characterized by an average ion flux selected from a range of 1.5 to 4.5 A/cm$^2$.

20. The method of claim 1, wherein said ions of the plasma are characterized by said average ion flux within 1 nm of said surface of the polycrystalline material and/or wherein said ions of the plasma are characterized by said average ion energy within 1 nm of said surface of the polycrystalline material.

21. The method of claim 1, wherein M is one or more metal elements comprising La.

22. The method of claim 1, wherein M is La, Ce, or a combination thereof.

23. The method of claim 1, wherein M is La.

* * * * *